US 011597045B2

(12) United States Patent
Dick et al.

(10) Patent No.: US 11,597,045 B2
(45) Date of Patent: Mar. 7, 2023

(54) LINEAR POSITIONER

(71) Applicant: Precision Automation, Inc., Vancouver, WA (US)

(72) Inventors: Spencer B. Dick, Portland, OR (US); Nathan Bryant, Portland, OR (US)

(*) Notice: Subject to any disclaimer, the term of this patent is extended or adjusted under 35 U.S.C. 154(b) by 267 days.

(21) Appl. No.: 16/992,043

(22) Filed: Aug. 12, 2020

(65) Prior Publication Data

US 2021/0046596 A1 Feb. 18, 2021

Related U.S. Application Data

(60) Provisional application No. 62/885,699, filed on Aug. 12, 2019.

(51) Int. Cl.
*B23Q 1/28* (2006.01)
*B23Q 1/26* (2006.01)

(52) U.S. Cl.
CPC ............. *B23Q 1/262* (2013.01); *B23Q 1/28* (2013.01)

(58) Field of Classification Search
CPC ........ G05B 19/409; B23Q 1/262; B23Q 1/28; B23Q 9/0078; B27B 27/02; B27B 27/10; B27B 31/00; B27M 3/18; B23D 59/001; A47B 3/0916
See application file for complete search history.

(56) References Cited

U.S. PATENT DOCUMENTS

| | | |
|---|---|---|
| 491,307 A | 2/1893 | Gaylord |
| 1,271,473 A | 7/1918 | Johnson |
| 2,315,458 A | 3/1943 | Sellmeyer |
| 2,577,766 A | 12/1951 | Johnson et al. |
| 2,602,477 A | 7/1952 | Knife |
| 2,731,989 A | 1/1956 | Valcourt et al. |

(Continued)

FOREIGN PATENT DOCUMENTS

| | | |
|---|---|---|
| DE | 3702223 A1 | 8/1988 |
| DE | 4116769 A1 | 1/1993 |

(Continued)

OTHER PUBLICATIONS

The International Bureau of WIPO, "International Preliminary Report on Patentability" regarding PCT Patent Application No. PCT/US2020/046030, dated Feb. 8, 2022, 9 pages.

(Continued)

*Primary Examiner* — Lee A Holly
(74) *Attorney, Agent, or Firm* — Klarquist Sparkman, LLP

(57) ABSTRACT

Systems, methods, and apparatus for positioning and/or processing items, such as workpieces. The systems, methods, and apparatus may include or use a linear positioner forming a track. In some embodiments, the linear positioner may include a carriage configured to be driven along the track to a desired position, in response to a signal(s), such as a radiofrequency signal(s), received from a computer, which may be a general-purpose, handheld computer, such as a phone or tablet. In some embodiments, the linear positioner may comprise a shuttle including a motor and a carriage, and may be configured to drive itself as a unit along the track. In some embodiments, the track may include a rack having a linear array of teeth formed by two or more frame sections, such as table sections, coupled end to end, with each support section providing a segment of the rack.

46 Claims, 37 Drawing Sheets

(56) References Cited

U.S. PATENT DOCUMENTS

| | | |
|---|---|---|
| 2,740,437 A | 4/1956 | Odlum et al. |
| 2,852,049 A | 9/1958 | Peterson |
| 3,170,736 A | 2/1965 | Wright |
| 3,186,453 A | 6/1965 | Green |
| 3,329,181 A | 7/1967 | Buss et al. |
| 3,459,246 A | 8/1969 | Ottosson |
| 3,524,708 A | 8/1970 | Rabian et al. |
| 3,552,254 A | 1/1971 | Marczy |
| 3,566,239 A | 2/1971 | Taniguchi |
| 3,584,284 A | 6/1971 | Beach et al. |
| 3,626,792 A | 12/1971 | Eichenhofer |
| 3,718,061 A | 2/1973 | Wilkin |
| 3,736,968 A | 6/1973 | Mason |
| 3,738,403 A | 6/1973 | Schwoch et al. |
| 3,780,777 A | 12/1973 | Davies |
| 3,811,353 A | 5/1974 | Miles |
| 3,814,153 A | 6/1974 | Schmidt |
| 3,841,462 A | 10/1974 | Schmidt |
| 3,854,889 A | 12/1974 | Lemelson |
| 3,886,372 A | 5/1975 | Sanglert |
| 3,910,142 A | 10/1975 | Jureit et al. |
| 3,917,078 A | 11/1975 | Schmidt |
| 3,941,019 A | 3/1976 | Baldwin et al. |
| 3,994,484 A | 11/1976 | Schorr |
| 4,055,097 A | 10/1977 | Ducret |
| 4,111,088 A | 9/1978 | Ziegelmeyer |
| 4,144,449 A | 3/1979 | Funk et al. |
| 4,191,111 A * | 3/1980 | Emmert ............ A47B 3/0916 248/440 |
| 4,221,974 A | 9/1980 | Mueller et al. |
| 4,260,001 A | 4/1981 | De Muynck |
| 4,286,880 A | 9/1981 | Young |
| 4,358,166 A | 11/1982 | Antoine |
| 4,410,025 A | 10/1983 | Sicotte |
| 4,434,693 A | 3/1984 | Hosoi et al. |
| 4,445,877 A | 5/1984 | Love et al. |
| 4,453,838 A | 6/1984 | Loizeau |
| 4,454,794 A | 6/1984 | Thornton |
| 4,469,318 A | 9/1984 | Slavic |
| 4,472,783 A | 9/1984 | Johnstone et al. |
| 4,499,933 A | 2/1985 | Thompson |
| 4,541,722 A | 9/1985 | Jenks |
| 4,596,172 A | 6/1986 | Visser |
| 4,628,459 A | 12/1986 | Shinohara et al. |
| 4,658,687 A | 4/1987 | Haas et al. |
| 4,694,871 A | 9/1987 | Jenkner |
| 4,725,961 A | 2/1988 | Pearl |
| 4,736,511 A | 4/1988 | Jenkner |
| 4,791,757 A | 12/1988 | Orlando |
| 4,805,505 A | 2/1989 | Cantlin |
| 4,830,075 A | 5/1989 | Jenkner |
| 4,874,996 A | 10/1989 | Rosenthal |
| 4,878,524 A | 11/1989 | Rosenthal et al. |
| 4,879,752 A | 11/1989 | Aune et al. |
| 4,901,992 A | 2/1990 | Dobeck |
| 4,939,738 A | 7/1990 | Opower |
| 4,939,739 A | 7/1990 | Hobart et al. |
| 5,001,955 A | 3/1991 | Fujiwara |
| 5,014,583 A | 5/1991 | Webb et al. |
| 5,042,341 A | 8/1991 | Greten et al. |
| 5,048,816 A | 9/1991 | Chun et al. |
| 5,054,938 A | 10/1991 | Ide |
| 5,058,474 A | 10/1991 | Herrera |
| 5,094,282 A | 3/1992 | Suzuki et al. |
| 5,142,158 A | 8/1992 | Craig, Jr. |
| 5,176,060 A | 1/1993 | Thornton |
| 5,196,101 A | 3/1993 | Thakoor |
| 5,197,172 A | 3/1993 | Takagi et al. |
| 5,201,258 A | 4/1993 | Cremona |
| 5,201,351 A | 4/1993 | Hurdle, Jr. |
| 5,251,142 A | 10/1993 | Cramer |
| 5,254,859 A | 10/1993 | Carman et al. |
| 5,266,878 A | 11/1993 | Makino et al. |
| 5,365,812 A | 11/1994 | Harnden |
| 5,418,729 A | 5/1995 | Holmes et al. |
| 5,443,554 A | 8/1995 | Robert |
| 5,444,635 A | 8/1995 | Blaine et al. |
| 5,460,070 A | 10/1995 | Buskness |
| 5,472,028 A | 12/1995 | Faulhaber |
| 5,489,155 A | 2/1996 | Ide |
| 5,524,514 A | 6/1996 | Hadaway et al. |
| 5,663,882 A | 9/1997 | Douglas |
| 5,664,888 A | 9/1997 | Sabin |
| RE35,663 E | 11/1997 | Mori et al. |
| 5,772,192 A | 6/1998 | Hoffmann |
| 5,797,685 A | 8/1998 | Jurik et al. |
| 5,798,929 A | 8/1998 | Stenzel et al. |
| 5,829,892 A | 11/1998 | Groves |
| 5,845,555 A | 12/1998 | Dawley |
| 5,865,080 A | 2/1999 | Jackson |
| 5,933,353 A | 8/1999 | Abriam et al. |
| 5,938,344 A | 8/1999 | Sabin |
| 5,953,232 A | 9/1999 | Blaimschein |
| 5,960,104 A | 9/1999 | Conners et al. |
| 5,964,536 A | 10/1999 | Kinoshita |
| 5,970,830 A | 10/1999 | von Niederhausern |
| 6,058,589 A | 5/2000 | Hakansson |
| 6,062,280 A | 5/2000 | Newnes et al. |
| 6,120,628 A | 9/2000 | Pritelli |
| 6,144,895 A | 11/2000 | Govindaraj et al. |
| 6,196,101 B1 | 3/2001 | Van Den Bulcke |
| 6,212,983 B1 | 4/2001 | Pyle |
| 6,216,574 B1 | 4/2001 | Hain |
| 6,240,822 B1 | 6/2001 | Musser |
| 6,263,773 B1 | 7/2001 | McAdoo et al. |
| 6,272,437 B1 | 8/2001 | Woods et al. |
| 6,314,379 B1 | 11/2001 | Hu et al. |
| 6,379,048 B1 | 4/2002 | Brissette |
| 6,390,159 B1 | 5/2002 | Pinske |
| 6,422,111 B1 | 7/2002 | Rousseau |
| 6,463,352 B1 | 10/2002 | Tadokoro et al. |
| 6,470,377 B1 | 10/2002 | Sevcik et al. |
| 6,474,378 B1 | 11/2002 | Ryan et al. |
| 6,480,757 B1 | 11/2002 | Susnjara |
| 6,510,361 B1 | 1/2003 | Govindaraj et al. |
| 6,520,228 B1 | 2/2003 | Kennedy et al. |
| 6,549,438 B2 | 4/2003 | Malone |
| 6,594,590 B2 | 7/2003 | Woods et al. |
| 6,618,692 B2 | 9/2003 | Takahashi et al. |
| 6,631,006 B2 | 10/2003 | Dick et al. |
| 6,662,074 B2 | 12/2003 | Pugh et al. |
| 6,675,685 B2 | 1/2004 | Ceroll et al. |
| 6,690,990 B1 | 2/2004 | Caron et al. |
| 6,698,159 B2 | 3/2004 | Harris et al. |
| 6,701,259 B2 | 3/2004 | Dor et al. |
| 6,735,493 B1 | 5/2004 | Chou et al. |
| 6,764,434 B1 | 7/2004 | Volk |
| 6,827,476 B2 | 12/2004 | Lowry et al. |
| 6,880,695 B2 | 4/2005 | Suzuki et al. |
| 6,886,462 B2 * | 5/2005 | Dick .................. B27B 31/00 83/72 |
| 6,898,478 B2 | 5/2005 | Dick et al. |
| 6,941,864 B2 | 9/2005 | Dick et al. |
| 7,021,096 B2 | 4/2006 | Barnett |
| 7,036,411 B1 | 5/2006 | Harris et al. |
| 7,073,422 B2 | 7/2006 | Dick |
| 7,080,431 B2 | 7/2006 | Sawyer et al. |
| 7,168,353 B2 | 1/2007 | Dick et al. |
| 7,171,738 B2 | 2/2007 | Dick et al. |
| 7,245,981 B2 | 7/2007 | Dick et al. |
| 7,419,047 B2 | 9/2008 | Cesselli et al. |
| 7,428,443 B2 | 9/2008 | Dick |
| 7,483,765 B2 | 1/2009 | Dick et al. |
| 7,792,602 B2 * | 9/2010 | Dick .................. G05B 19/409 700/180 |
| 8,093,842 B2 | 1/2012 | Bergeron et al. |
| 8,783,140 B2 | 7/2014 | Dick et al. |
| 9,996,072 B2 | 6/2018 | Dick et al. |
| 2003/0000358 A1 | 1/2003 | Harris et al. |
| 2003/0033920 A1 | 2/2003 | Parks et al. |
| 2004/0027038 A1 * | 2/2004 | Gaesser ............ B27M 3/18 312/294 |
| 2004/0154449 A1 | 8/2004 | Parks et al. |
| 2005/0054502 A1 | 3/2005 | Benyovitz |

(56) References Cited

U.S. PATENT DOCUMENTS

| | | |
|---|---|---|
| 2005/0098004 A1 | 5/2005 | Dick et al. |
| 2005/0167000 A1 | 8/2005 | Dick |
| 2005/0268764 A1 | 12/2005 | Hadaway et al. |
| 2006/0006701 A1 | 1/2006 | Wells |
| 2006/0065086 A1 | 3/2006 | Swopes et al. |
| 2006/0104551 A1 | 5/2006 | Schneeberger et al. |
| 2006/0206233 A1 | 9/2006 | Carpenter et al. |
| 2007/0028730 A1 | 2/2007 | Sawyer et al. |
| 2007/0084075 A1 | 4/2007 | Kawano et al. |
| 2007/0084323 A1 | 4/2007 | Parks et al. |
| 2007/0140547 A1 | 6/2007 | Eswara et al. |
| 2007/0240547 A1 | 10/2007 | Dick et al. |
| 2007/0245872 A1 | 10/2007 | Kelly |
| 2008/0009961 A1 | 1/2008 | Dick et al. |
| 2008/0034934 A1 | 2/2008 | Mekkelsen et al. |
| 2009/0299519 A1 | 12/2009 | Dick et al. |
| 2011/0056344 A1* | 3/2011 | Dick .................. B23D 59/001 83/13 |
| 2011/0175273 A1 | 7/2011 | Dick et al. |
| 2013/0036890 A1 | 2/2013 | Dick et al. |
| 2013/0205564 A1 | 8/2013 | Dick et al. |
| 2013/0211576 A1 | 8/2013 | Dick et al. |
| 2013/0277905 A1 | 10/2013 | Meyer |
| 2015/0073579 A1 | 3/2015 | Dick et al. |
| 2015/0135793 A1 | 5/2015 | Plummer et al. |

FOREIGN PATENT DOCUMENTS

| | | |
|---|---|---|
| EP | 2384869 B1 | 11/2011 |
| WO | 2010144630 A1 | 12/2010 |

OTHER PUBLICATIONS

Precision Automation Inc., "TigerStop Application Guide", Application Guide for PF90 Computer Controlled Saw, 2000, 12 pages.
Tigerstop LLC., "Motor Replacement / Belt Replacement", TigerStop Instruction Guide, Apr. 2008, 16 pages.
Tigerstop LLC., TigerStop Catalog, 2008, 32 pages.
Tigerstop LLC., "Sustainable Solutions for Lean Manufacturing", TigerStop Catalog, 2009, 62 pages.
Tigerstop LLC., "The Basic TigerStop", TigerStop Manual 4.72, 2009, 1 page. www.tigerstop.com/tigerstop/The_Basic_TigerStop.htm, retrieved from the Internet on May 8, 2009.
The International Bureau of WIPO, "International Search Report and Written Opinion of the International Searching Authority" regarding PCT Application No. PCT/US2010/038047, dated Sep. 10, 2010, 16 pages.
The International Bureau of WIPO, "International Preliminary Report on Patentability" regarding PCT Patent Application No. PCT/US2010/038047, dated Dec. 12, 2011, 12 pages.
U.S. Receiving Office of WIPO, International Search Report and Written Opinion regarding PCT Patent Application No. PCT/US2020/046030, dated Dec. 10, 2020, 19 pages.

* cited by examiner

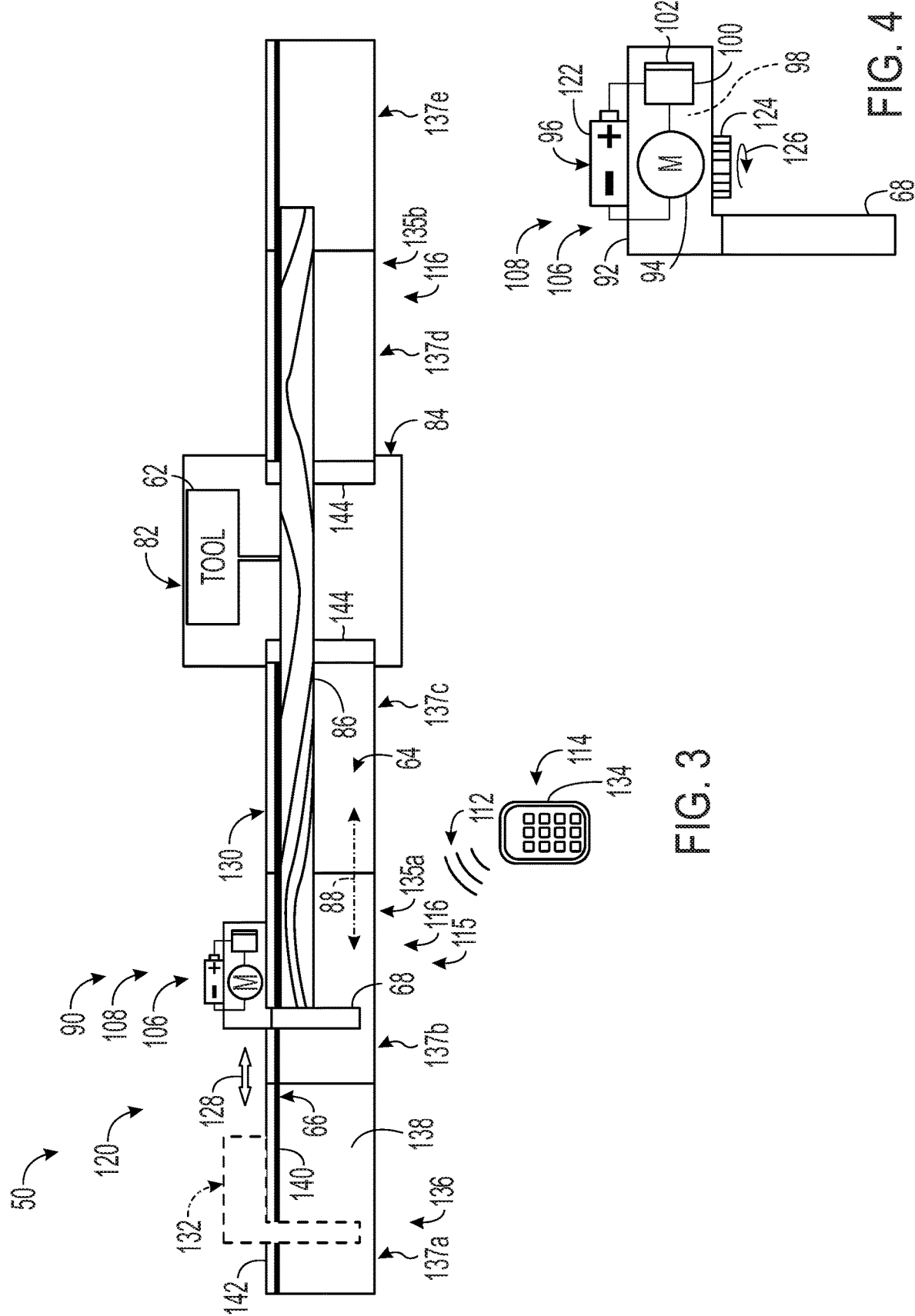

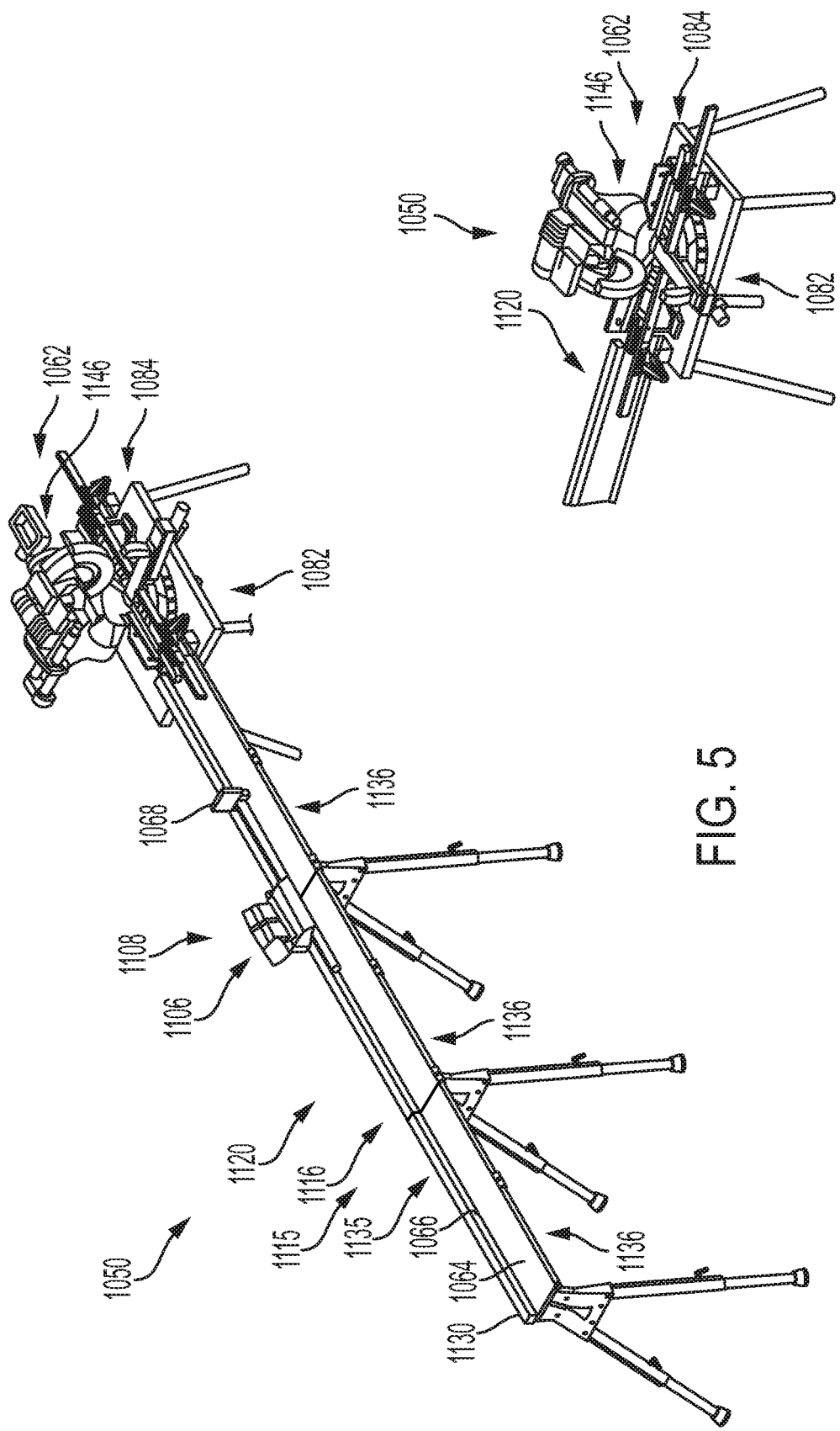

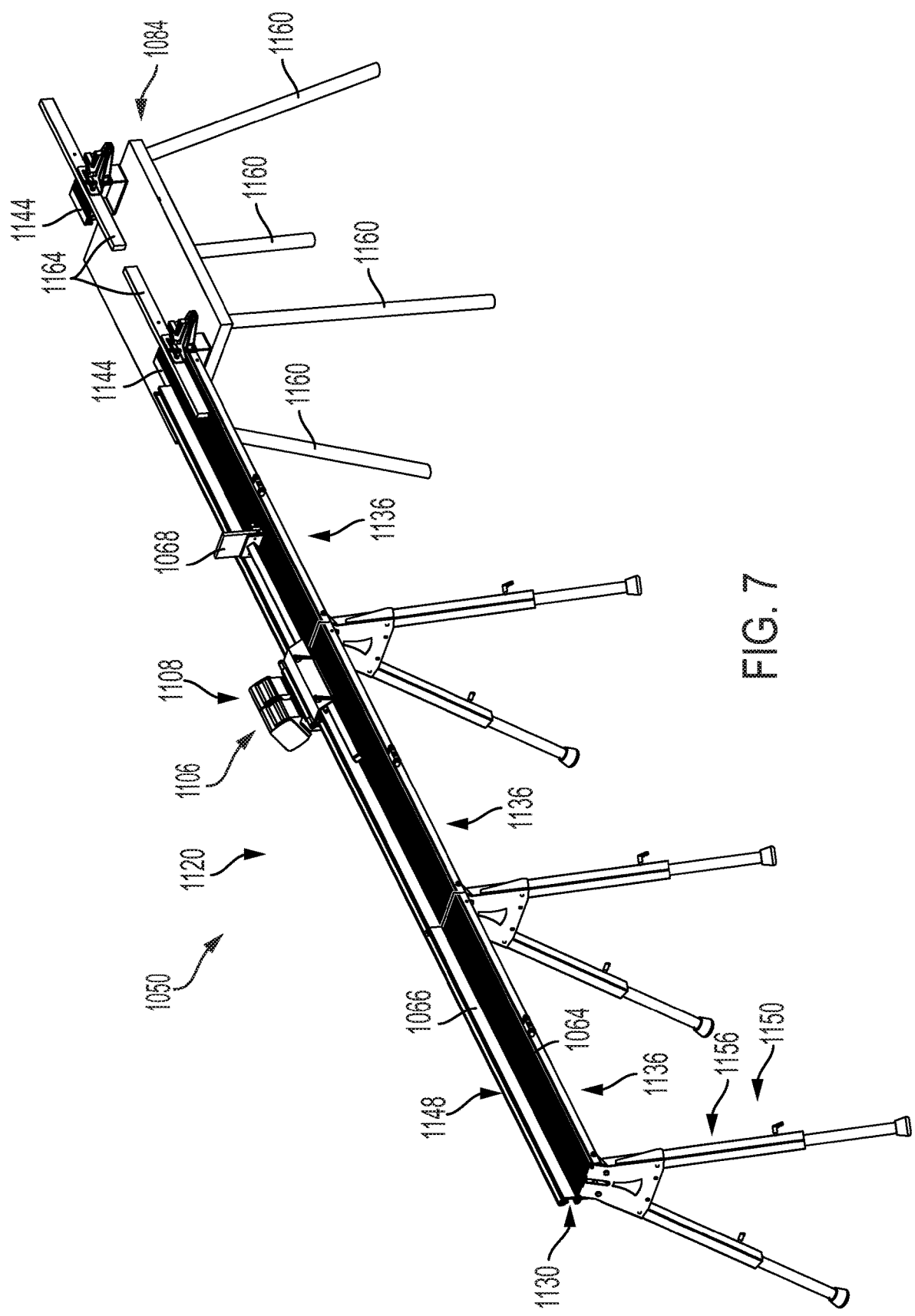

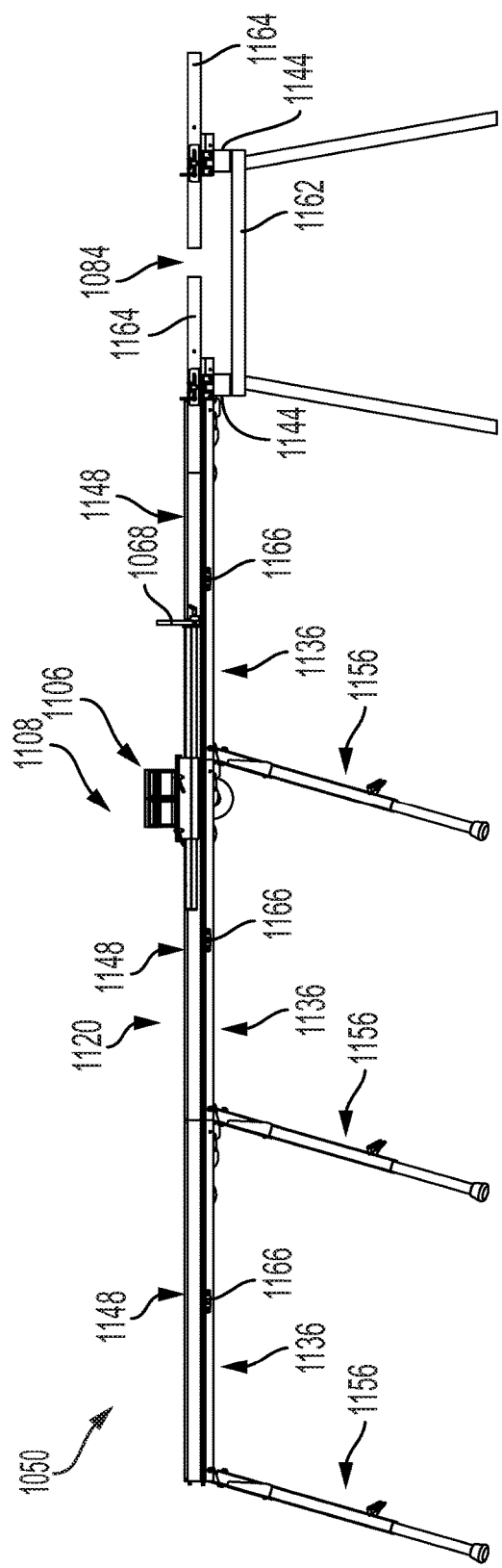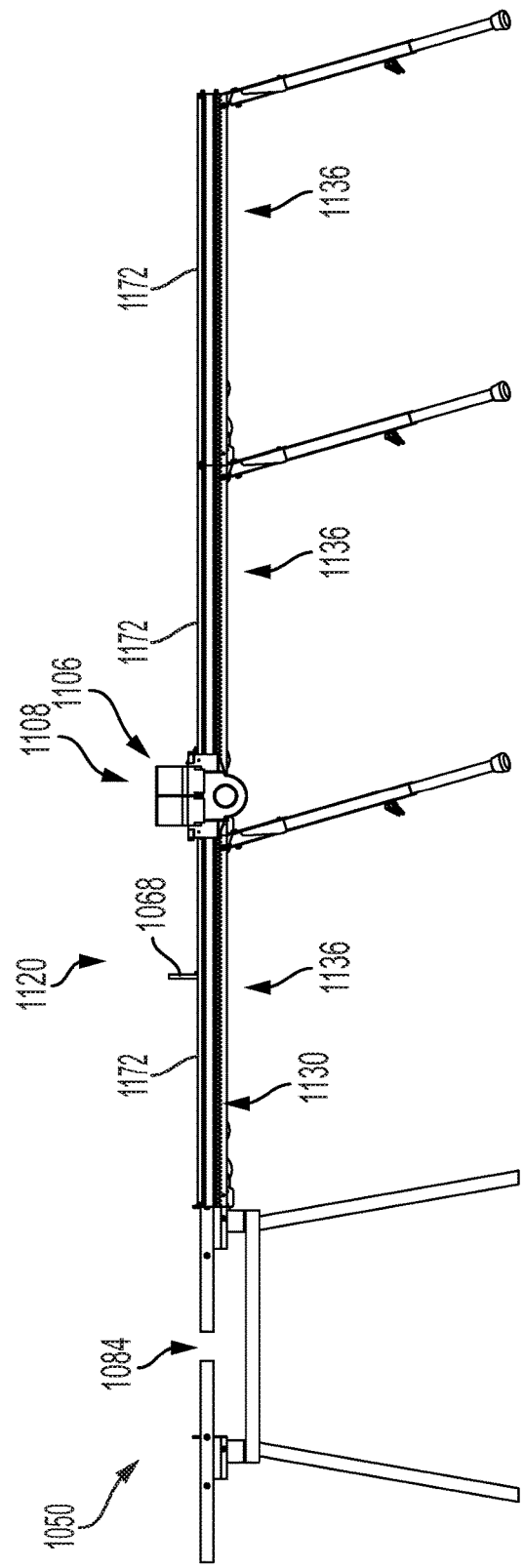

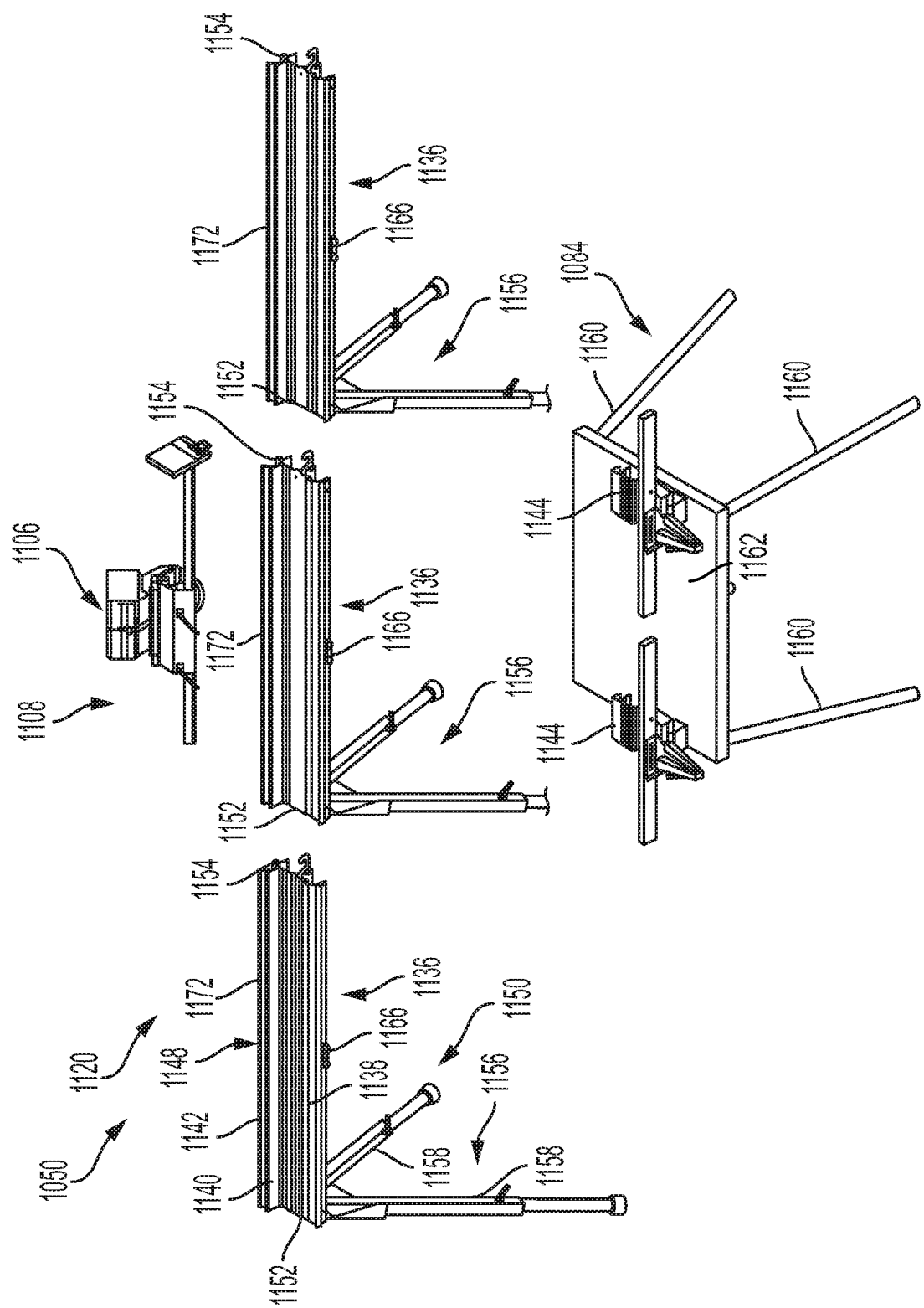

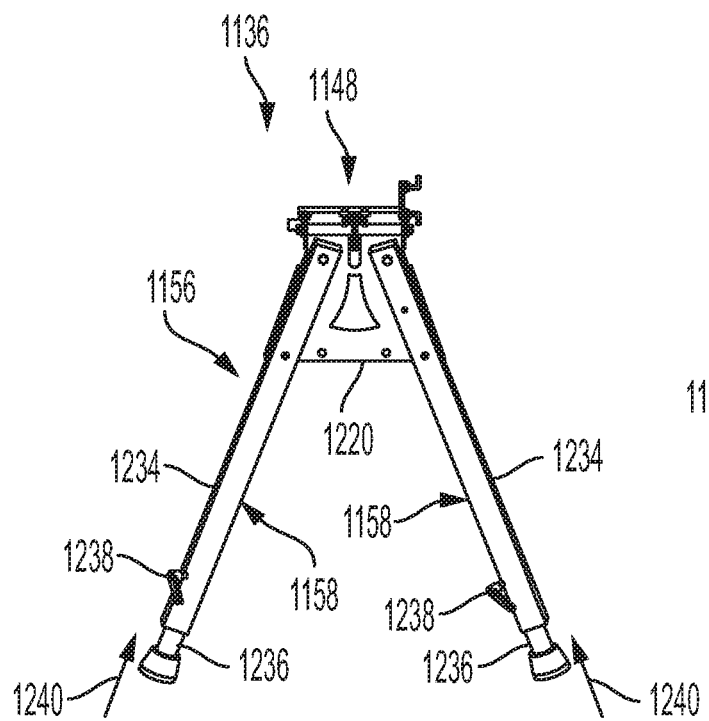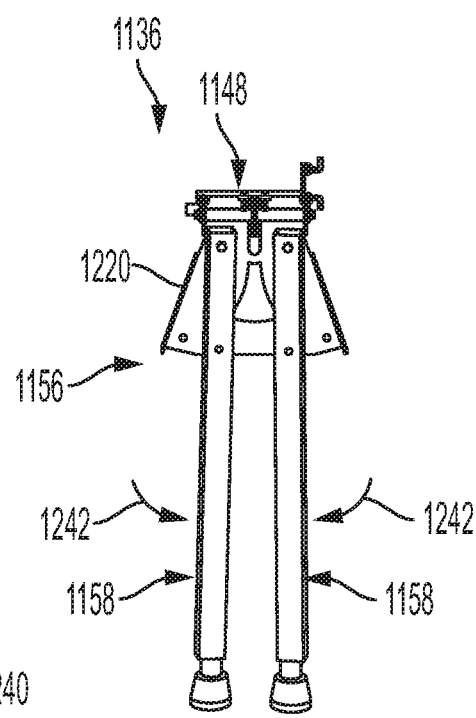
FIG. 28  FIG. 29
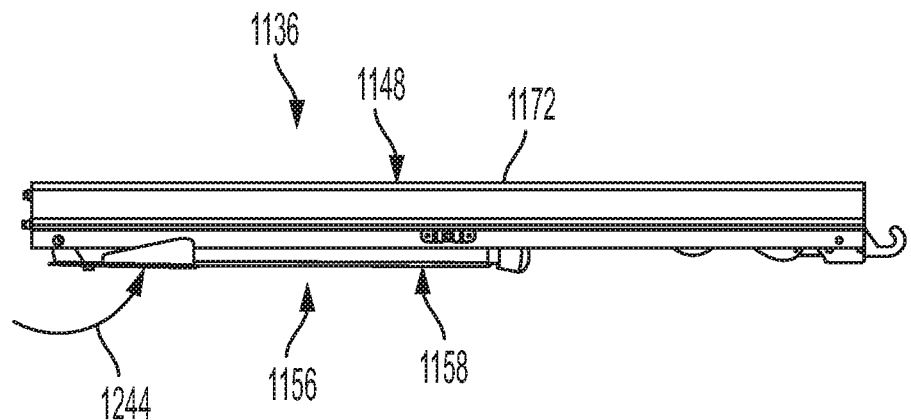
FIG. 30

LINEAR POSITIONER

CROSS-REFERENCE TO PRIORITY APPLICATION

This application is based upon and claims the benefit under 35 U.S.C. § 119(e) of U.S. Provisional Patent Application Ser. No. 62/885,699, filed Aug. 12, 2019, which is incorporated herein by reference in its entirety for all purposes.

CROSS-REFERENCE TO OTHER MATERIAL

This application incorporates U.S. Patent Publication No. 2011/0056344 herein by reference in its entirety for all purposes.

INTRODUCTION

Numerous trades require the ability to cut or otherwise process material to length. For example, siding installation, framing, curtain wall construction, and finish carpentry all require a skilled craftsperson to process material on-site during construction.

Computer-controlled linear positioners are used at job sites to position workpieces, such as pieces of stock lumber, quickly and accurately relative to a processing tool, such as a saw. A stop of these positioners serves as a barrier that contacts a surface of a workpiece to set a distance from the surface to the processing tool. The stop is driven along a linear axis (i.e., a measurement axis) to adjust the distance of the stop from the tool according to a desired processing position on the workpiece, such as a target cutting site for a saw along a piece of stock lumber.

FIG. 1 shows a highly schematic illustration of a workpiece-processing system 50. The system includes a linear positioner 60 and a workpiece-processing tool 62 operatively arranged relative to one another with respect to three mutually orthogonal axes, x, y, and z. The x-axis and y-axis may be horizontal and the z-axis vertical. Linear positioner 60 has workpiece-contacting structures, namely, a z-axis support 64, a y-axis fence 66, and an x-axis stop 68 to contact different surface regions of a workpiece. For example, support 64 can contact an underside of a workpiece, fence 66 can contact a lateral side of the workpiece, and stop 68 can contact an end of the workpiece. This contact determines a position of the workpiece in space along each of the three axes, and aligns the workpiece with the x-axis. Contact with support 64 can arrange the workpiece parallel to the xy-plane, and contact with fence 66 can orient the workpiece in a plane parallel to the xy-plane. Stop 68 is driven along the x-axis, indicated with a motion arrow at 70 and with the stop in phantom at 72. This motion adjusts the distance between stop 68 and a site of action 74 for tool 62, measured parallel to the x-axis, such that the x-axis is the measurement axis of the positioner in this illustration. With an end of a workpiece in contact with stop 68, a distance 76 along the workpiece from the end to site of action 74 is defined.

Linear positioners can have various levels of complexity. More sophisticated versions automate control of the tool and use the stop as a pusher to drive movement of the workpiece toward the tool. These pusher-based systems can, for example, drive the end of a workpiece toward the tool to multiple stopped positions at which workpiece processing is performed, to create multiple products automatically from a single workpiece. For example, pusher-based systems can create a set of products of desired length automatically based on a cut list. In contrast, simpler linear positioners may combine (a) a stop that does not actively push the workpiece and (b) manual control of the tool. With these simpler systems, a user manually may place a workpiece against the stop after the stop has been moved to a desired location, and then manually controls the tool to process the workpiece.

Linear positioners improve efficiency and accuracy, thereby saving time and money. Accordingly, many craftspeople would benefit from the use of linear positioners. However, the common need to move frequently to different job sites can make a linear positioner less attractive. Craftspeople often opt not to invest in linear positioners due to a lack of portability, high cost, large size, complexity of use, lack of functionality, and/or difficulty to assemble and/or maintain. Therefore, improved linear positioners and positioning methods are needed that are more portable, less expensive, more compact, less complex, more functional, and/or more user-friendly to assemble, operate, reconfigure, and/or service.

SUMMARY

The present disclosure provides systems, methods, and apparatus for positioning and/or processing items, such as workpieces. The systems, methods, and apparatus may include or use a linear positioner forming a track. In some embodiments, the linear positioner may include a carriage configured to be driven along the track to a desired position, in response to a signal(s), such as a radiofrequency signal(s), received from a computer, which may be a general-purpose, handheld computer, such as a phone or tablet. In some embodiments, the linear positioner may comprise a shuttle including a motor and a carriage. The shuttle may be configured to drive itself as a unit along the track. In some embodiments, the track may include a rack having a linear array of teeth formed by two or more frame sections, such as table sections, coupled end to end, with each frame section providing a segment of the rack.

BRIEF DESCRIPTION OF THE DRAWINGS

FIG. 3 is a schematic top view of another exemplary workpiece-processing system including another exemplary linear positioner, taken while the system is processing a piece of stock lumber.

FIG. 4 is a view of a shuttle of the linear positioner of FIG. 3 taken in isolation.

FIG. 5 is a view of an embodiment of the system of FIG. 3, where the tool is a miter saw.

FIG. 6 is a fragmentary view of the system of FIG. 5 taken from a different direction.

FIG. 7 is a view of the system of FIG. 5 showing a positioning system including a linear positioner attached to a tool stand, after removal of the miter saw.

FIG. 9 is a front view of the positioning system of FIG. 7, taken at elevation.

FIG. 10 is a back view of the positioning system of FIG. 7, taken at elevation.

FIG. 11 is an exploded view of the positioning system of FIG. 7.

FIGS. 28-30 are views of the table section of FIGS. 26 and 27 taken as the table section is collapsed from a deployed configuration to a collapsed storage configuration.

DETAILED DESCRIPTION

Figure 1:
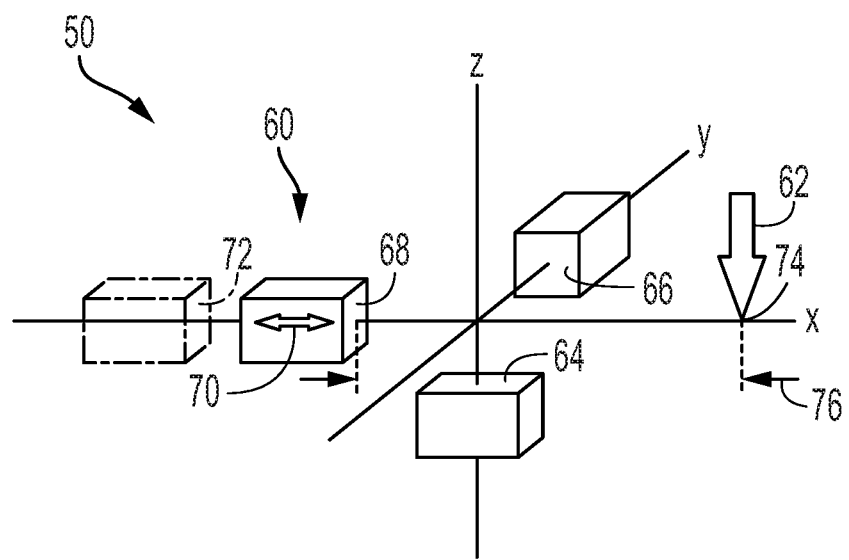
FIG. 1 is a highly schematic view of a workpiece-processing system including a linear positioner for positioning a workpiece with respect to a workpiece-processing site (a site of action) defined by a tool, with workpiece-contacting positioning structures of the positioner arranged on respective x, y, and z axes.

The present disclosure provides systems, methods, and apparatus for positioning and/or processing items, such as workpieces. The systems, methods, and apparatus may include or use a linear positioner forming a track. In some embodiments, the linear positioner may include a carriage configured to be driven along the track to a desired position, in response to a signal(s), such as a radiofrequency signal(s), received from a computer, which may be a general-purpose, handheld computer, such as a phone or tablet. In some embodiments, the linear positioner may comprise a shuttle including a motor and a carriage. The shuttle may be configured to drive itself as a unit along the track. In some embodiments, the track may include a rack having a linear array of teeth formed by two or more frame sections, such as table sections, coupled end to end, with each frame section providing a segment of the rack.

In some embodiments, the linear positioner may include an actuator having a motor to drive a carriage along a track. The actuator may be configured to receive a command sent by wireless communication from a computer using radiofrequency signals, or the actuator may have a wired connection to the computer. The computer provides a user interface, and in some cases may be a general-purpose, handheld computer, such as a personal digital assistant (PDA) device (e.g., a phone (i.e., a "smartphone") or a tablet). Applications stored in memory of the computer to control the actuator may, for example, be written by third parties using an application interface. The applications thus can be tailored for particular industries, projects, and/or procedures, making the linear positioner more versatile, user-friendly, and effective. The applications may be available from an online store, and the user may download the most suitable application to the computer from the online store.

In some embodiments, the linear positioner may comprise a shuttle including a motor and a stop. The shuttle may be configured to travel as a unit along the track. The shuttle may be self-propelling, and may be self-powered via at least one onboard battery. The at least one onboard battery may be a rechargeable battery and may supply DC power to the motor, which may be a DC motor. Alternatively, or in addition, the shuttle may be powered by an AC power supply (e.g., by the power grid or by an AC generator). The linear positioner may convert the AC power to DC power for use with a DC motor of the shuttle.

In some embodiments, the linear positioner may include a frame formed by a variable number of frame sections. The frame may provide a table composed of the frame sections (i.e., table sections). The frame sections may be coupled to one another end to end and secured, such as with a latch, which may be a draw latch. Each frame section may include a single-piece (integrally formed) deck member, and the deck member may provide a segment of a deck, a segment of a fence, and/or a segment of a track along which a carriage travels.

In some embodiments, the linear positioner may include a track that is elongated parallel to a fence and formed by a plurality of removable track segments, and a carriage for the stop may be configured to travel on the track. The track may include a rack having a linear array of teeth, and the actuator may include a gear that meshes with the rack.

Further aspects of the present disclosure are presented in the following sections: (I) system and method overview, (II) examples, and (III) selected aspects.

I. SYSTEM AND METHOD OVERVIEW

Figure 2:
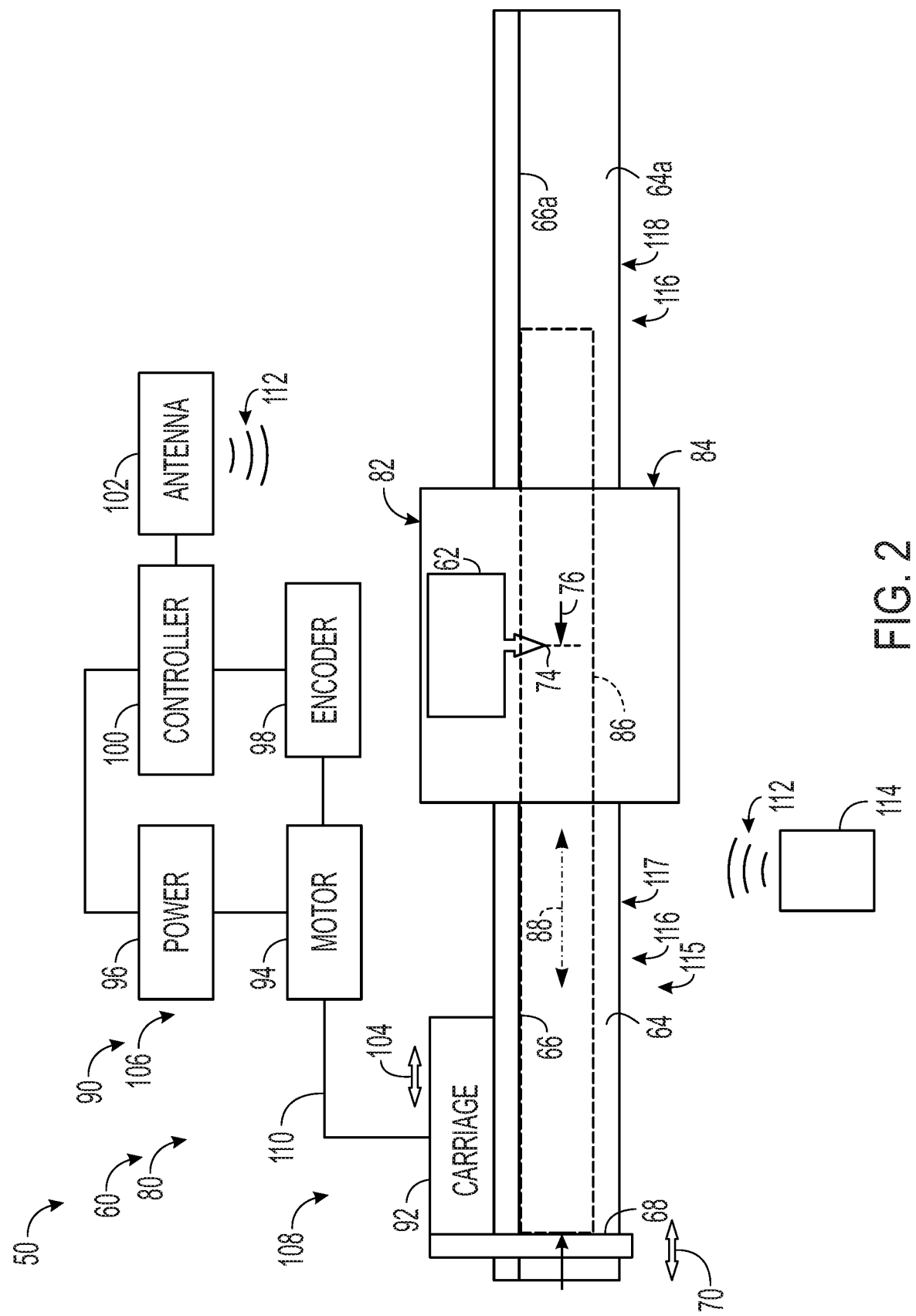
FIG. 2 is a schematic top view of an exemplary workpiece-processing system including an exemplary linear positioner.

This section provides an overview of the systems and methods of the present disclosure; see FIGS. 2-4.

FIG. 2 shows a schematic top view of an exemplary workpiece-processing system 50 including an exemplary embodiment 80 of a linear positioner 60, a workpiece-processing station 82 including a workpiece-processing tool 62 supported by a stand 84, and an elongate workpiece 86 (also see FIG. 1). Workpiece 86 is shown dashed and has an underside in contact with a support 64 (e.g., a provided by a frame), a lateral side in contact with a fence 66, and an end in contact with a stop 68. The long axis of workpiece 86 is parallel to fence 66 and a measurement axis 88 of the system, but in other cases, a different characteristic axis of the workpiece may be arranged parallel to measurement axis 88.

Any suitable tool 62 may be present in workpiece-processing system 50 to process workpieces. Exemplary tools that may be suitable include a saw, drill, shear, punch, router, notcher, riveter, printer (e.g., a 3D printer), sprayer, embosser, sander, insertion tool (such as to drive fasteners), assembler, former, bender, or any combination thereof, among others.

Workpiece 86 may have any suitable structure and composition. The workpiece may be elongate and may be a piece of stock. In cross-section, the workpiece may have a uniform or varying shape along its length. Suitable cross-sectional shapes include simple shapes (e.g., polygonal (such as rectangular), elliptical (such as circular), or the like) or complex shapes. Workpieces may be formed of any suitable material, such as wood, metal, plastic, fabric, cardboard, paper, glass, ceramic, or a combination thereof, among others. The composition may be generally uniform or may vary in different regions of a workpiece. Exemplary workpieces are pieces of stock, such as moldings, framing, pipes, tubes, rods, sheets, boards, panels, bars, mill work, fenestration, etc.

Linear positioner 80 has an actuator 90 (interchangeably called a drive system) to drive stop 68 along measurement axis 88 to a desired distance 76 from site of action 74 for tool 62 or other target site. Actuator 90 may include any combination of a carriage 92 connected (or connectable) to stop 68, a motor 94, a power supply 96 (interchangeably called a power source), an encoder 98, a controller 100, and at least one antenna 102.

Motor 94 may be a rotary motor or a linear motor. The motor may be an AC motor or a DC motor. In some embodiments, the motor may be a brushless rotary DC motor.

Translational motion 70 of stop 68 along measurement axis 88 may be coupled to translational motion 104 of carriage 92 parallel to the same axis. Operation of motor 94 may drive translational motion 104 of carriage 92, which in turn drives translational motion 70 of stop 68. A housing of motor 94 may be mounted firmly to carriage 92 such that operation of the motor drives both the motor and the carriage translationally as a unit, parallel to measurement axis 88. The linear positioner thus may include a carriage assembly 106 that travels as a unit via translational motion 104 and/or rotational motion, among others. Carriage assembly 106 may include any combination of motor 94, power supply 96, encoder 98, controller 100, and antenna 102. Carriage assembly 106 and stop 68 may be provided by a shuttle 108, where the shuttle is self-propelling and, optionally, self-powered using an onboard power supply. In some embodiments, shuttle 108 may be powered by a wired connection to a power supply that remains stationary as the shuttle moves along measurement axis 88.

In other embodiments, operation of motor 94 may drive motion 104 of carriage 92 while the location of motor 94 (e.g., as defined by a housing thereof) remains fixed. For example, motor 94 may have a shaft that rotates when the motor is operated, and the shaft may be coupled to carriage 92, indicated at 110, by any suitable linkage, such as a leadscrew, a belt, at least one gear, a rack, at least one pulley, or a combination thereof, among others.

Power supply 96 may provide power to motor 94, encoder 98, controller 100, and/or antenna 102. The power may be AC power (e.g., grid or generator power), DC power (e.g., one or more batteries), or a combination thereof, among others. In some embodiments, the user may have the option of choosing whether to use an AC power supply or a DC power supply, and the actuator may include an AC to DC converter.

Encoder 98 may report operation of motor 94 or travel of carriage 92, among others, which may be used to infer changes in the position of stop 68 along measurement axis 88. The encoder may be a rotary encoder or a linear encoder. The encoder may, for example, generate output signals representing rotation or angular position of a shaft of motor 94.

Controller 100 may manage operation of motor 94 and the transmission of power from power supply 96 to the motor. The controller also may receive output signals from encoder 98, to form a feedback loop with the motor and the encoder for moving stop 68 accurately and efficiently to each desired position along measurement axis 88, at each desired distance from site of action 74 for tool 62. Controller 100 may transmit and receive radiofrequency (RF) signals 112 via at least one antenna 102.

Operation of linear positioner 80, particularly operation of motor 94 through controller 100, may be controlled by a computer 114. The computer may or may not be a dedicated device, and may communicate with controller 100 via a wired connection or wirelessly. In the depicted embodiment, computer 114 is a portable, third-party, general-purpose computer, which may be a handheld device (e.g., a phone or tablet or other PDA-like device), and communicates with controller 100 wirelessly through antenna 102 using RF signals 112. Controller 100 and computer 114 may be configured to communicate via any suitable communication technologies or protocol. Exemplary technologies that may be suitable include Wireless Personal Area Network (WPAN) technologies, such as Bluetooth, IrDA, Zigbee, wireless USB, or the like. Other technologies that may be suitable include Wi-Fi, near-field communication, etc.

Computer 114 may run a positioner application downloaded from the internet, to enable communication with and control of linear positioner 80. The application may provide a graphical user interface for the user and may be written specifically for the purpose of controlling a linear positioner.

Linear positioner 80 includes a frame 115. The frame 115 may comprise at least one table 116, such as a left worktable 117 and/or a right worktable 118, either or both of which may provide support 64 and/or fence 66. Here, left worktable 117 functions as an inlet table and includes support 64 and fence 66. Right worktable 118 functions as an outlet table and includes an auxiliary support 64a and an auxiliary fence 66a, which may be substantially coplanar with support 64 and fence 66, respectively. Each table 116 may be attached to processing station 82, such as to stand 84 thereof. Either left worktable 117 or right worktable 118 may be connected to stop 68 via carriage 92, to support the carriage and the stop as they travel together along the left or right worktable. In the depicted configuration, carriage 92 and stop 68 are coupled to left worktable 117, which may be a more ergonomic configuration for a right-handed user who is located in front of left worktable 117 and/or stand 84, but may be connected instead to right worktable 118 for the ergonomic benefit of a left-handed user located more to the right. However, other frame/table configurations may be suitable, such as a front worktable and a rear worktable, only a front worktable, or only a rear worktable, among others. Each table, at any position in the linear positioner, may have an adjustable length or a non-adjustable (fixed) length, and an adjustable height or a fixed height.

FIG. 3 shows an exemplary workpiece-processing system 50 including another exemplary linear positioner 120, and FIG. 4 shows a shuttle 108 of positioner 120 in isolation. A workpiece 86 is being supported and oriented by positioner 120. Positioner 120 may have any suitable combination of the components and features described above for linear positioners 60 and 80, such as a workpiece-processing station 82 comprising a workpiece-processing tool 62 and a stand 84 to support tool 62.

Shuttle 108 may be self-contained (i.e., self-propelling and self-powered), and may include a stop 68 and a carriage assembly 106. Here, the carriage assembly 106 is a self-contained actuator 90 and may have a carriage 92, a motor 94, a power supply 96 (at least one battery 122), an encoder 98, a controller 100, and an antenna 102 (as described above for linear positioner 80). The carriage assembly also may have a gear 124 that is rotated, indicated at 126, by operation of motor 94 to drive translational motion 128 of shuttle 108 along a longitudinal track 130 of positioner 120 (see FIGS. 3 and 4). The axis of rotation of gear 124 may be orthogonal to measurement axis 88 of linear positioner 120. Shuttle 108 is shown in phantom outline 132 at a different axial position along a fence 66 after translational motion 128 of the shuttle as a unit in response to a command (see FIG. 3). The command may be communicated wirelessly by a computer 114 via RF signals 112. Computer 114 is a phone 134 in the depicted embodiment.

Linear positioner 120 has a frame 115 including at least one table 116, such as a left worktable 135a and/or and a right worktable 135b, as described above for linear positioner 80 of FIG. 3. Left worktable 135a is being used here to support travel of shuttle 108 parallel to measurement axis 88 and provides a horizontal support 64 for workpiece 86, which may be described as a deck, and fence 66, each elongated parallel to measurement axis 88. Left worktable 135a may be composed of a variable number (i.e., 1, 2, 3, 4, etc.) of frame sections or table sections 136, such as the three table sections indicated at 137a, 137b, and 137c, to give the worktable an adjustable length. Each table section 136 may provide a respective deck segment 138 of support 64, a respective fence segment 140 of fence 66, and a respective track segment 142 of track 130. Accordingly, support 64, fence 66, and track 130 each may be formed collectively, with each collective length corresponding to that of table 116. Similarly, right worktable 135b may be composed of a variable number (i.e., 1, 2, 3, 4, etc.) of table sections 136, such as the table sections indicated at 137d, 137e, to give the worktable an adjustable length. Table sections 137a-137e may be substantially identical to one another and thus interchangeable. The length of each table section 136, measured parallel to measurement axis 88, may, for example, be at least about 24, 30, 36, or 42 inches (which is at least about 0.7, 0.76, 0.91, or 1.07 meters), and/or less than about 48, 54, 60, 66, or 72 inches (which is less than about 1.22, 1.37, 1.52, 1.68, or 1.83 meters), among others. Each table 116 may be attached to tool stand 84 using a respective bracket 144.

Further exemplary aspects of the linear positioners of this section are described elsewhere herein, such as in Sections II and III.

The present disclosure provides methods of positioner assembly, workpiece/item positioning, and/or workpiece processing. The following steps may be performed in any suitable order and combination using any of the systems and/or linear positioners disclosed herein.

A value for a dimension corresponding to a desired position for processing along a workpiece may be obtained.

The value may be obtained by measuring a dimension (e.g., of a wall) with a measuring device, such as a tape measure or an electronic measuring device, or by calculation, among others.

The value may be received by a computer. For example, the value may be inputted to the computer manually by a user, received at the computer from an electronic measuring device, created by computation within the computer, or the like.

The computer may process the value to generate a suitable command for the positioner to move a stop thereof to a position corresponding to the value.

The command may be communicated to a controller of the positioner. This communication may be via a wired connection or using radiofrequency signals. The controller may control operation of a motor of the positioner, to execute the command, such that a stop of the positioner moves to a desired position along an axis that is specified by the command.

A user may place a workpiece into contact with the positioner. The workpiece may contact a support and a fence, which collectively orient the workpiece parallel to an axis along which the stop travels. The workpiece may be placed against the stop before or after the stop moves to the location along the axis. A tool may process the workpiece while the workpiece is in contact with the stop.

A linear positioner may be assembled by a user. The user may form a table (interchangeably called a worktable or bench) from a plurality of table sections. The table sections may be coupled to one another axially and then optionally secured separately, such as with a latch. The table may be leveled by adjusting a height of each table section. A first table section may be attached to a tool stand, and the length may be increased by successively coupling additional table sections.

II. EXAMPLES

The following examples describe further aspects of the workpiece-processing systems, linear positioners, and methods of making and using the workpiece-processing systems and linear positioners. These examples are intended for illustration only and are not intended to limit the entire scope of the present disclosure.

Example 1. Saw System with Linear Positioner

This section describes an exemplary workpiece-processing system 1050; see FIGS. 5-43 (also see FIGS. 2-4).

FIGS. 5 and 6 show workpiece-processing system 1050 having a linear positioner 1120 operatively connected to a miter saw 1146, which is supported by a stand 1084. The miter saw is a tool 1062 of a processing station 1082 of the workpiece-processing system.

Linear positioner 1120 is shown including a frame 1115 forming only one table 1116, namely, a segmented left worktable 1135 (compare with FIGS. 2 and 3). Worktable 1135 includes a deck 1064 to support a workpiece and contact an underside of the workpiece, a fence 1066 to orient the workpiece on deck 1064 by contact with a lateral side of the workpiece, and a track 1130. Each of deck 1064, fence 1066, and track 1130 is elongated parallel to the same axis, namely, the long axis of worktable 1135 (which is parallel to the measurement axis).

In the depicted embodiment, left worktable 1135 is composed of three frame sections or table sections 1136 but any suitable number of discrete table sections 1136 may be present and coupled to one another, or left worktable 1135 may be replaced with a right worktable or a front/rear worktable, among others.

Linear positioner 1120 also comprises a shuttle 1108 connected to worktable 1135 at track 1130. The shuttle includes a carriage assembly 1106 connected to a stop 1068. Shuttle 1108 is driven along the long axis of track 1130, to move stop 1068 to each desired distance from a site of action of miter saw 1146.

FIGS. 7-11 show workpiece-processing system 1050 with miter saw 1146 removed (compare with FIGS. 5 and 6). Each table section 1136 of linear positioner 1120 has a top portion 1148 and a leg portion 1150 (see FIGS. 7, 9, and 11).

Top portion 1148 includes a deck member 1172, which may be formed as a machined extrusion (see FIG. 11). Each top portion 1148 (and/or deck member 1172) may provide a deck segment 1138 of deck 1064, a fence segment 1140 of fence 1066, and a track segment 1142 of track 1130 (see FIGS. 7 and 11). Each of segments 1138, 1140, and 1142 of deck member 1172 may be elongated parallel to the long axis of deck member 1172, and may be formed integrally with one another as described further below.

Leg portion 1150 may include one or more legs. In the depicted embodiment, leg portion 1150 is located at only an outer end 1152 (farther from processing station 1082) of the opposite axial ends 1152, 1154 of top portion 1148 (see FIG. 11). (Inner/inward is closer to processing station 1082 and tool stand 1084 and outer/outward is farther from processing station 1082 and tool stand 1084.) Leg portion 1150 may be provided by a leg assembly 1156 including one or more legs 1158. The leg assembly may include a pair of legs 1158, as shown, which may be connected to one another independently of top portion 1148.

Inner end 1154 of each top portion 1148 may be supported by leg portion 1150 of an inwardly adjacent table section 1136 or by tool stand 1084 (see FIG. 11). For example, inner end 1154 of the outermost table section 1136 may be firmly attached to outer end 1152 of the middle table section 1136 for support by leg assembly 1156 of the middle table section 1136. In contrast, inner end 1154 of the innermost table section 1136 may be firmly attached to a bracket 1144, which in turn may be firmly attached to tool stand 1084, for support by legs 1160 thereof. In other embodiments, each of the opposite axial ends of top portion 1148 may be connected to at least one respective leg 1158 or a respective pair of legs 1158, and/or at least one leg 1158 may be located centrally along the length of top portion 1148. Accordingly, each table section 1136 may be completely self-supporting (e.g., having one or more legs, such as a pair of legs, at both ends, or one or more legs located centrally along the table section), or may be self-supporting at only one end of the table section 1136, among others.

Figure 8:
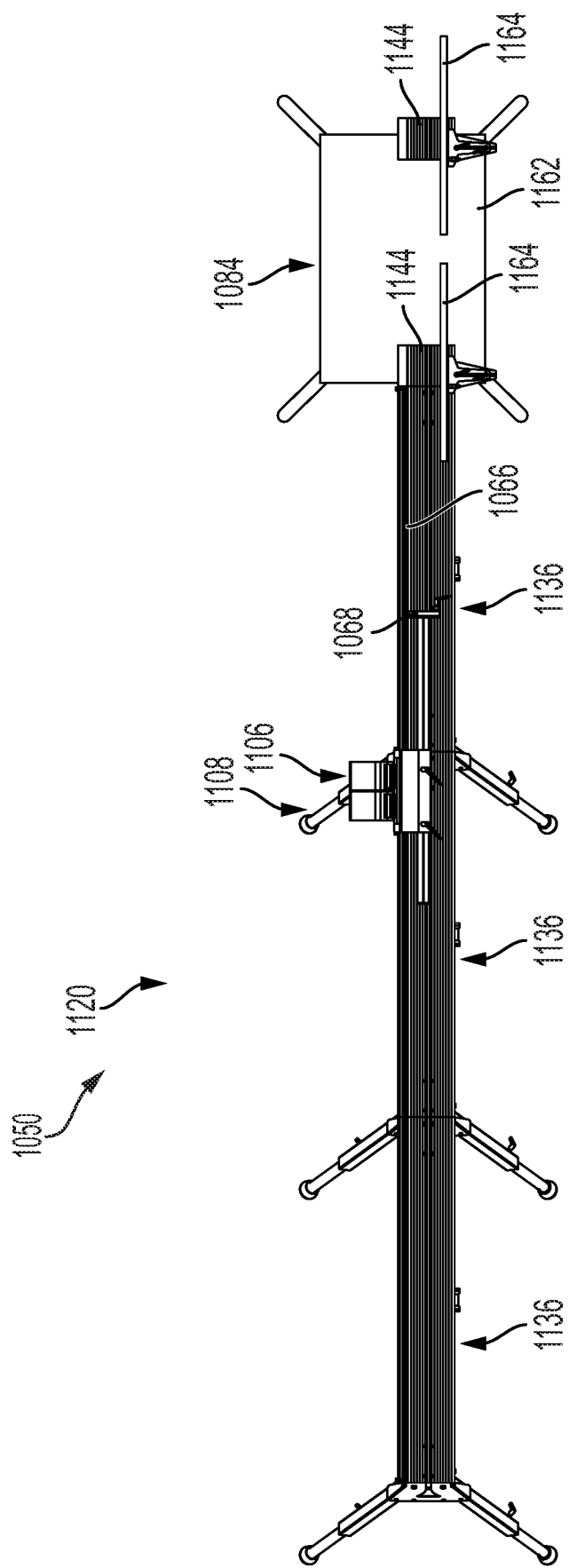
FIG. 8 is a top view of the positioning system of FIG. 7.

Stand 1084 may include a tabletop 1162 supported by legs 1160 (see FIGS. 8 and 11). Each bracket 1144 may be mounted to tabletop 1162 (see FIG. 8). A front fence member 1164 may be connected to each bracket 1144 and may be adjustably positioned to provide a front barrier to frontward movement of workpieces off brackets 1144. Fence member 1164 may be laterally offset frontward from fence 1066 of linear positioner 1120, such that fence 1066 is located behind a workpiece being processed, while fence member 1164 is located in front of the workpiece.

Each table section 1136 may include a level indicator 1166 (see FIG. 9) and/or a handle. The level indicator may be located on a front side of top portion 1148, such as on the front side of a deck member 1172 thereof.

Figure 12:
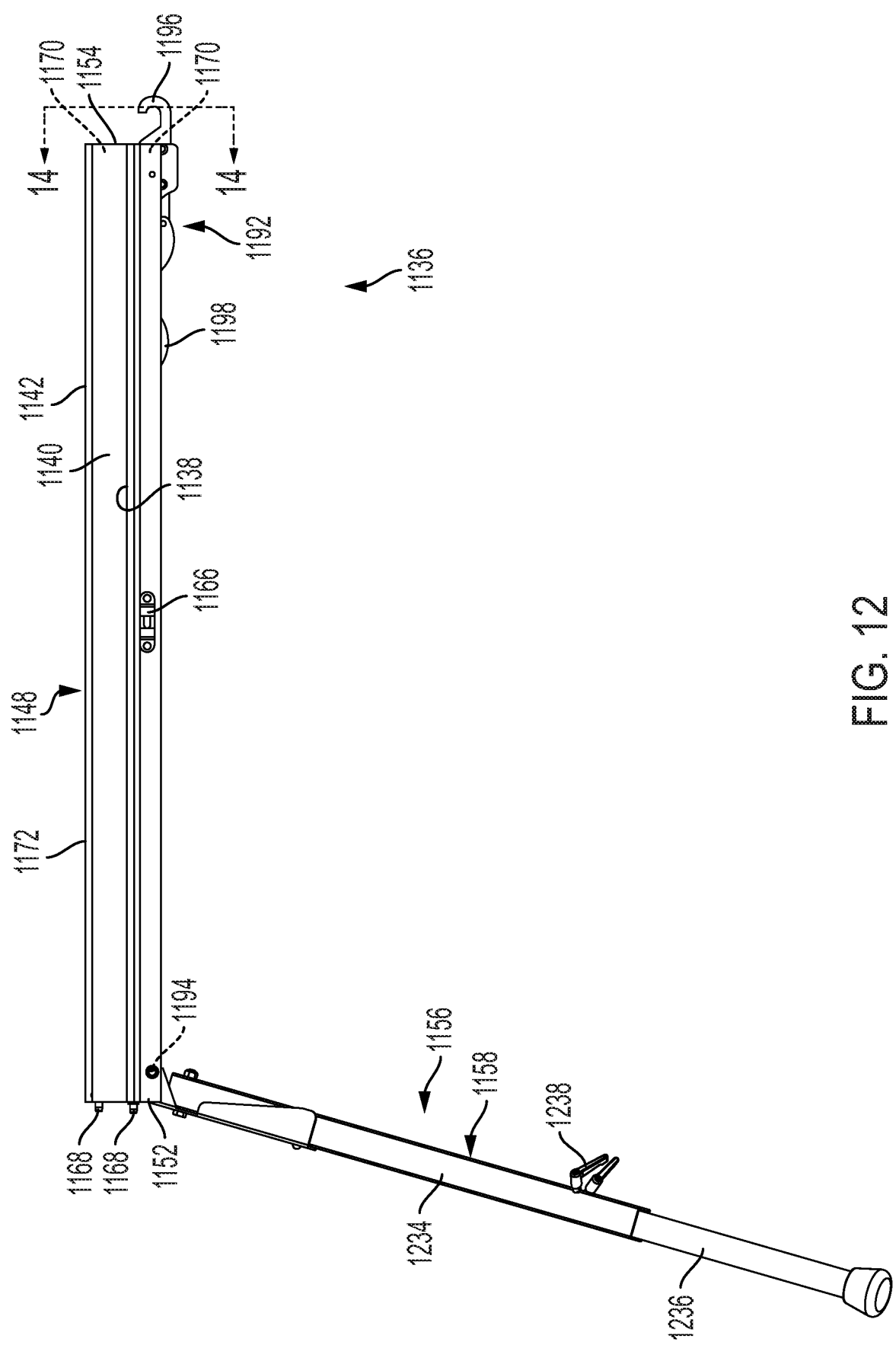
FIG. 12 is a front view of a table section of the linear positioner of FIG. 7, taken at elevation and in isolation.
Figure 13:
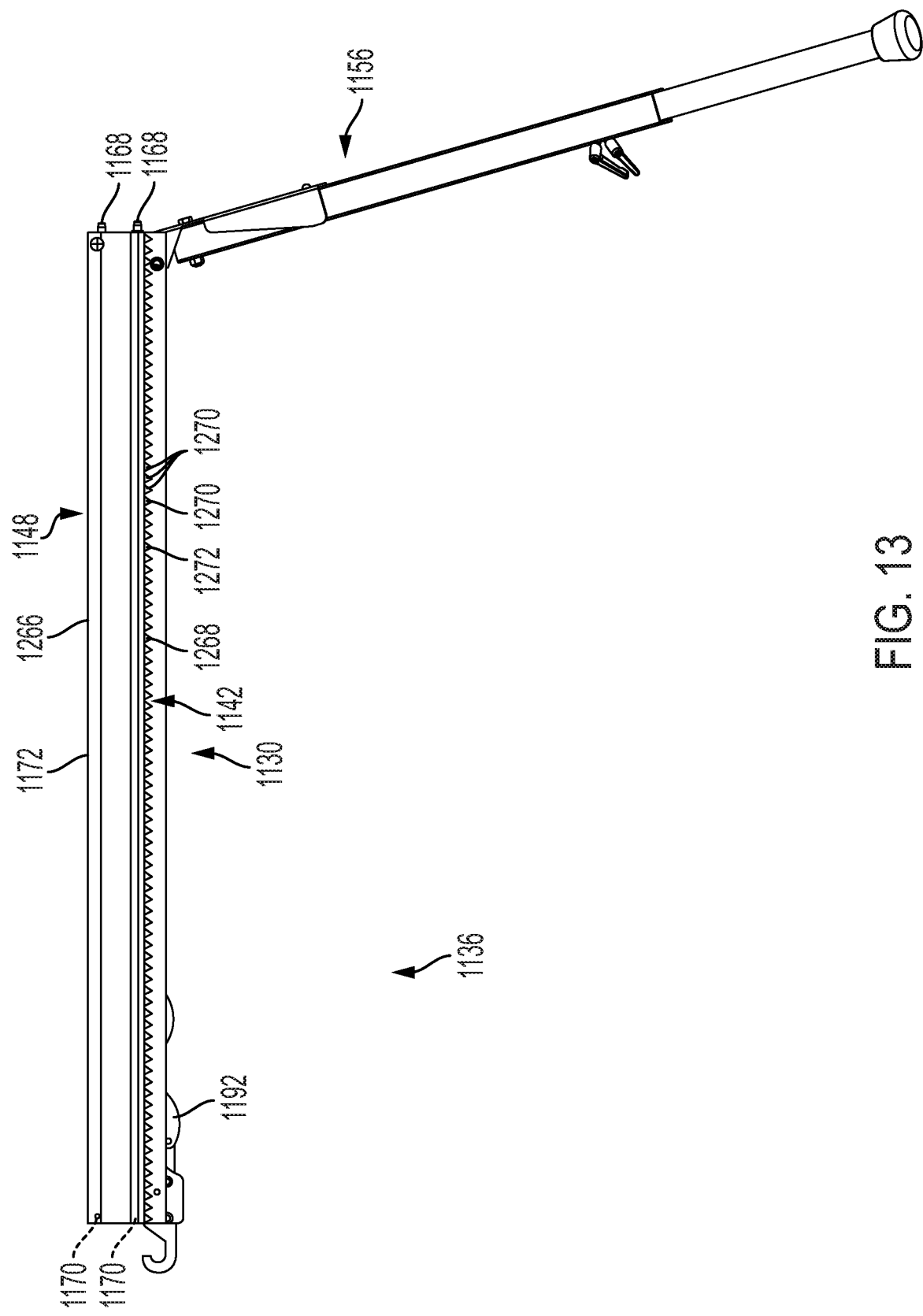
FIG. 13 is a back view of the table section of FIG. 12, taken at elevation.
Figure 14:
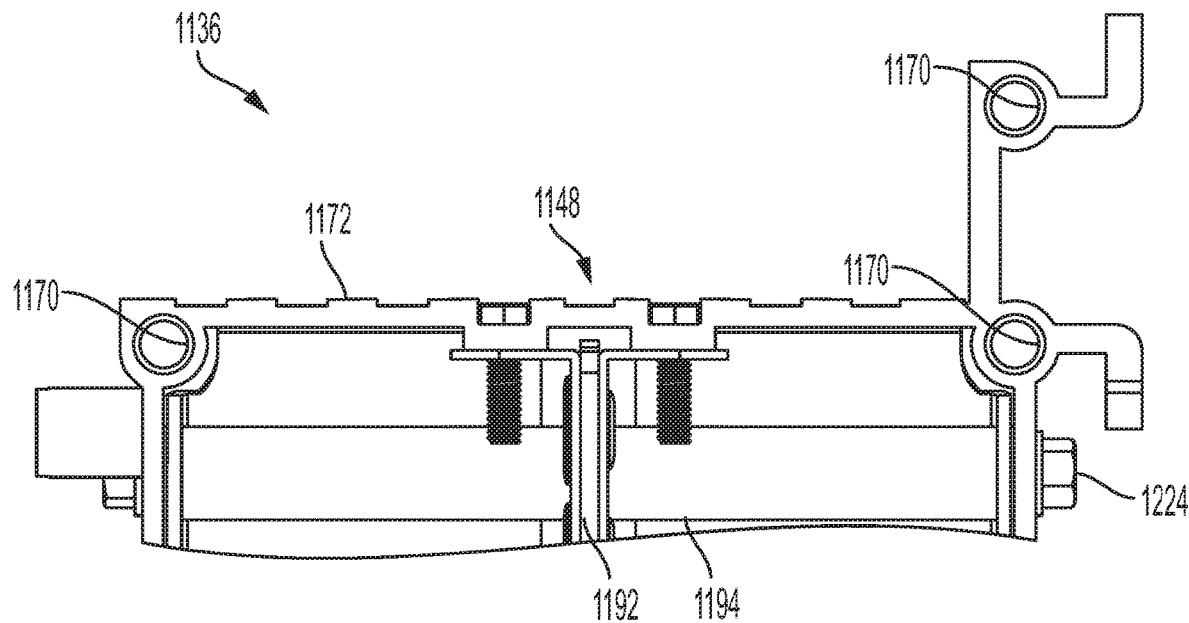
FIG. 14 is a fragmentary view of an inner end of a table section from the linear positioner of FIG. 7.
Figure 15:
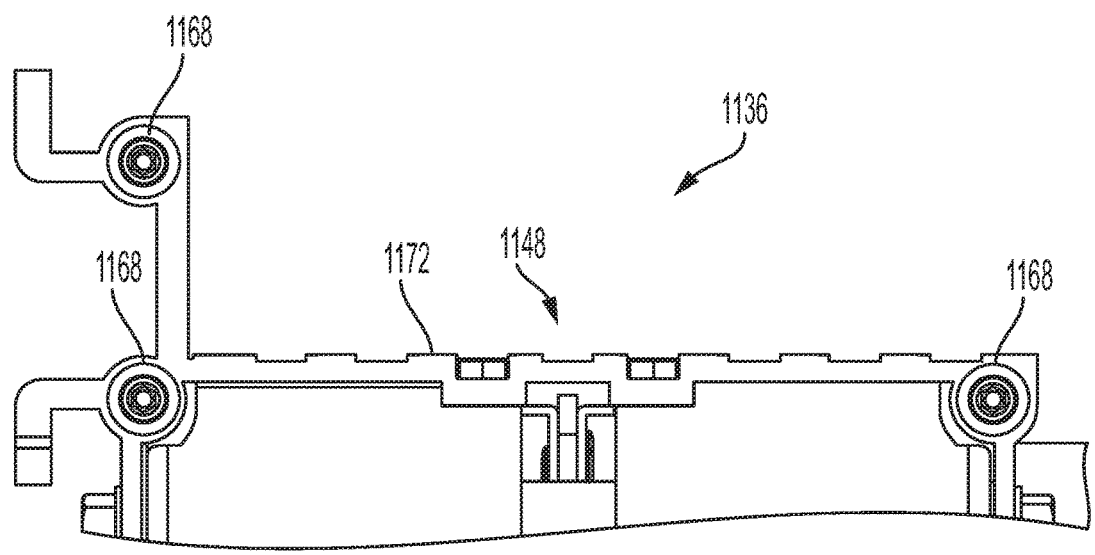
FIG. 15 is a fragmentary end view of an outer end of a table section located inwardly adjacent to the table section of FIG. 14, from the linear positioner of FIG. 7.
Figure 16:
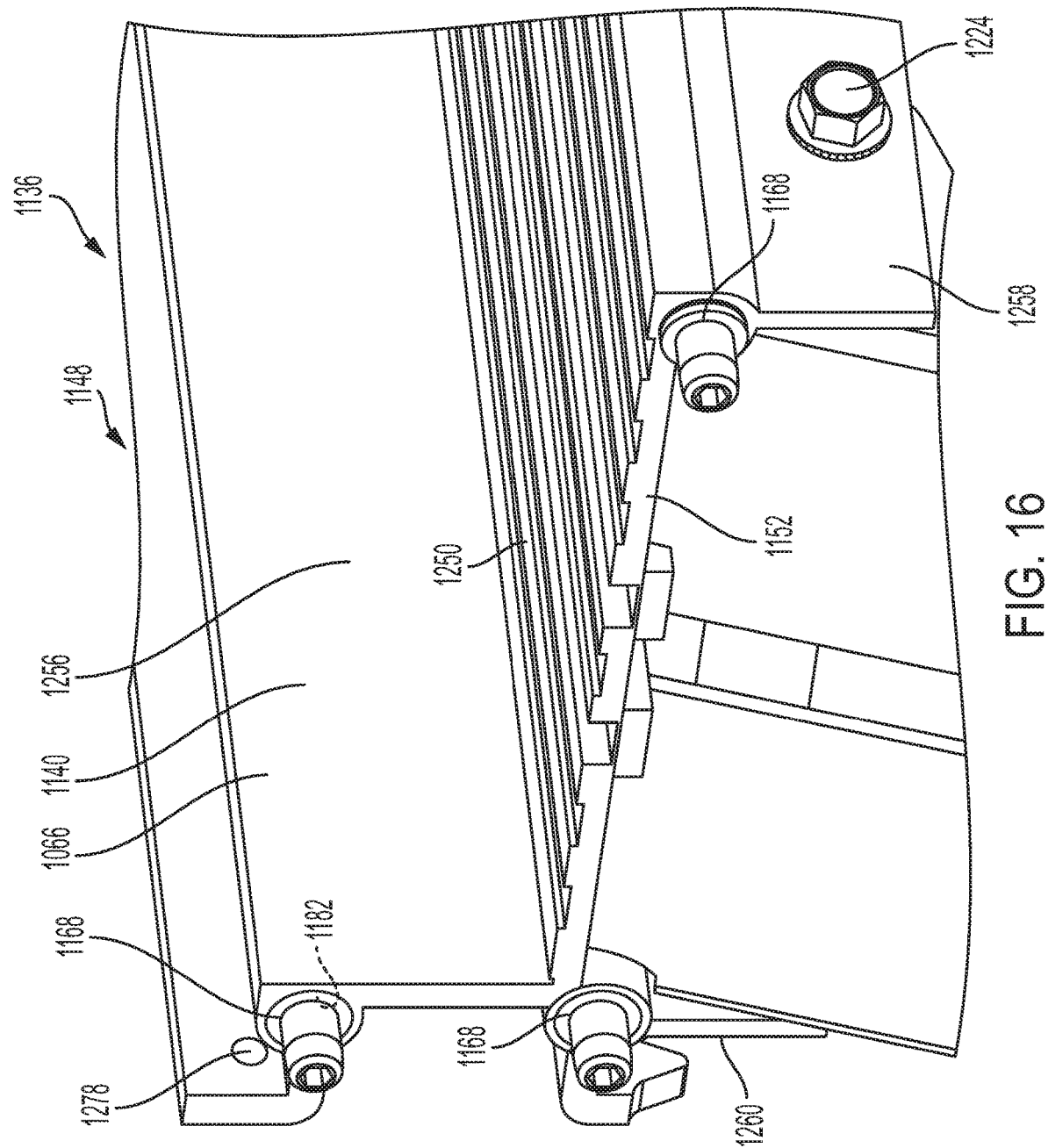
FIG. 16 is a fragmentary view of an end region of the table section of FIG. 15.
Figure 17:
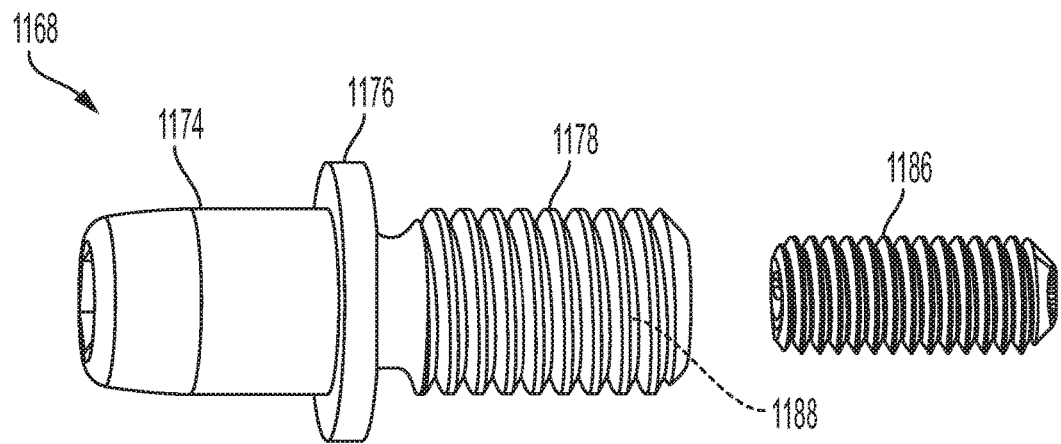
FIG. 17 is an exploded view of a pin and set screw located at the end of the table section of FIG. 16.

FIGS. 12 and 13 show a table section 1136 in isolation viewed from in front and behind, respectively. The table section is configured to be coupled to another table section 1136 at either end by fitting together corresponding inter-fitting structures of adjacent top portions 1148 of the table sections 1136. These structures may include protrusions and recesses that fit together (e.g., axially, parallel to measurement axis 88 and/or the long axis of worktable 1135; see FIGS. 2, 3, and 5), to prevent motion of the table sections 1136 relative to one another in a plane orthogonal to the long axis and/or parallel to the long axis. In the depicted embodiment, the inter-fitting structures include a plurality of pins 1168 (such as three) that fit into correspondingly-sized holes 1170 defined by deck member 1172 of top portion 1148 (see FIGS. 14 and 15). In other cases, the pins may fit into inserts contained by, and/or fastened to, a deck member (e.g., see Example 2).

FIGS. 14-20 show further aspects of pins 1168 and holes 1170. Each pin 1168 may include a head 1174, a flange 1176, and an externally threaded shaft 1178 (see FIG. 17). Head 1174 may be sized to fit closely into a corresponding hole 1170. Flange 1176 may stop threaded advancement of shaft 1178 of pin 1168 into an internally threaded aperture 1180 defined by deck member 1172 of top portion 1148 (see FIG. 18). Alternatively, or in addition, flange 1176 may contact an end surface 1182 of the adjacent deck member 1172 to determine how closely deck members 1172 of the adjacent table sections 1136 can approach one another. Accordingly, the axial position of each pin 1168 may be adjusted, if needed, to change the axial position of flange 1176 with respect to an end surface 1184 of deck member 1172 near aperture 1180, to correct for differences in length, if any, among deck members 1172 of table 1116 and/or to improve the alignment of adjacent deck members 1172. For example, flange 1176 may be adjusted from flush/recessed to projecting above the surrounding end surface of deck member 1172. Each pin 1168 may be locked axially using a set screw 1186 received in an internally threaded bore 1188 of pin 1168. After the axial position of flange 1176 is adjusted, set screw 1186 may be advanced against an end wall of aperture 1180 to lock the pin 1168 in place.

FIGS. 21-25 show aspects of an exemplary securing mechanism 1190 to secure adjacent table sections 1136 to one another after they have been coupled via pins 1168 received in holes 1170. Securing mechanism 1190 may prevent axial separation of table sections 1136 from another by motion opposite to that used for mating. The securing mechanism may include a latch 1192 and a keeper 1194. Latch 1192 has a hook 1196 to releasably engage keeper 1194. The latch is adjustable between a locked configuration (FIGS. 21-23 and 25) and a released configuration (FIG. 24) by manipulation of an operatively coupled lever 1198 (which can function as a graspable handle). The lever can have an over-center action that keeps the lever in the locked configuration until sufficient force is applied.

Figure 22:
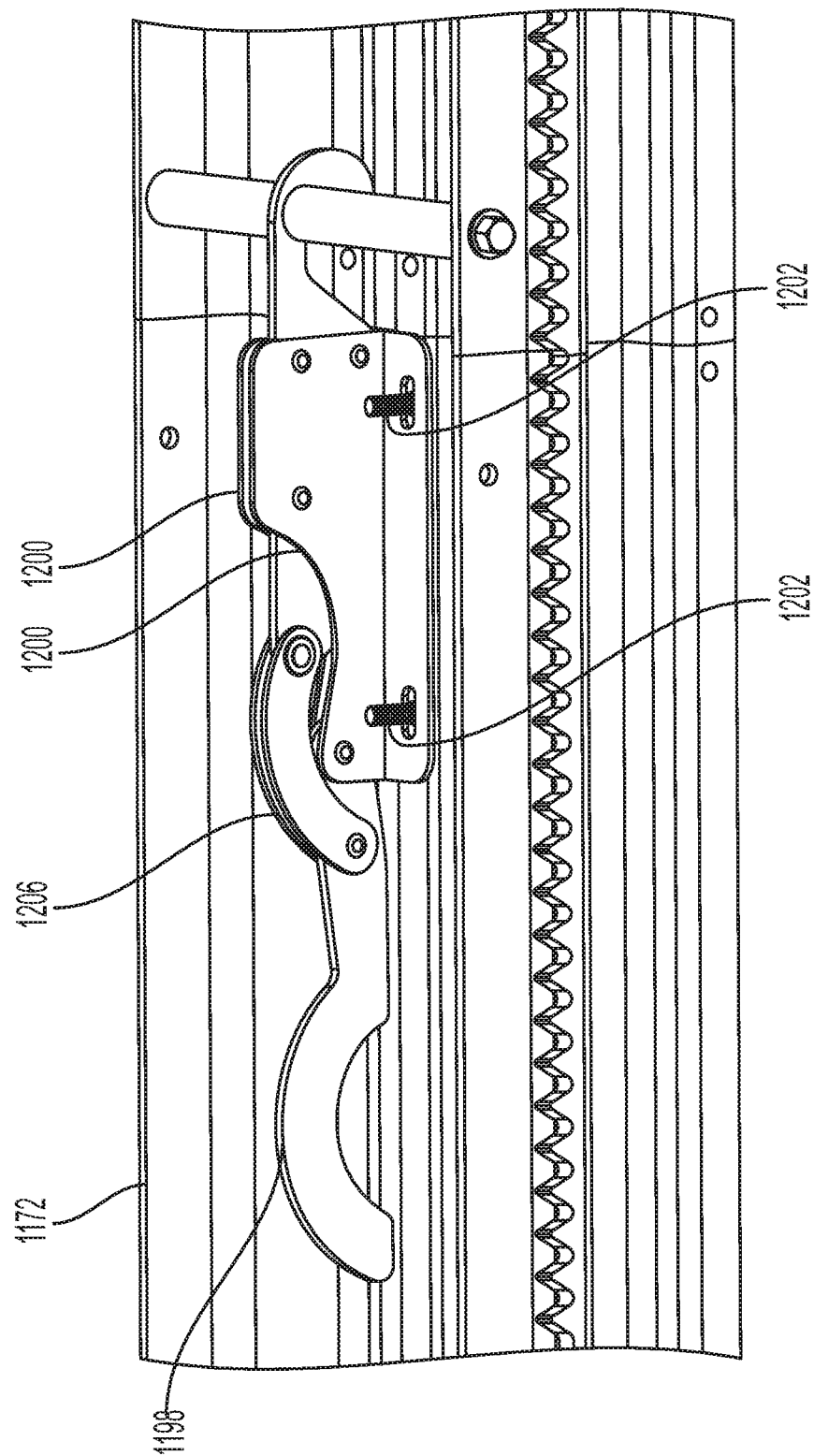
Figure 23:
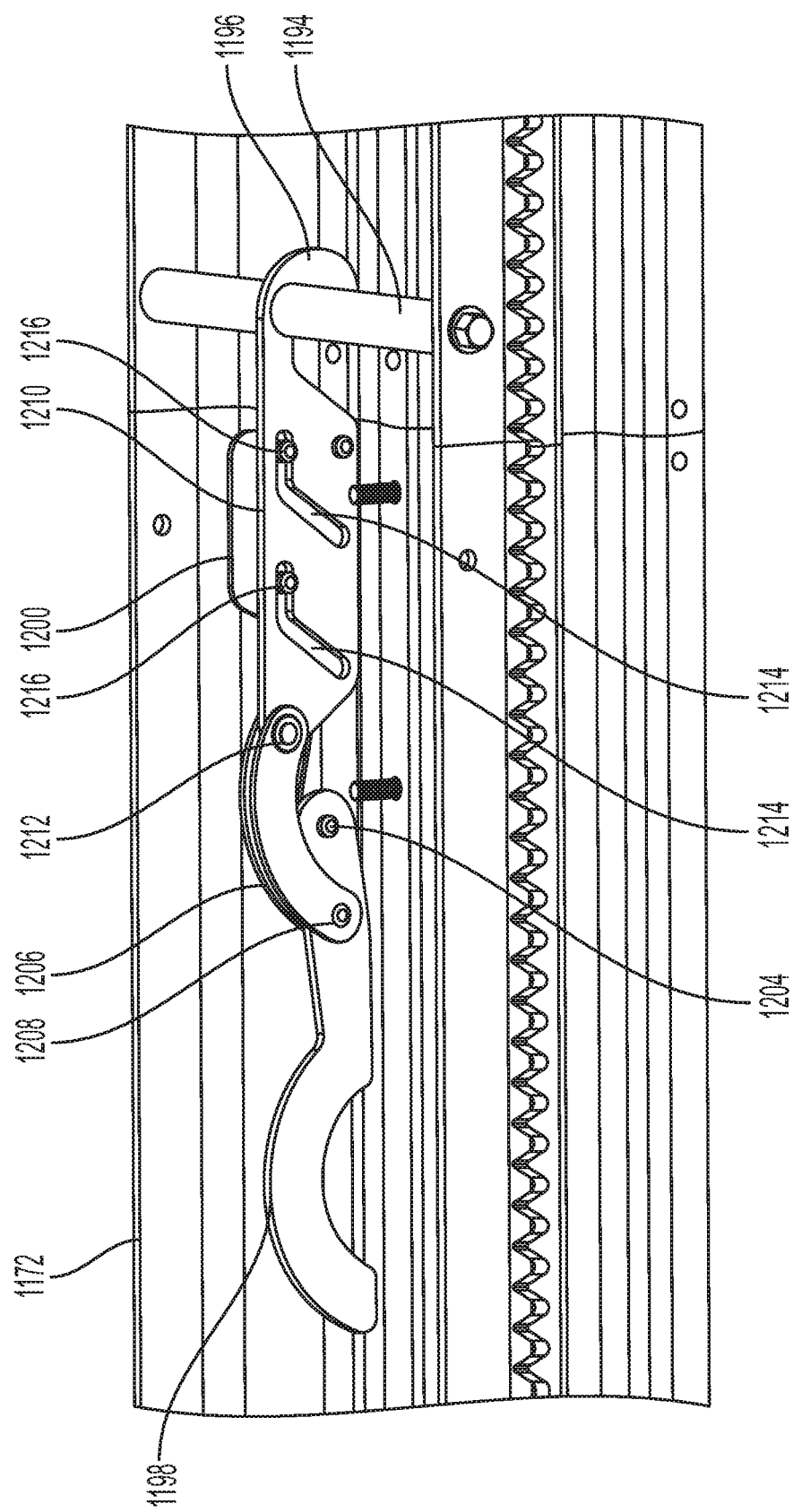
Figure 24:
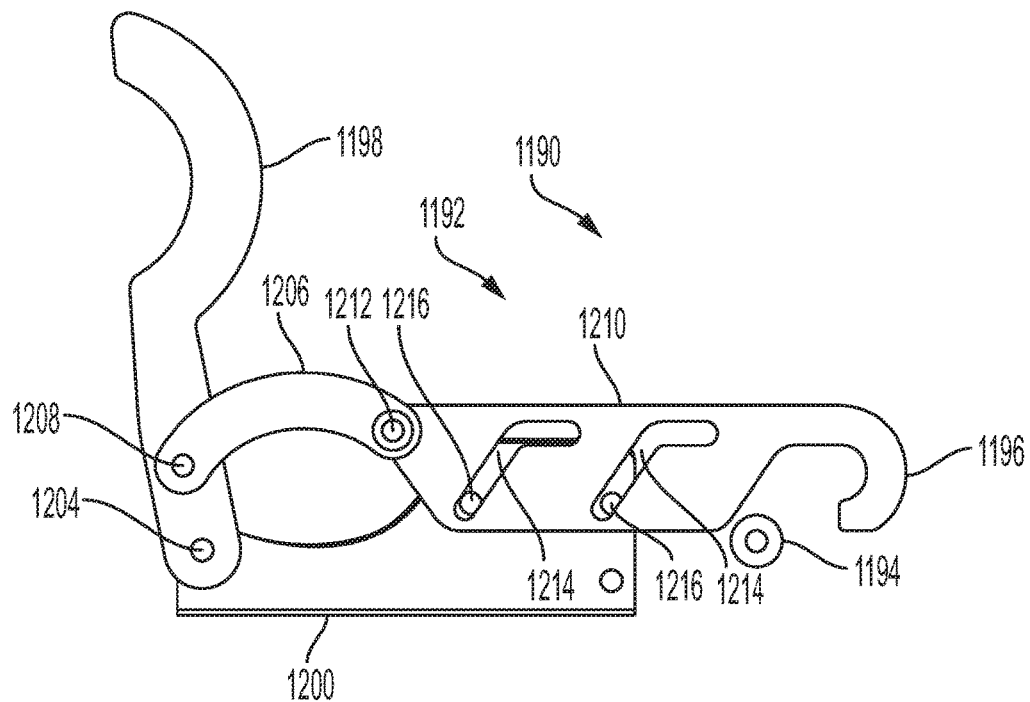
FIGS. 24 and 25 are side views of the securing mechanism of FIGS. 21-23 taken respectively with a latch of the securing mechanism in released and locking configurations.
Figure 25:
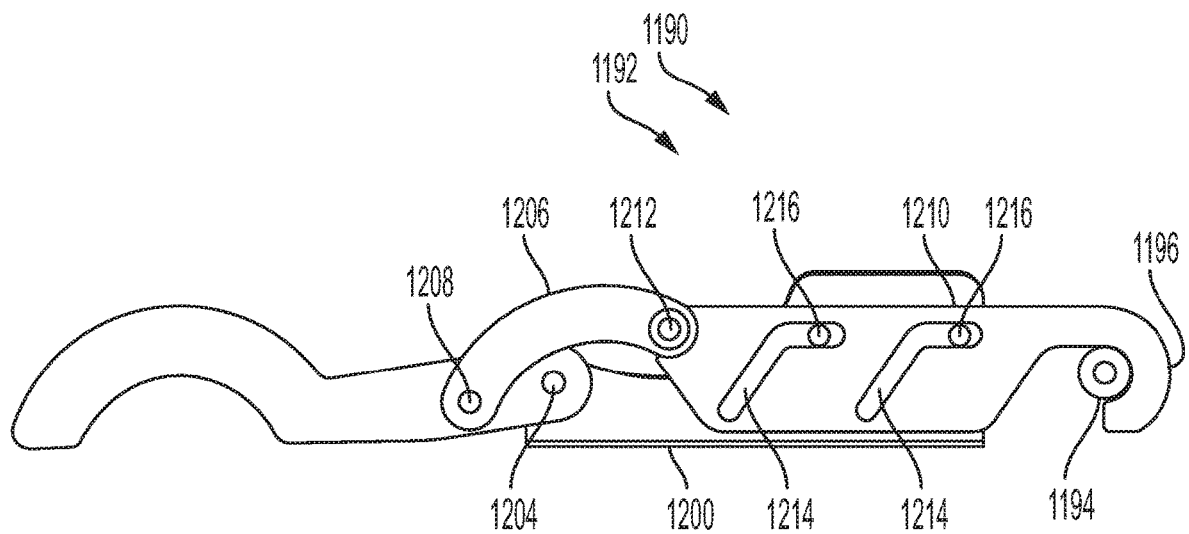

Latch 1192 may be mounted to a deck member 1172 using a pair of brackets 1200 and fasteners 1202 (see FIG. 22). Lever 1198 may be pivotably connected to one or both brackets 1200 at 1204, and may be pivotably connected to a bridge member 1206 at 1208 (see FIGS. 23-25). Bridge member 1206 may be pivotably connected to a hook member 1210 at 1212. Hook member 1210 may define one or more slots 1214 that receive one or more pins 1216 to guide sliding travel of the hook member as lever 1198 is pivoted between the released configuration of FIG. 24 and the locked configuration of FIG. 25.

Figure 21:
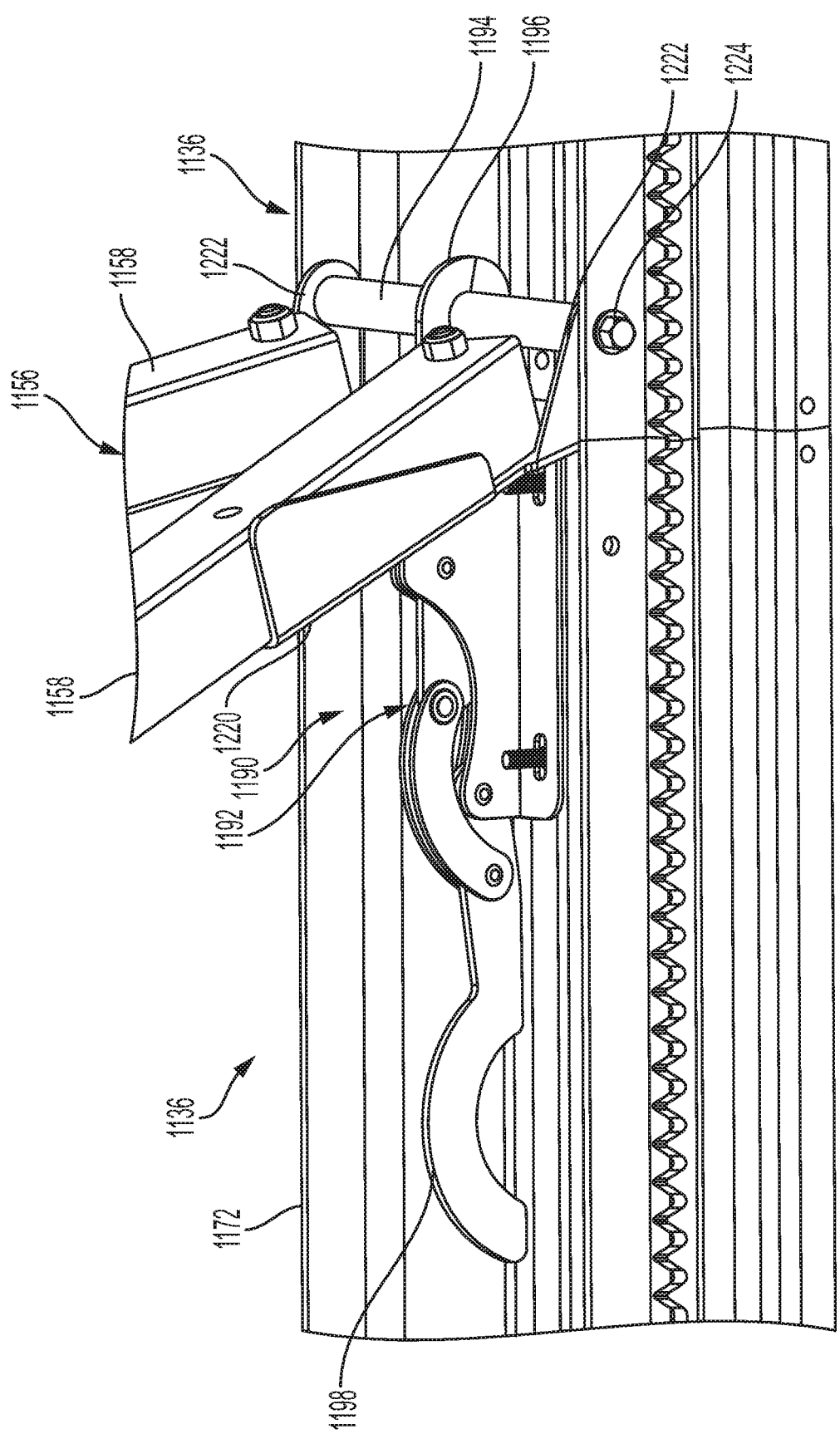
FIGS. 21-23 are fragmentary views of the linear positioner of FIG. 7, taken from below a tabletop thereof, around a junction region at which adjacent table sections are locked to one another using a securing mechanism, with selected components removed in FIGS. 22 and 23.
Figure 26:
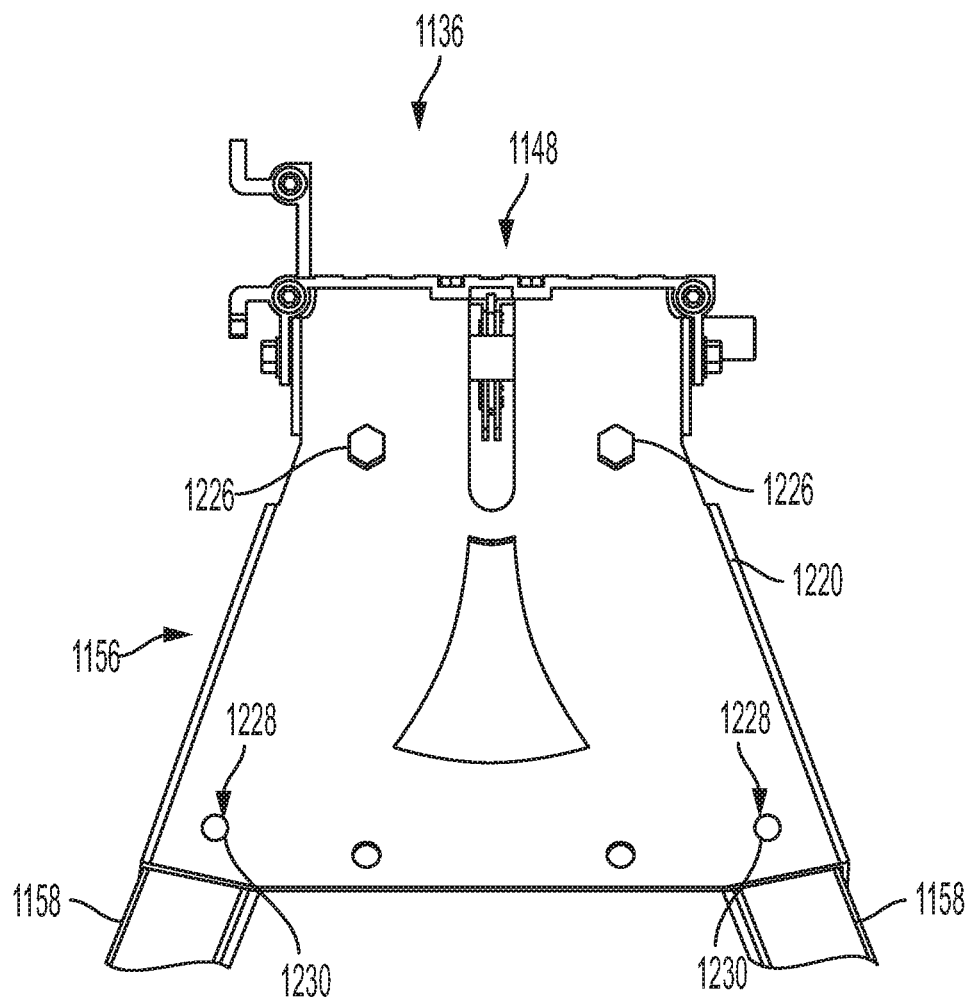
FIG. 26 is a fragmentary outer end view of one of the table sections of the linear positioner of FIG. 7.
Figure 27:
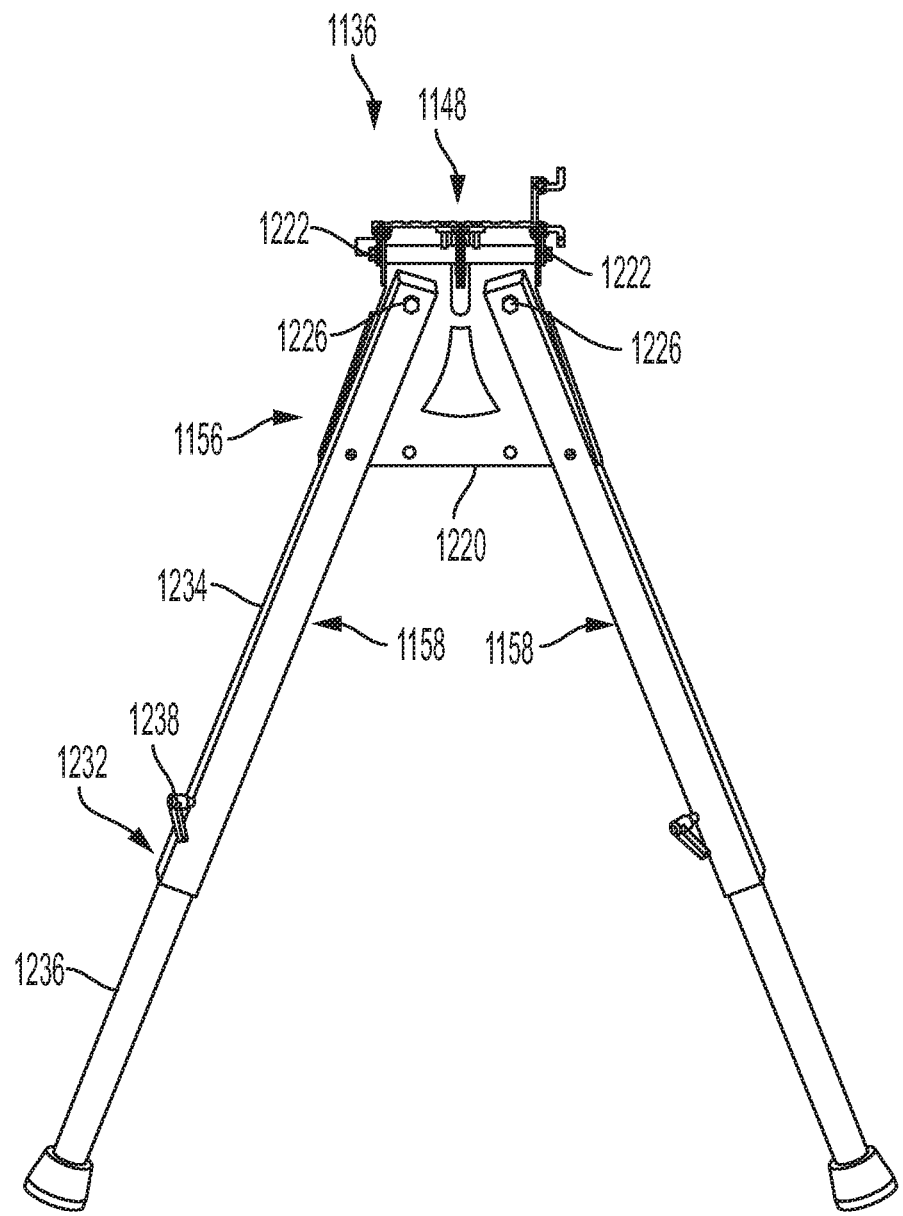
FIG. 27 is an inner end view of the table section of FIG. 26.

FIGS. 21, 26, and 27 show aspects of leg assembly 1156 of one of the table sections 1136. Leg assembly 1156 may include a bracket 1220 that connects a pair of legs 1158 to top portion 1148 of table section 1136. Bracket 1220 may have a pair of ears 1222 defining respective apertures through which a fastener 1224 extends, allowing bracket 1220 (and connected legs 1158) to pivot about an axis defined by fastener 1224 (see FIG. 21). The fastener also may extend through keeper 1194 to connect the keeper to deck member 1172 of top portion 1148. Accordingly, keeper 1194 may be structured as a tube (also see FIGS. 24 and 25).

Legs 1158 of leg assembly 1156 may be connected at their top ends to bracket 1220 using fasteners 1226 (see FIG. 27). Each leg 1158 may be pivotable about an axis defined by a respective fastener 1226, and lockable to prevent this pivotal motion using spring-biased detents 1228 received in corresponding apertures defined by bracket 1220 (see FIG. 26). To pivot each leg 1158, a protruding, rounded button 1230 formed by each detent 1228 may be pressed as torque is being applied to the leg, which releases the leg from its locked configuration.

Each leg 1158 of leg assembly 1156 may have an adjustable length provided by a telescoping mechanism 1232 (compare FIGS. 27 and 28). The leg may have an upper leg section 1234 from which a lower leg section 1236 telescopes. A locking mechanism 1238 of each leg 1158 may be manipulated to adjust the leg between length-adjustable and fixed-length configurations. The ability to adjust the length of the legs can be important to place deck 1064 of positioner 1120 at the same height as a workpiece support surface(s) of processing station 1082, such as a surface(s) provided by bracket(s) 1144, stand 1084, and/or tool 1062. The ability to adjust the length of each leg 1158 independently from one another can be important when linear positioner 1120 is being used on an uneven floor or ground surface, and enables leveling top portion 1148 of each table section 1136.

FIGS. 27-30 illustrate how a table section 1136 can be collapsed from a working configuration (i.e., a deployed configuration of the legs) (FIG. 27) to a retracted/stored configuration (e.g., a folded configuration of the legs) (FIG. 30), or vice versa. Each locking mechanism 1238 can be manipulated to place each leg 1158 of a leg assembly 1156 in its length-adjustable configuration, and each lower leg section 1236 can be slid into the corresponding upper leg section 1234, indicated by motion arrows at 1240 (see FIG. 28). Buttons 1230 can then be pressed and legs 1158 can be pivoted, indicated at 1242, toward one another (see FIG. 29). Leg assembly 1156 then may be pivoted as a unit, indicated at 1244, to bring the bottom ends of legs 1158 to deck member 1172, which may place legs 1158 substantially parallel to deck member 1172 and/or a long axis defined by the deck member.

Figure 18:
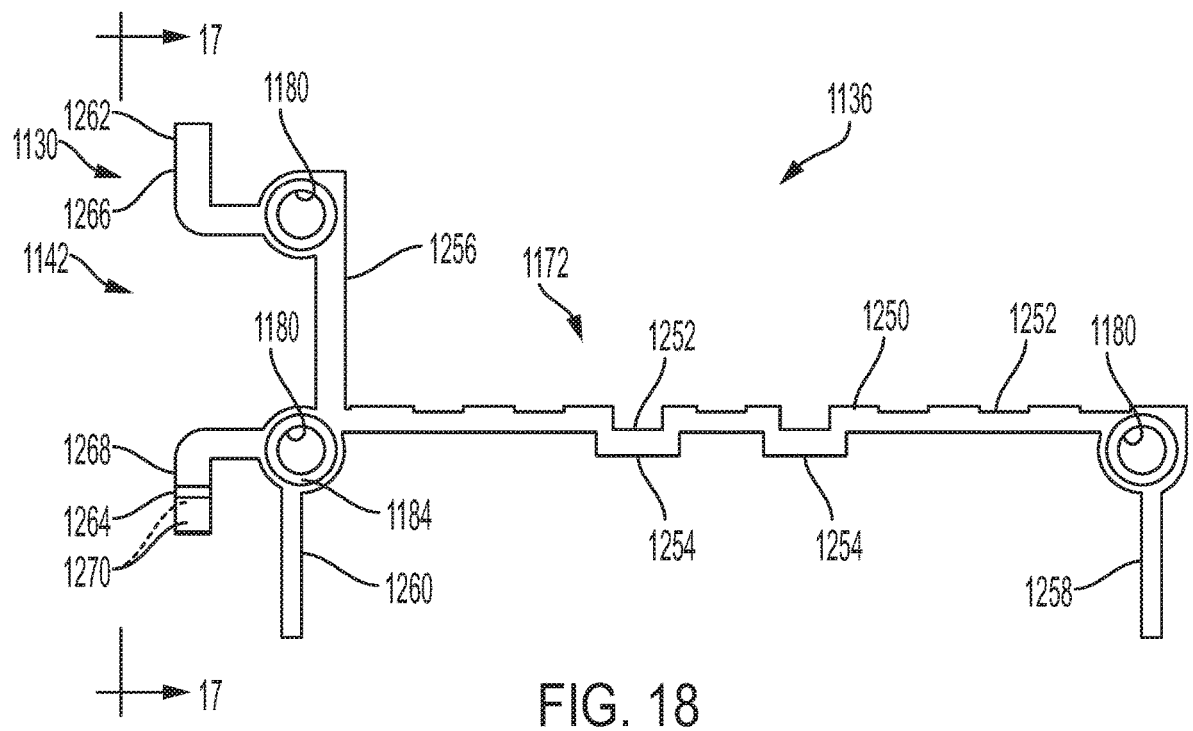
FIG. 18 is a view of an outer end of a deck member of the table section of FIG. 15, taken in isolation.
Figure 19:
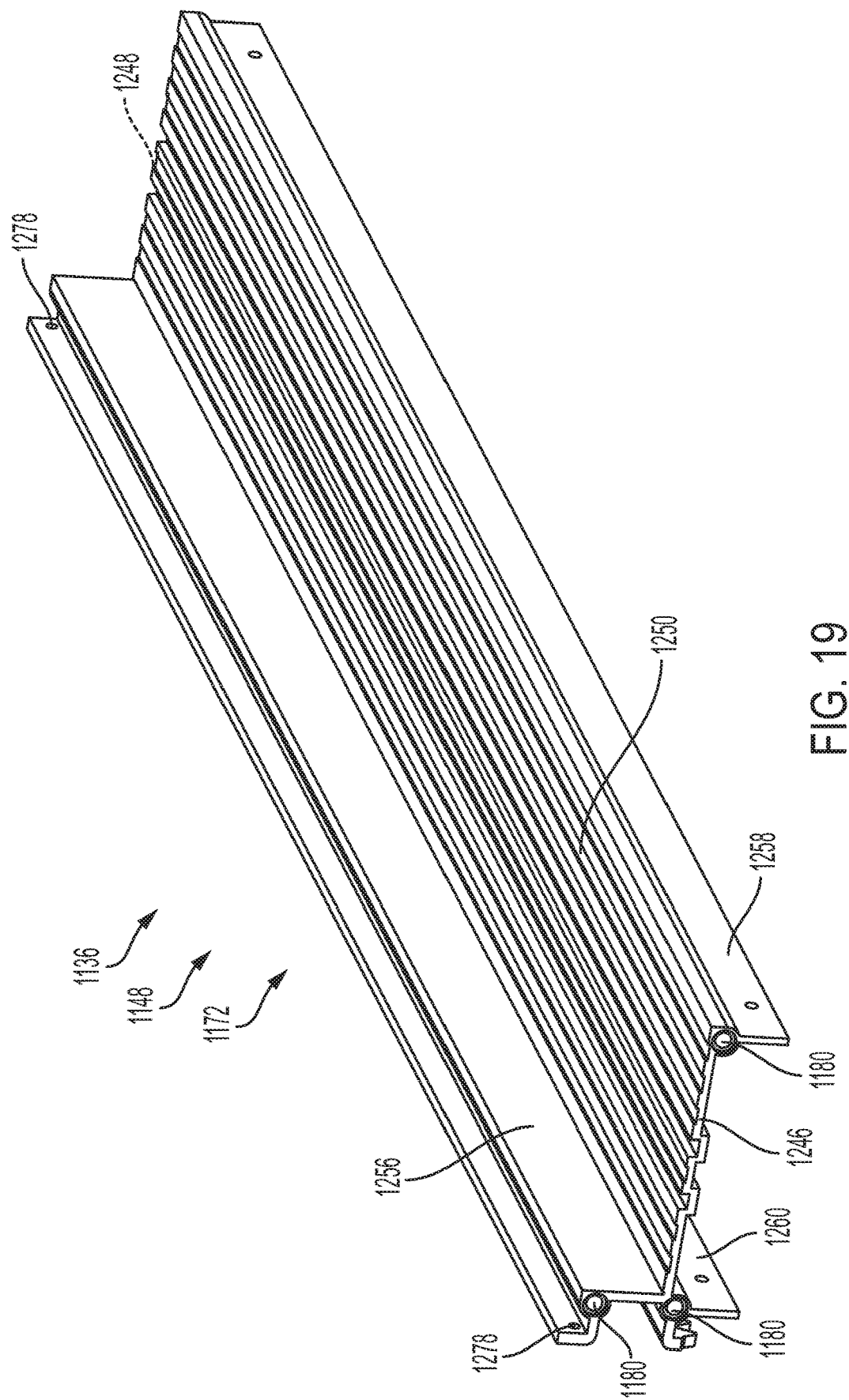
FIG. 19 is another view of the deck member of FIG. 18.
Figure 20:
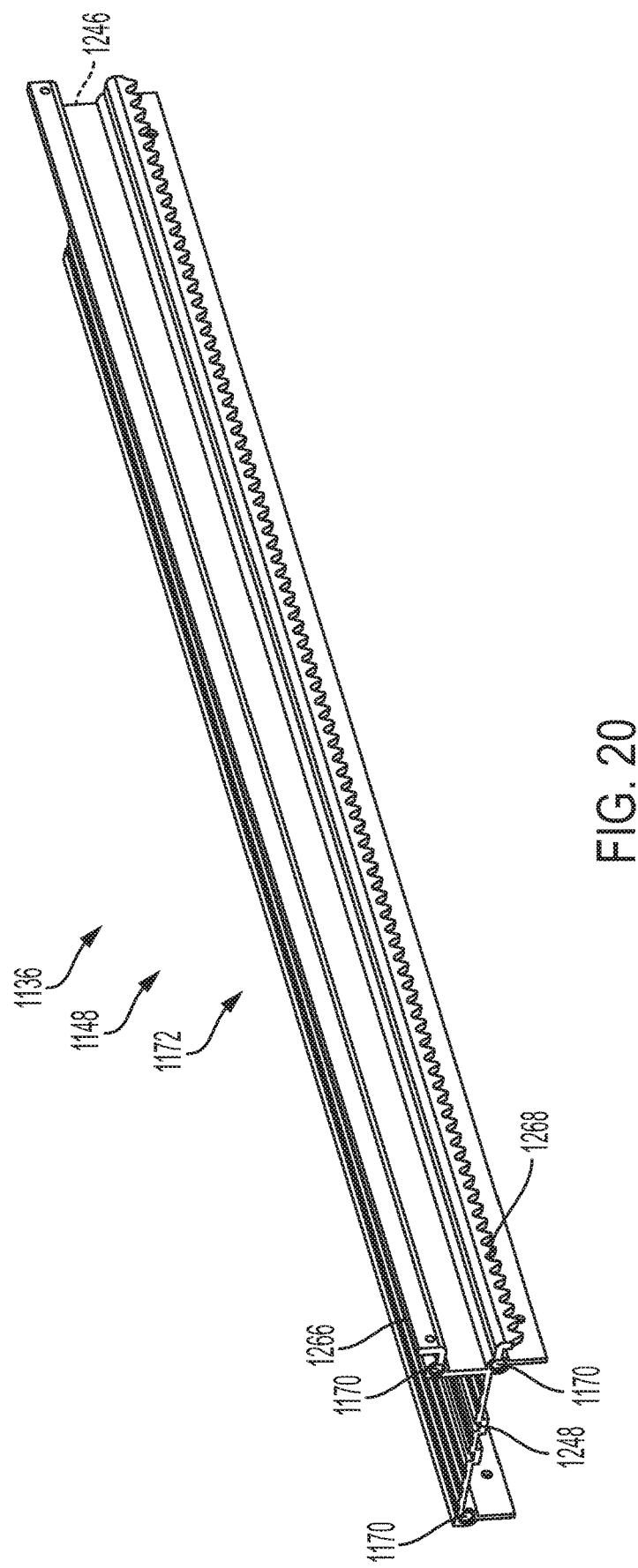
FIG. 20 is yet another view of the deck member of FIG. 18, with the back side of the deck member visible.

FIGS. 18-20 illustrate additional aspects of deck member 1172. The deck member be formed by extrusion, optionally of metal (such as aluminum), and thus may have a substantially uniform cross-sectional shape between opposite ends 1246, 1248 (which correspond, respectively, to ends 1152, 1154 of top portion 1148).

Deck member 1172 may have various structural regions (see FIGS. 18-20). A horizontal wall 1250 provides deck segment 1138. Wall 1250 may define a plurality of longitudinal grooves 1252 on a top side, which may reduce friction, and one or more ribs 1254 on a bottom side for strength (see FIG. 18). An ascending wall 1256 that provides fence segment 1140 may be located near or at a back edge of wall 1250. Front and back descending walls 1258, 1260 may project downward from wall 1250. Walls 1258, 1260 may strengthen deck member 1172 and provide an attachment site for leg assembly 1156 and keeper 1194 (also see FIGS. 21 and 27).

Track segment 1142 of track 1130, to support shuttle 1208 and guide axial travel thereof, may be formed rearward of ascending wall 1256 and descending wall 1260 (see FIGS. 18-20, 31, and 32; also see FIGS. 9 and 10). Track 1130 may be composed of an upper rail 1262 and a lower rail 1264 that are not coaxial to one another, for example, located above and below one another, and optionally vertically aligned with one another. Accordingly, track segment 1142 of an individual deck member 1172 has an upper rail section 1266 and a lower rail section 1268. Each rail section 1266, 1268 may be formed by a respective flange, such as an upwardly projecting flange and downwardly projecting flange of deck member 1172. At least one of rails 1262, 1264 may define a linear array of teeth 1270, with the teeth arranged along a line that is parallel to measurement axis 88 (also see FIG. 3). In the depicted embodiment, only lower rail 1264 defines teeth 1270 such that the lower rail is a rack 1272 along which a gear 1124 rolls (also see FIGS. 34, 36, and 37). Teeth 1270 may be uniformly spaced, may project downward to their respective crests 1274, and/or may be formed by machining an extrusion that is a precursor of deck member 1172.

Figure 32:
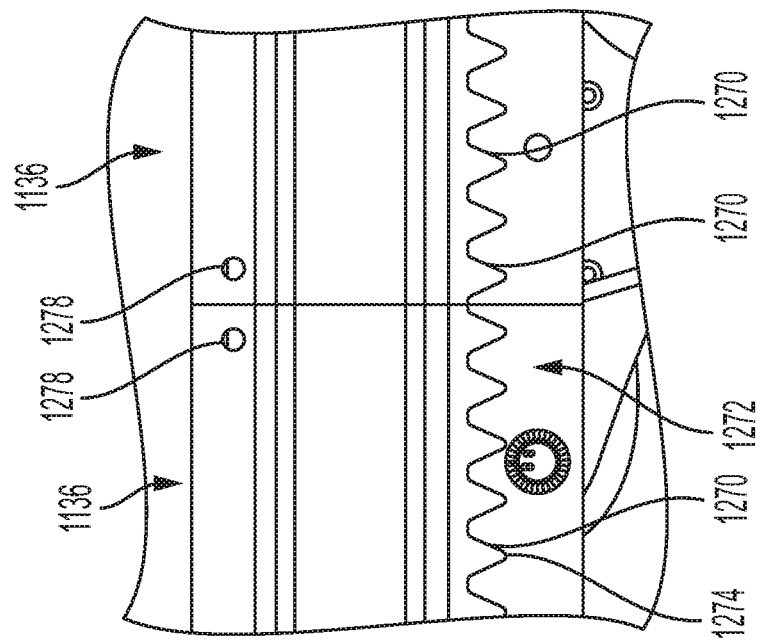
FIG. 32 is a fragmentary back view of the linear positioner of FIG. 7, taken around a junction region at which a pair of table sections are attached to one another, and showing another fragmentary portion of the track for comparison with FIG. 31.
Figure 31:
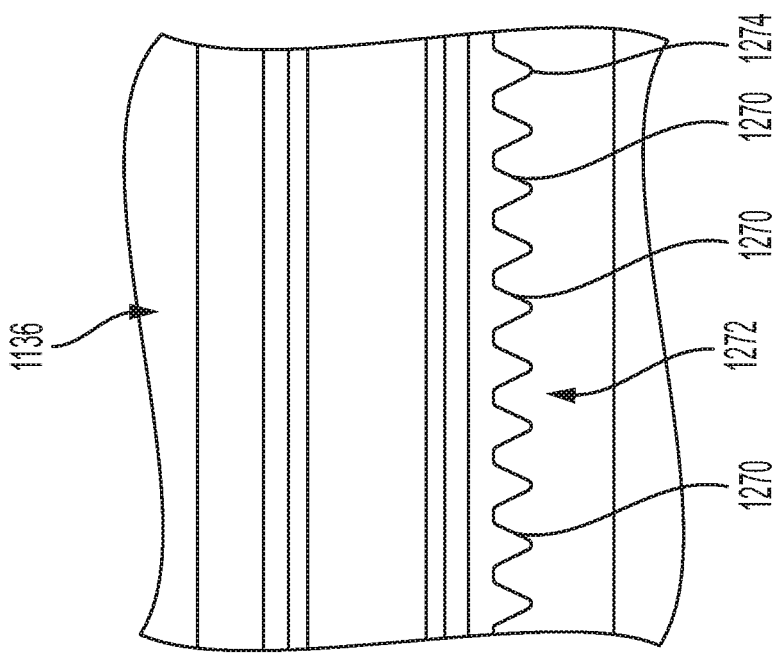
FIG. 31 is a fragmentary back view of the linear positioner of FIG. 7 taken within one of the table sections and showing a fragmentary portion of a track on which a shuttle travels.
Figure 33:
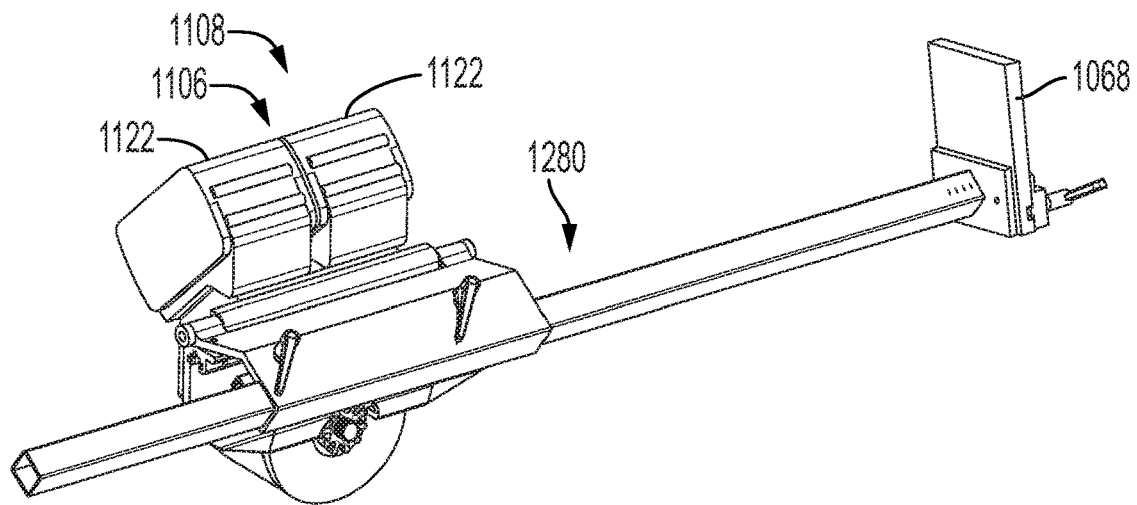
FIG. 33 is a view of a shuttle of the linear positioner of FIG. 7 taken from generally in front of the shuttle.
Figure 34:
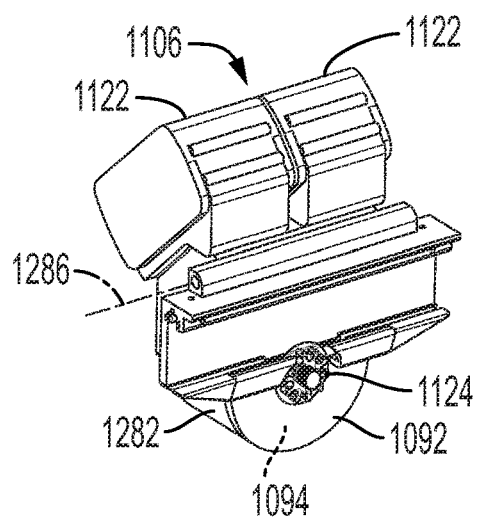
FIG. 34 is a view of a carriage assembly of the shuttle of FIG. 33 taken after removal of a stop assembly of the shuttle.
Figure 35:
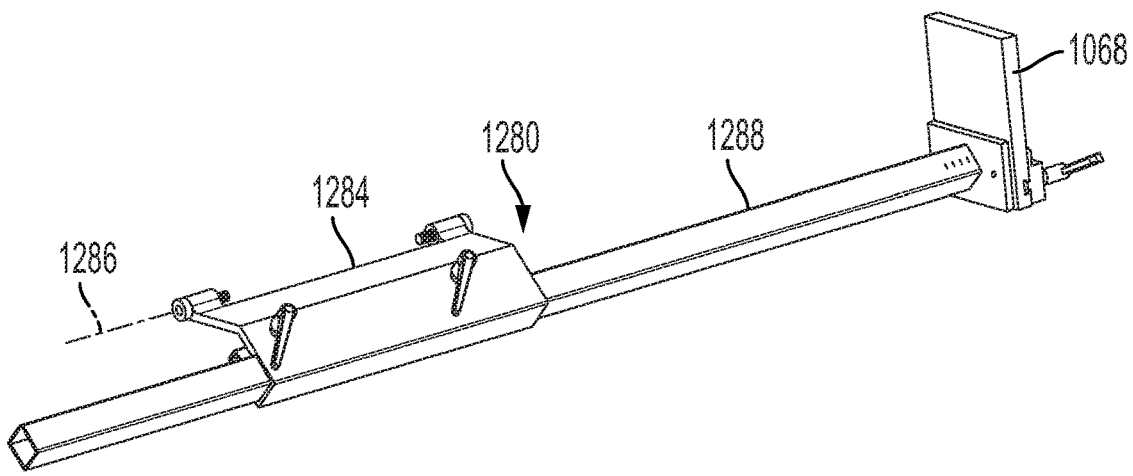
FIG. 35 is a view of the stop assembly of the shuttle of FIG. 33 taken in isolation.

FIGS. 31 and 32 illustrate respective portions of rack 1272 within a table section 1136 (FIG. 31) and spanning the junction between a pair of assembled table sections 1136 (FIG. 32). The spacing between teeth 1270 does not vary substantially as rack 1272 extends between the table sections, due to precise machining of the teeth and accurately reproducible assembly of the table sections 1136. Accordingly, rack 1272 enables precisely controllable, motor-driven travel of a carriage assembly 1106 via a shuttle 1108 along measurement axis 88 (also see FIGS. 2 and 3).

The range of travel of shuttle 1108 may be defined by an obstruction located at each end of the range. For example, one obstruction may be located near outer end 1152 of the outermost table section 1136 and the other obstruction may be located near inner end 1154 of the innermost table section 1136 of table 1116 (or 116) (see FIGS. 3 and 11). Each obstruction may be removable, such as an obstructing screw 1276 attached to track segment 1142 of the corresponding deck member 1172 at an internally threaded hole 1278 (see FIGS. 13, 16, and 19). Each hole 1278 may be defined by upper rail section 1266 of each table section 1136.

FIGS. 33-36 show exemplary aspects of shuttle 1108 for linear positioner 1120. Shuttle 1108 may include carriage assembly 1106 and a stop assembly 1280 including a stop 1068. Carriage assembly 1106 may include a carriage 1092, a motor housing 282 around a motor 1094, batteries 1122, and a gear 1124, among others.

Stop assembly 1280 may be connected to carriage assembly 1106 via carriage 1092 thereof. The stop assembly 1280 may include a holder 1284 having a pivotable connection to carriage 1092 for pivotal motion about a pivot axis 1286, which allows the stop assembly 1280 to pivot between a working position and a raised position. A stop bar 1288 connects stop 1068 to holder 1284 at an adjustable distance from the holder.

FIGS. 36-39 show a guide portion 1290 of carriage assembly 1106. The guide portion is configured to interface with track 1130 when shuttle 1108 is placed onto the track and as shuttle 1108 travels along the track. Guide portion 1290 includes an upper guide 1292 to receive a length of upper rail 1262, and a lower guide 1294 to receive a length of lower rail 1264 (e.g., a length of rack 1272) (also see FIGS. 31 and 32). Upper guide 1292 may include a channel 1296 defined by carriage 1092 and one or more low-friction inserts 1298 (e.g., three) disposed in channel 1296 at each end thereof (see FIGS. 36 and 38). Each insert 1298 may be attached to carriage 1092 using at least one fastener 1300, and the position of the insert may be adjusted via the fastener (see FIG. 38). Each insert 1298 may contact upper rail 1262, and adjusting the position of the insert may improve the fit of upper rail 1262 in upper guide 1292 (also see FIG. 37). Inserts 1298 enable sliding travel of the carriage assembly on upper rail 1262. Lower guide 1294 may include a pair of recesses 1302a, 1302b defined by carriage 1092 and separated from one another by a space 1304 for a portion of gear 1124 (see FIG. 38). A pair of finger guards 1306a, 1306b may be connected to carriage 1092 at recesses 1302a, 1302b and may provide low-friction channels 1308a, 1308b sized to receive a portion of lower rail 1264 (also see FIG. 37). Finger guards 1306a, 1306b, in cooperation with upper guide 1292, may stabilize the orientation of carriage assembly 1106 and restrict wobble thereof. Moreover, finger guards 1306a, 1306b may increase safety by preventing injury that could result otherwise if a user inadvertently places a hand on lower rail 1264 in the path of shuttle 1108.

Figure 36:
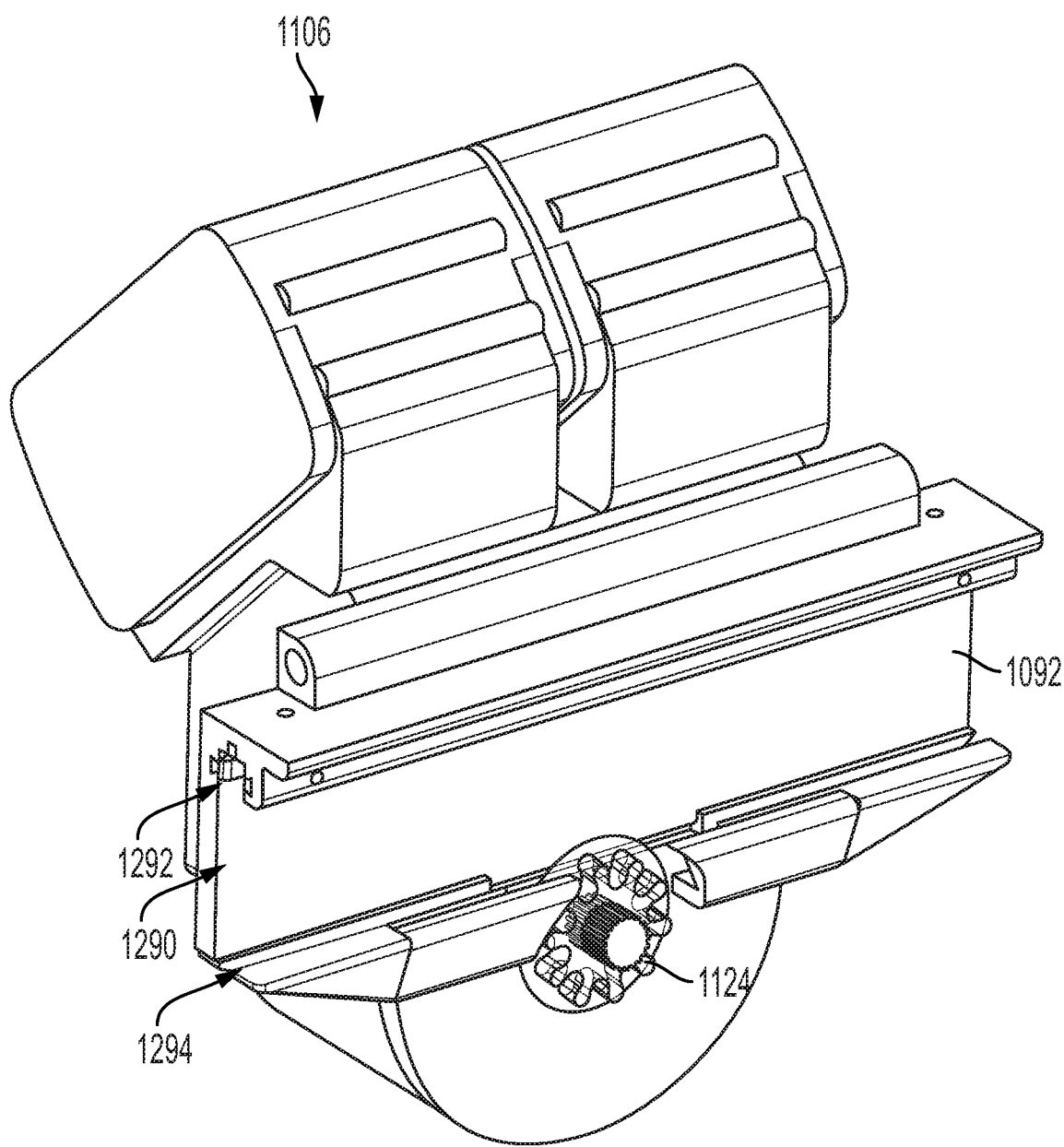
FIG. 36 is a magnified view of the carriage assembly of FIG. 34.
Figure 38:
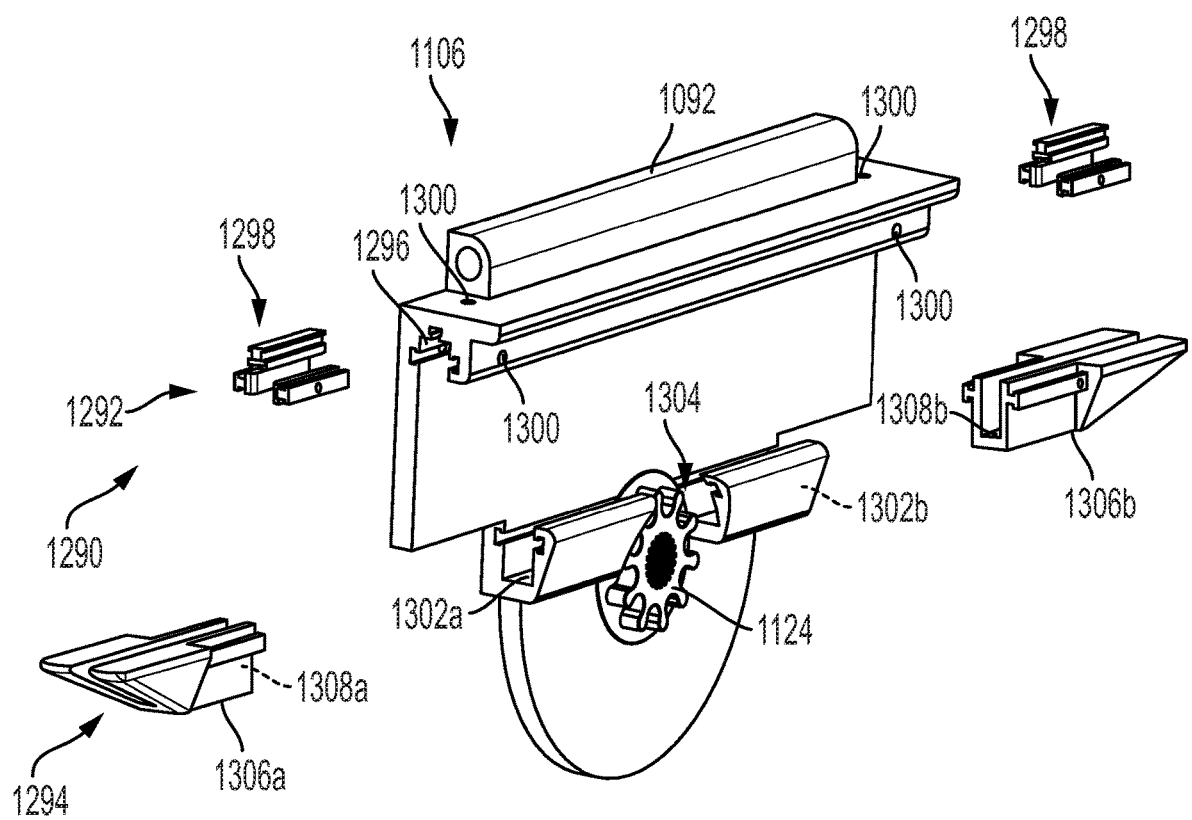
FIG. 38 is an exploded view of a portion of the carriage assembly of FIG. 34 that interfaces with a track of the linear positioner.
Figure 39:
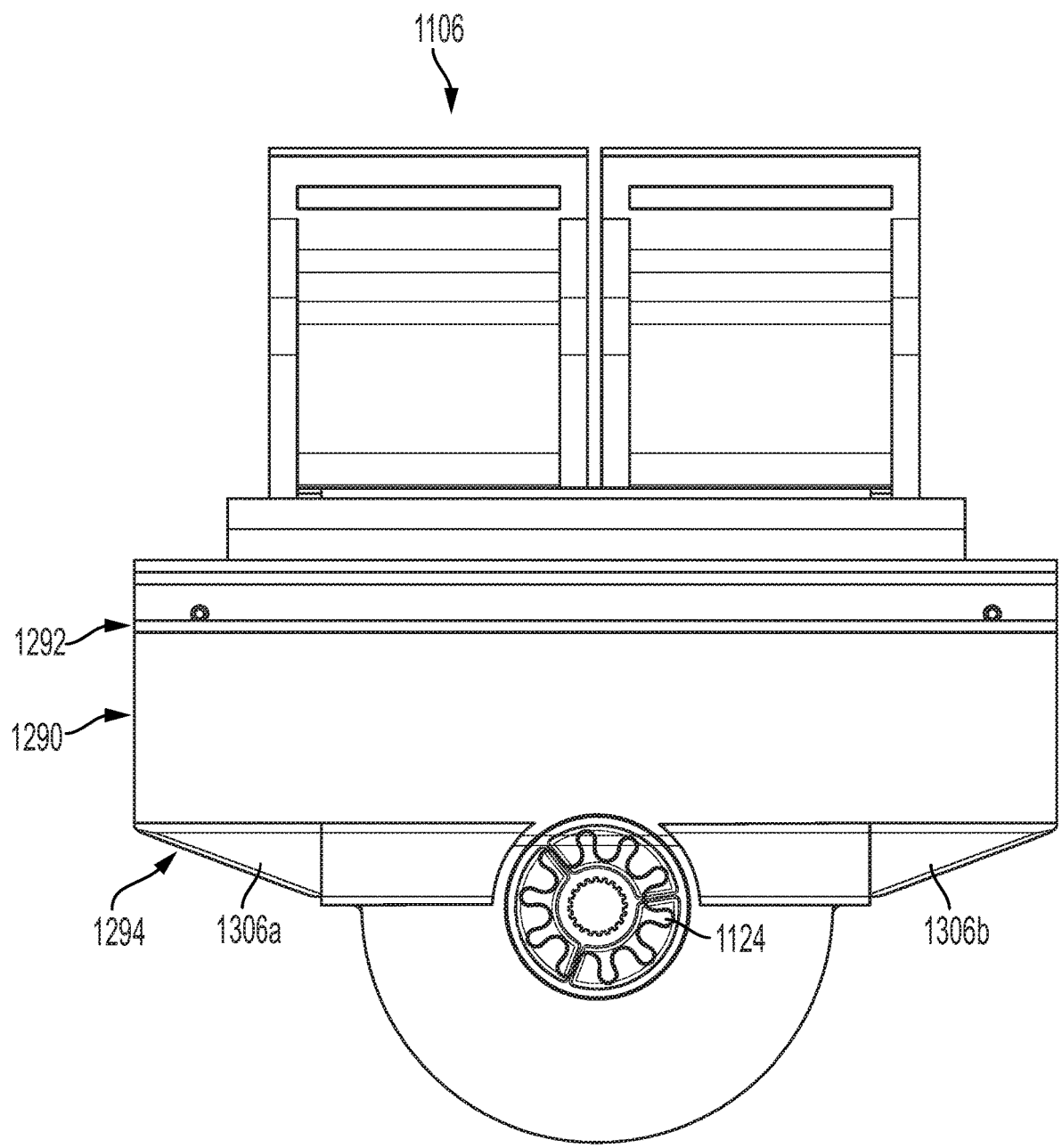
FIG. 39 is a front view of the carriage assembly of FIG. 34, taken at elevation.
Figure 40:
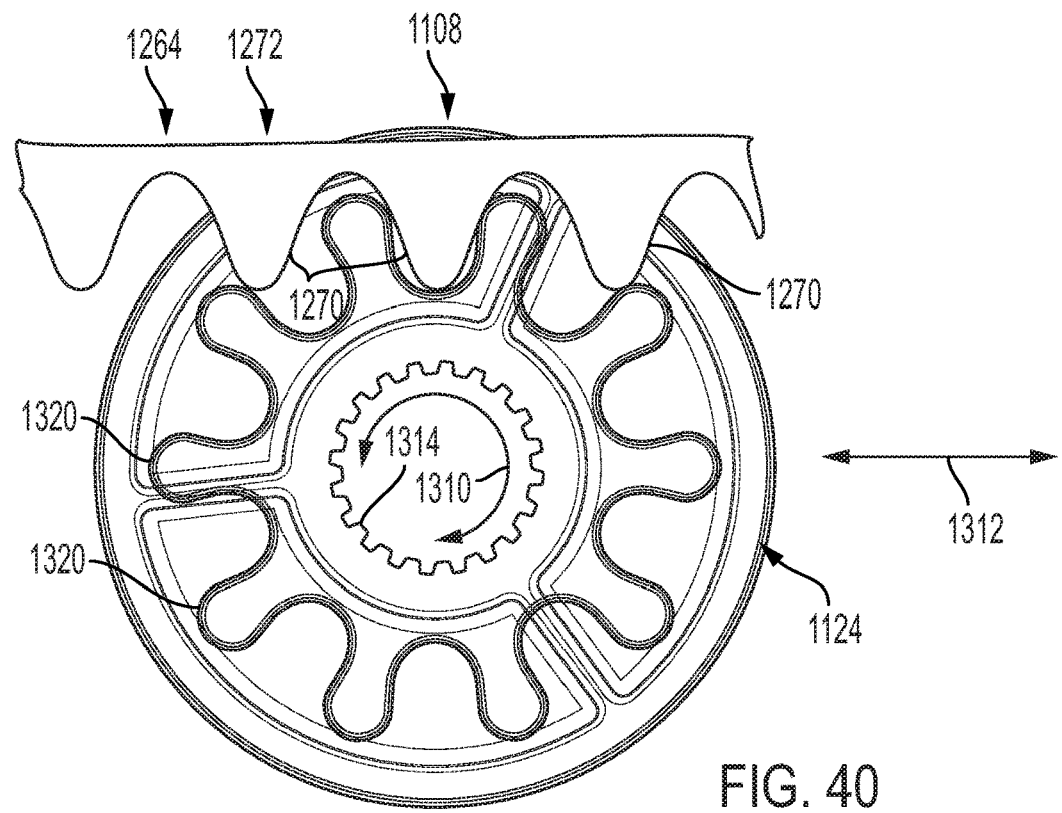
FIG. 40 is a front view of a gear of the carriage assembly of FIG. 34 meshed with a track of the linear positioner, with the track shown as fragmentary.
Figure 41:
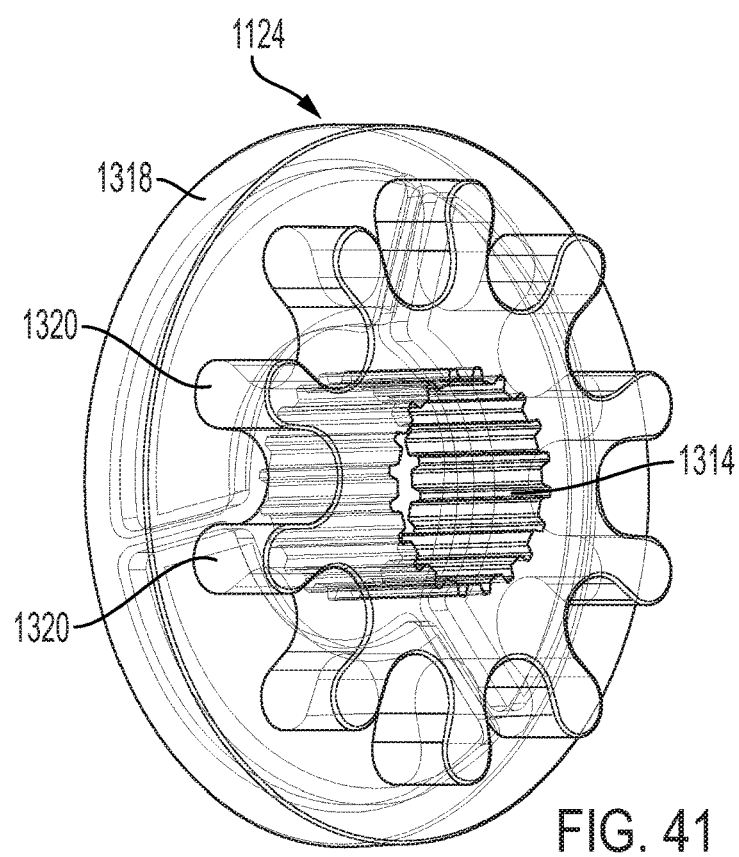
FIG. 41 is another view of the gear of FIG. 40 taken in isolation.

Gear 1124 meshes with lower rail 1264 in space 1304 (see FIG. 40; also see FIGS. 36 and 38). Rotation of gear 1124, indicated at 1310, drives translational motion of shuttle 1108, indicated at 1312.

Gear 1124 may have any suitable structure and composition. The gear may have a splined central through-hole 1314 to mesh with a complementary shaft region 1316 of motor 1094 (see FIGS. 41 and 42). Gear 1124 may have a disc body 1318 and set of radially arranged teeth 1320 offset axially and protruding from a face of body 1318. The gear may be formed of polymer, metal, or carbon fiber composite, among others. The polymer may be lubricious (with a low coefficient of friction), such as a lubricious thermoplastic, to make gear 1124 more wear resistant. The carbon fiber composite may be reinforced with another material to strengthen the gear.

Figure 42:
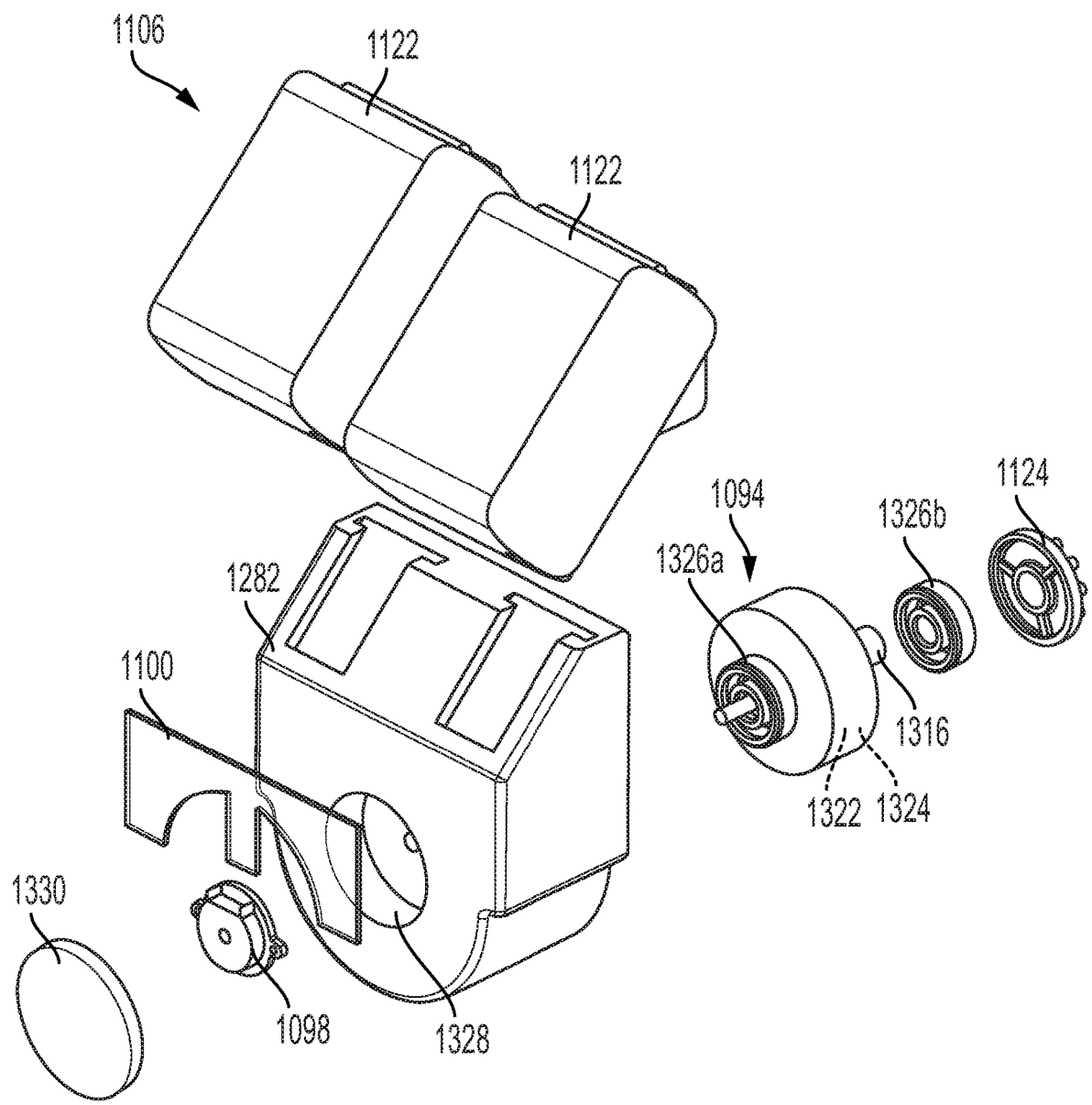
FIG. 42 is an exploded view of selected components of the carriage assembly of FIG. 34.

FIG. 42 shows an exploded view of carriage assembly 1106 but with the carriage omitted. Motor 1094 is shown schematically and includes a rotor 1322 and a stator 1324. Bearings 1326a, 1326b mount the motor to motor housing 1282 and the carriage. An encoder 1098 may be located in a chamber 1328 defined motor housing 1282 and a cap 1330. A controller 1100 for motor 1094 is also shown.

Figure 43:
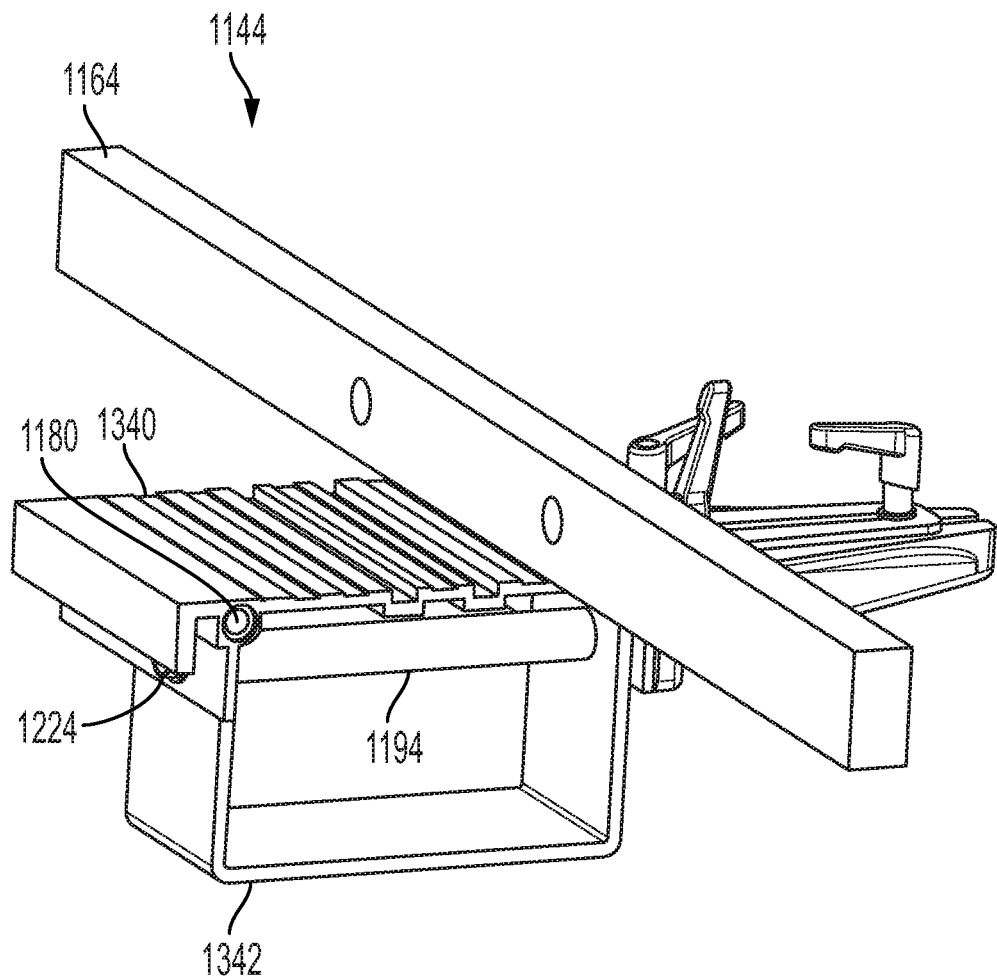
FIG. 43 is a view of a bracket that may be mounted on a tool stand to provide an attachment site for a table section of the linear positioner of FIG. 7.

FIG. 43 shows further aspects of an exemplary bracket 1144 for attaching an innermost table section 1136 of linear positioner 1120 to tool stand 1084 (also see FIGS. 7-11). Bracket 1144 may include a deck member 1340 defining one or more internally-threaded apertures 1180 for threaded engagement of pins 1168 (see FIGS. 16-19), to allow mating with holes 1170 at the inner end of table section 1136. Keeper 1194 for a latch 1192 of table section 1136 may be mounted to the underside of deck member 1340. A base 1342 can be utilized to attach bracket 1144 to tool stand 1084.

Example 2. Pin-and-Clip Coupling Mechanisms for Table Sections

This example describes exemplary mechanisms utilizing pins and clips to couple an adjacent pair of table sections of a linear positioner to one another; see FIGS. 44-47. The linear positioners of this example may have any suitable combination of the elements and features described elsewhere herein, such as for the linear positioners of Section I, Examples 1, 3, and 4 of Section II, and Section III.

Figure 44:
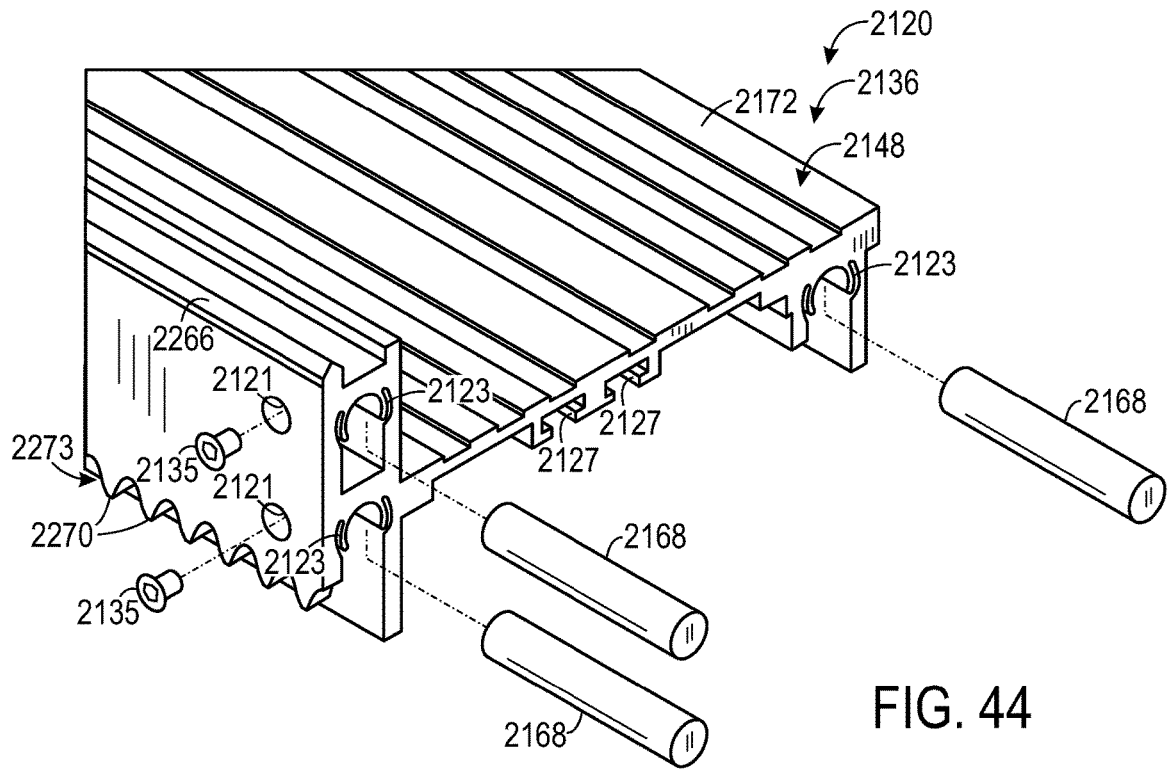
FIG. 44 is a fragmentary, isometric, exploded view of selected aspects of an end region of a table section for an exemplary linear positioner, where the table section includes a deck member formed as an extrusion defining integral clips to grip pins that couple adjacent table sections to one another.
Figure 45:
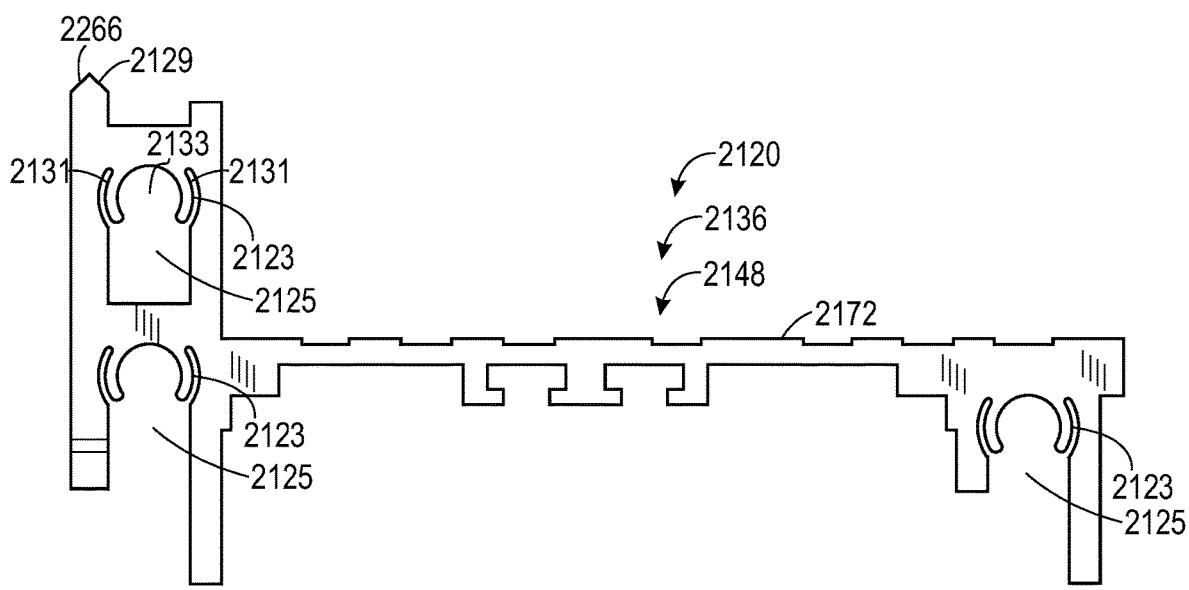
FIG. 45 is an end view of the deck member of FIG. 44, taken at elevation parallel to a long axis defined by the deck member.

FIGS. 44 and 45 show selected aspects of an exemplary linear positioner 2120, particularly, a top portion 2148 of a table section 2136 thereof. Top portion 2148 includes a deck member 2172 formed as an extrusion and then machined to create additional features, such as teeth 2270 of a rack segment 2273 and holes 2121. Deck member 2172 is generally like deck member 1172 of Example 1, except that deck member 2172 defines (a) integrally-formed clips 2123 to grip axial pins 2168 that align and couple adjacent table sections 2136 to one another, (b) a channel region 2125 under each clip 2123 to axially receive an axial section of a pin 2168 before the axial section is pressed into, and seated in, the clip, (c) a pair of axial slots 2127 (e.g., T-slots) on a bottom side of deck member 2172 for mounting a leg assembly to the deck member at a selectable position along the slots 2127 (see Example 3), and (d) an upwardly-tapered flange 2129 forming an upper rail segment 2266 on and along which a shuttle slides (also see Example 4).

Each clip 2123 may be formed by extrusion along with other features of deck member 2172, or may be machined into a precursor of the deck member. However, forming the clip by extrusion is advantageous due to increased efficiency and reduced cost. The clip may have a pair of gripping members 2131 separated by a receiving space 2133 for a pin 2168. Gripping members 2131 may be configured to be deformed away from one another as clip 2123 is pressed onto an axial section of a pin 2168. This deformation allows the axial section of the pin 2168 to enter receiving space 2133 via a lateral opening of clip 2123 located between the bottom edges of gripping members 2131.

A pair of table sections 2136 may be coupled to one another end to end using pins 2168. Pins 2168 may be inserted partway (e.g., about halfway) into a first table section 2136, seated at respective clips 2123, and fixed in place with bolts 2135 located in holes 2121, or using any other suitable fastening mechanism. An end of a second table section 2136 then may be placed against an end of the first table section 2136, such that the protruding axial section of each pin 2168 travels axially into a respective channel region 2125 such that each clip 2123 of the second table section 2136 is resting on a respective pin 2168. The second table section 2136 is then pressed down into place, such that each pin 2168 enters a respective receiving space 2133 of each clip 2123 via its lateral opening. This action deforms gripping members 2131 of each clip 2123 before pins 2168 are locked in place by engagement with the gripping members 2131. This coupling approach precisely aligns table sections 2136 with one another by tightly fixing pins 2168, without the need for precise machining into the ends of the table sections (as in Example 1). Moreover, this coupling approach may secure each adjacent pair of table sections 2136 to one another without the need for an additional securing mechanism, such as the draw latch described in Example 1. Pins 2168 may be tapered or may have a uniform diameter along the length of the pin, among others.

Figure 46:
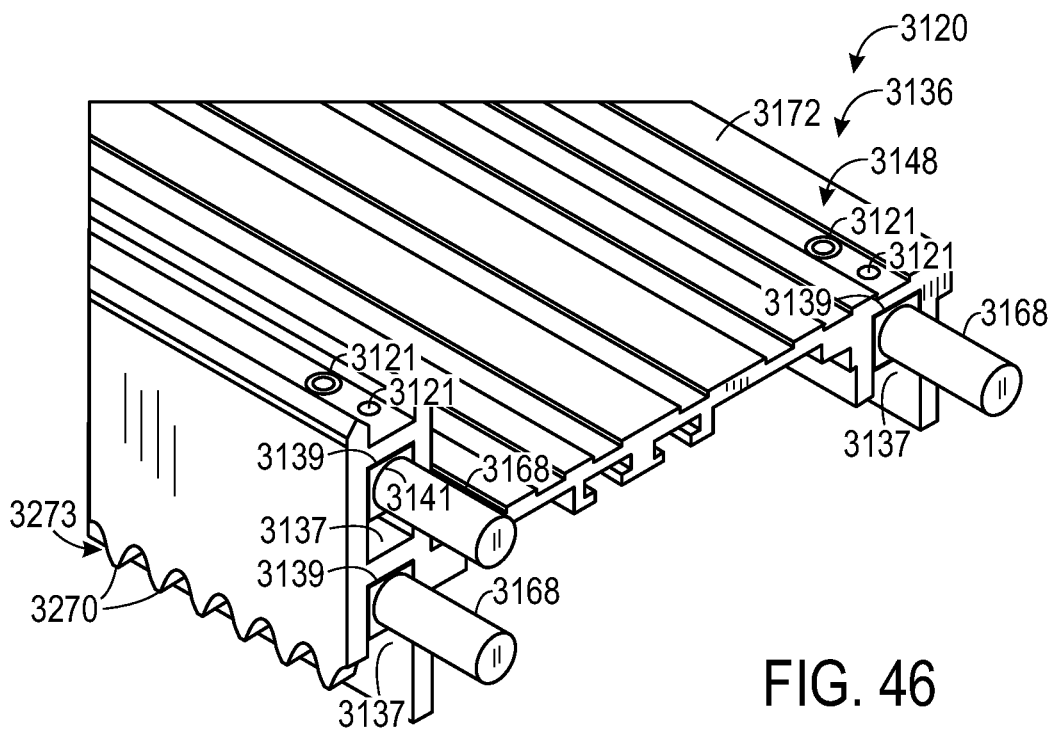
FIG. 46 is a fragmentary, isometric view of selected aspects of an end region of a table section for an exemplary linear positioner, where the table section includes a deck member formed as an extrusion defining channels to receive mounting blocks (or clip inserts) for fastening pins to an end of the deck member.
Figure 47:
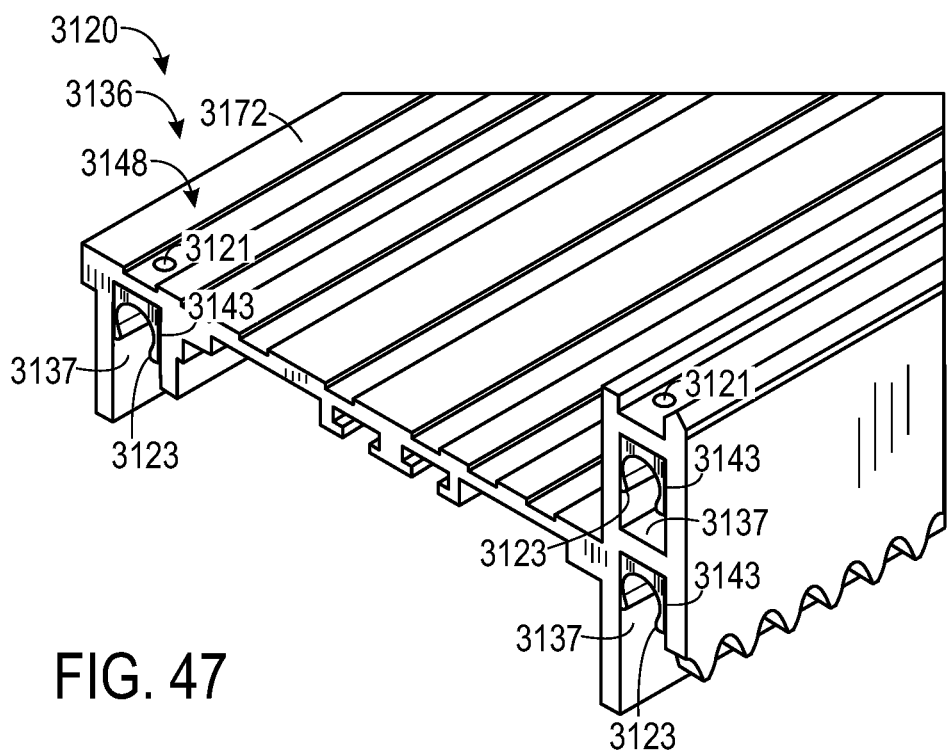
FIG. 47 is a fragmentary, isometric view of selected aspects of an end region of a table section for an exemplary linear positioner, where the table section includes a deck member formed as an extrusion that is substantially identical to the extrusion of FIG. 46, with deck member holding discrete clip inserts for gripping the projecting portions of the pins of FIG. 46, to couple adjacent table sections to one another.

FIGS. 46 and 47 show selected aspects of another exemplary linear positioner 3120, particularly, top portions 3148 of a pair of prospectively-adjacent table sections 3136 thereof. Each top portion 3148 includes a deck member 3172 formed as an extrusion and then machined to create additional features, such as teeth 3270 of a rack segment 3273 and holes 3121. As in linear positioner 2120, pins 3168 are fixed to each of a pair of adjacent table sections 3136 to couple and align the table sections with one another, and optionally to fix the relative positions of the top portions of the table sections. However, linear positioner 3120 uses discrete inserts, instead of integral clips, to securely attach pins 3168 to each of the table sections 3136.

Deck members 3172 each define a set of channels 3137 in which the inserts are fastened. In FIG. 46, each channel 3137 contains a respective mounting block 3139 defining a bore 3141 sized to receive an axial section of a pin 3168. Mounting block 3139 may be secured in the channel 3137, and pin 3168 secured to mounting block 3139, using fasteners (such as bolts) received in respective holes 3121. In FIG. 47, each channel 3137 contains a clip insert 3143 forming a clip 3123. Each clip insert 3143 may be secured in a respective channel 3137 using a fastener placed into one of holes 3121. The table sections 3136 are then aligned, with their end surfaces abutted with one another, and with clips 3123 of one of the table sections 3136 resting on the axial sections of pins 3168 projecting from mounting blocks 3139 of the other table section 3136. The pair of table sections 3136 are then coupled to one another by forcing the protruding portion of each pin 3168 into the corresponding clip 3123, via a lateral opening of the clip, as described above for linear positioner 2120. The force may be applied orthogonally to the long axes of each of the pair of table sections 3136, such as vertically. Clips 3123 and/or clip inserts 3143 may, for example, be formed of any suitable elastic material, such as a polymer or metal (e.g., spring steel). Pins 3168 may be tapered or may have a uniform diameter along the length of the pin, among others. Each pin 3168 may have an external thread for threaded engagement with an internal thread defined by a mounting block 3139.

Example 3. Removable Leg Assembly of a Table Section

This example describes an exemplary leg assembly 2156 for linear positioner 2120 that mounts to the underside of deck member 2172 of a table section 2136 in either a deployed configuration or a retracted, storage configuration; see FIGS. 48-51 (also see FIGS. 44 and 45 of Example 2 and compare with leg assembly 1156 of Example 1 (e.g., see FIGS. 26-30).

Leg assembly 2156 includes a fixed leg 2158*a* and a pivotable leg 2158*b* each connected to a bracket 2220 using fasteners 2145. Fixed leg 2158*a* has the same fixed position with respect to bracket 2220 in each configuration of leg assembly 2156. In contrast, pivotable leg 2158*b* is adjustable between a pivotable configuration and a fixed configuration. In the pivotable configuration, leg 2158*b* can pivot about an axis 2147 defined by one of fasteners 2145. This pivotability permits the orientation of pivotable leg 2158*b* to be changed relative to fixed leg 2158*a*, indicated by a rotation arrow 2149 in FIG. 48, between the non-parallel (angled) arrangement of FIG. 48 and the parallel arrangement of FIGS. 50 and 51. The angled arrangement of legs 2158*a*, 2158*b* is used in the deployed configuration of leg assembly 2156 (see FIG. 48). The parallel arrangement of legs 2158*a*, 2158*b* is used in the retracted, storage configuration of leg assembly 2156 (see FIGS. 50 and 51).

Figure 48:
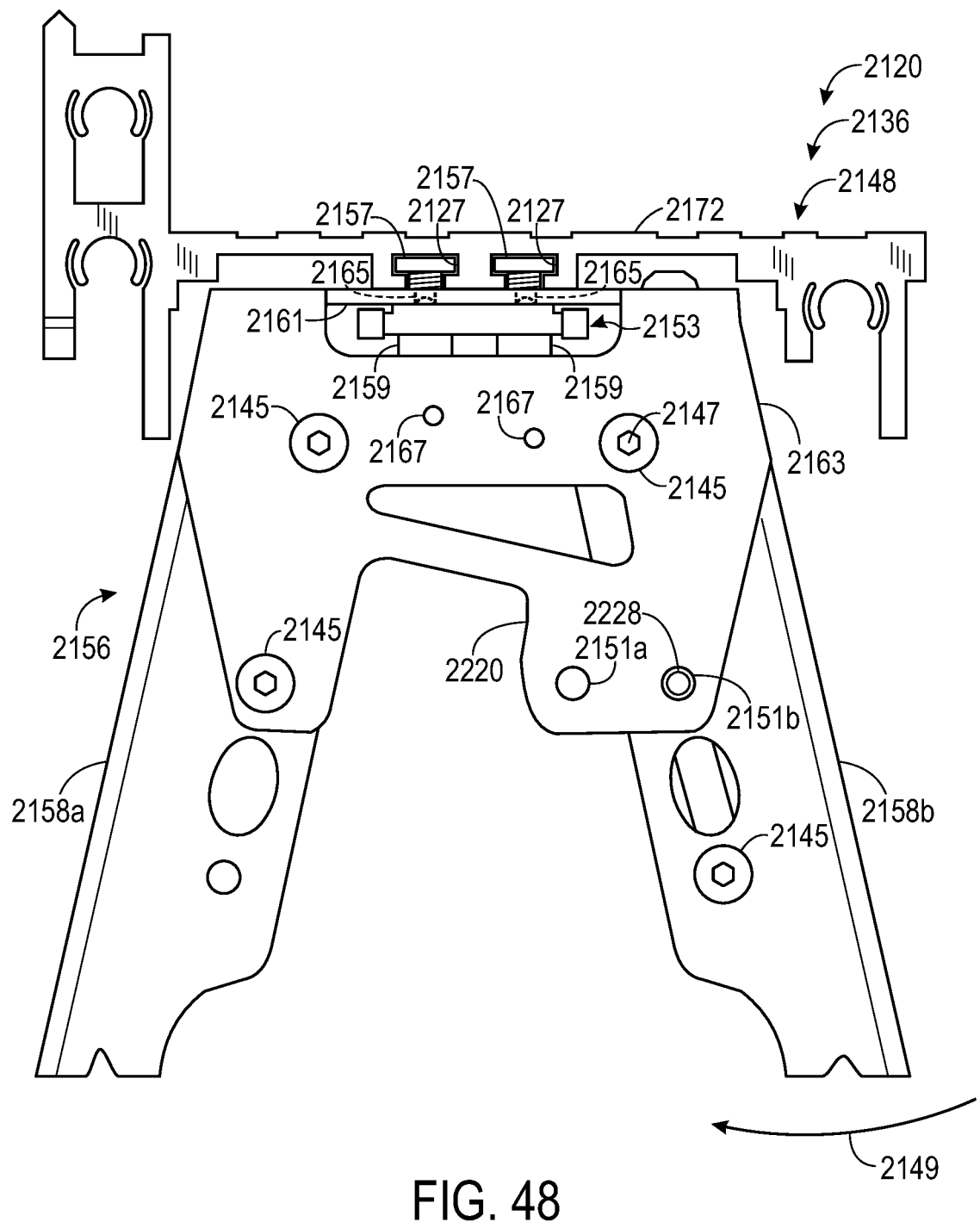
FIG. 48 is a fragmentary end view of the table section of FIG. 45, taken in the absence of the pins and in the presence of a leg assembly that is mounted to the deck member in a deployed (supporting) configuration using a first region of the leg assembly.
Figure 49:
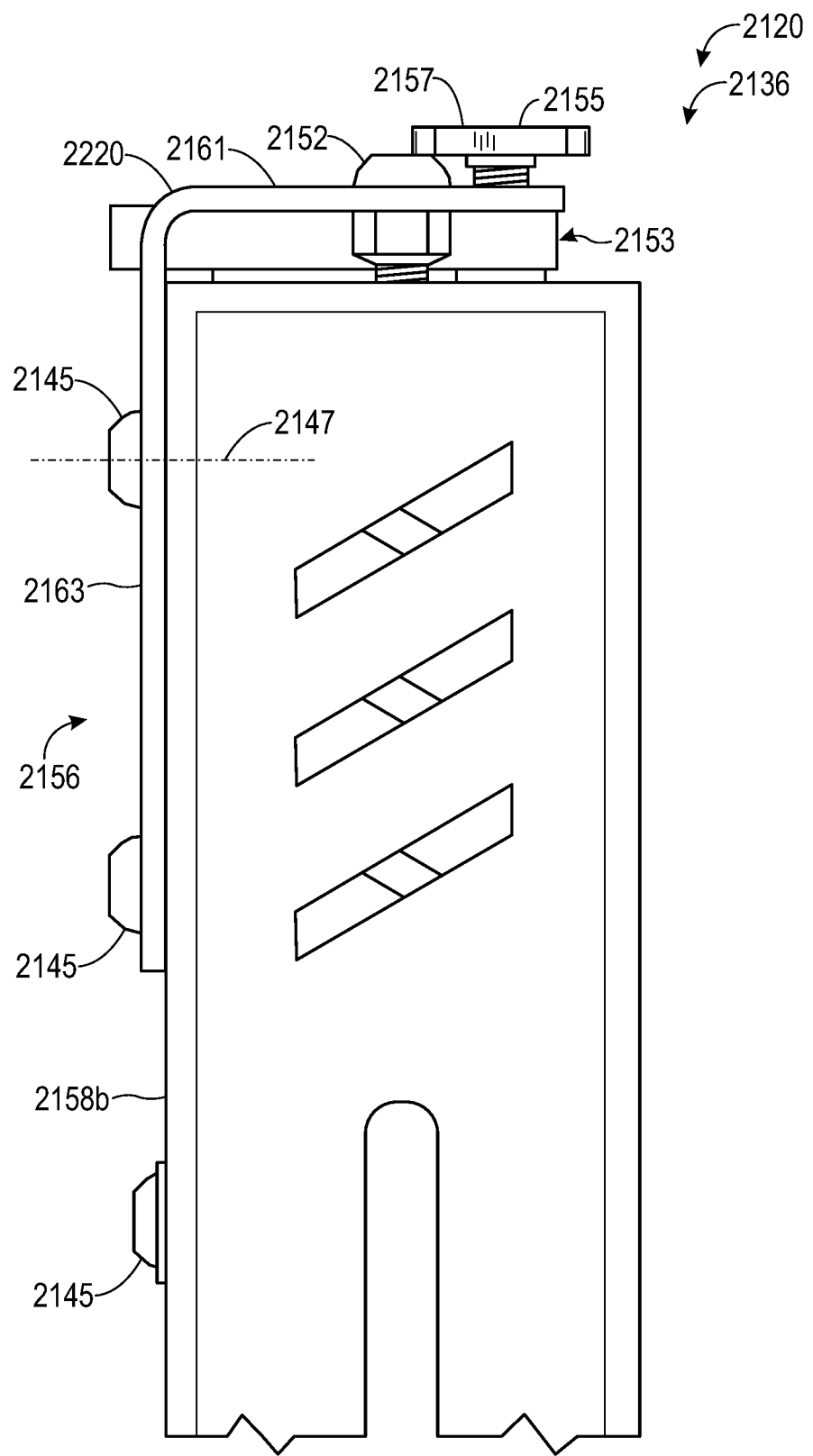
FIG. 49 is a fragmentary side view of the table section configuration of FIG. 48, taken in the absence of the deck member.

The pivotability of leg 2158*b* relative to leg 2158*a* is controlled by a spring-biased detent 2228 (e.g., a spring-biased pin) and a pair of holes 2151*a*, 2151*b* defined by bracket 2220; see FIG. 48. When detent 2228 projects sufficiently into hole 2151*a* or hole 2151*b*, leg 2158*b* is locked to bracket 2220 in either the angled arrangement of FIG. 48 (using hole 2151*b*) or the parallel arrangement of FIGS. 50 and 51 (using hole 2151*a*). Urging detent 2228 out of hole 2151*a* or 2151*b* changes leg 2158*b* to a pivotable configuration, such that leg 2158*b* can be moved between the parallel and angled arrangements of legs 2158a, 2158b. A bolt 2152 provides additional support to pivotable leg 2158b through a slot in the top of the leg (see FIG. 49).

Leg assembly 2156 is mounted to deck member 2172 via a mounting assembly 2153 (interchangeably called a clip). Mounting assembly 2153 is fastened securely (e.g., bolted) to an underside of deck member 2172 at one or more axial slots 2127 (also called T-slotted rails). Heads 2155 of one or more threaded fasteners 2157 are received in the one or more axial slots 2127 and tightened against inner walls of the slots, to lock mounting assembly 2153 in place along the one or more axial slots 2127. Accordingly, the position of mounting assembly 2153 (and thus leg assembly 2156) can be changed by loosening threaded fasteners 2157, sliding mounting assembly 2153 to a new position along axial slots 2127, and then re-tightening the threaded fasteners. This change in position permits leg assembly 2156 to be located near either end of deck member 2172 or more centrally along the deck member, among others. Alternatively, or in addition, two mounting assemblies 2153 can be fastened to deck member 2172, such as near opposite ends thereof, which permits a pair of leg assemblies 2156 to be mounted near each of the opposite ends of the deck member 2172, such that table section 2136 can be self-supported by the four legs of the pair of leg assemblies 2156.

Figure 50:
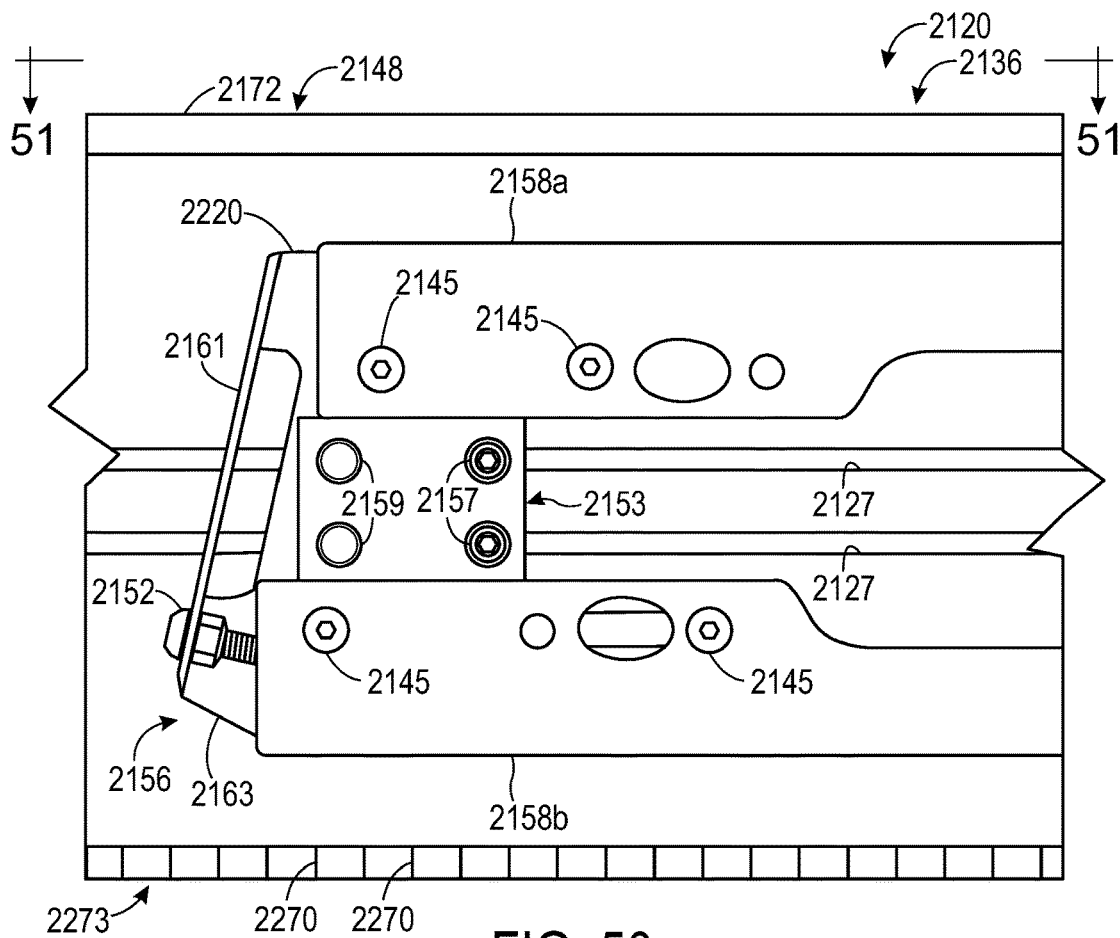
FIG. 50 is a fragmentary, somewhat-simplified bottom view of the table section of FIG. 48, except with the leg assembly mounted to the deck member in a retracted, storage configuration under and parallel to the deck member using a second region of the leg assembly.
Figure 51:
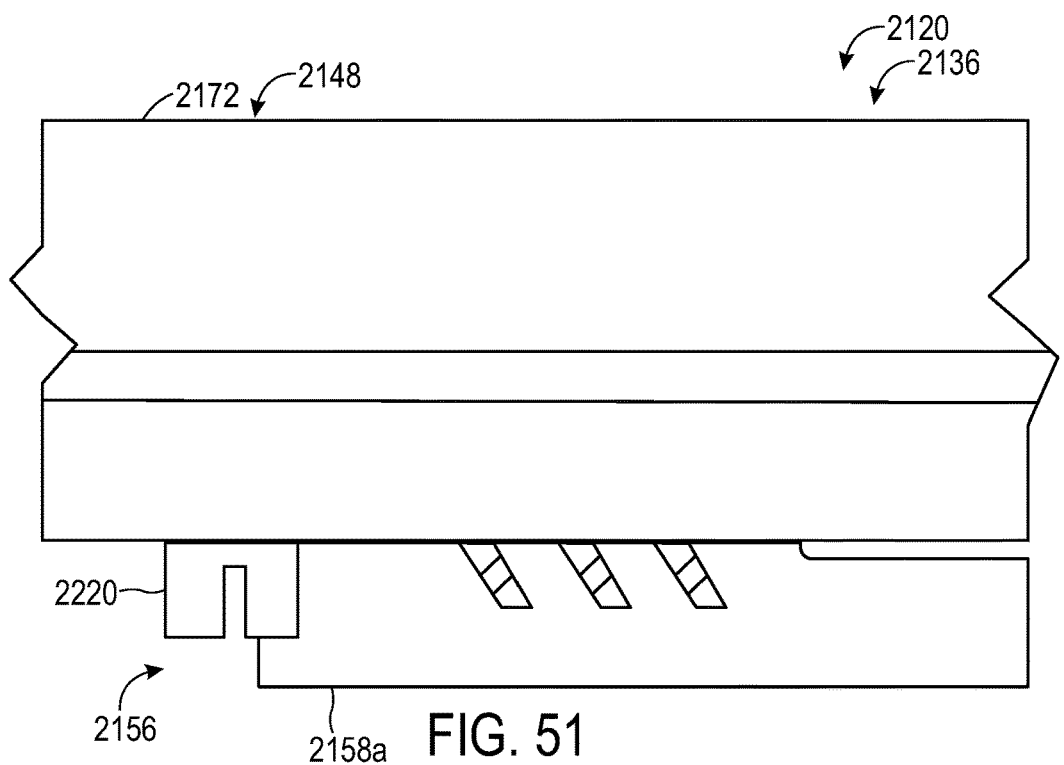
FIG. 51 is a fragmentary side view of the table section configuration of FIG. 50, taken generally along line 51-51 of FIG. 50.

Mounting assembly 2153 has a pair of catches 2159 (e.g., provided by spring-biased pins) that lock leg assembly 2156 to deck member 2172 in either a deployed configuration (see FIGS. 48 and 49) or a retracted, storage configuration (see FIGS. 50 and 51). Catches 2159 are configured to engage bracket 2220 at either of two alternative regions of the bracket. More specifically, bracket 2220 has an upper region 2161 and a lower region 2163. Upper region 2161 defines upper apertures 2165 that are engaged by catches 2159 in the deployed configuration. Lower region 2163 defines lower apertures 2167 that are engaged by catches 2159 in the retracted, storage configuration. Leg assembly 2156 is removed from mounting assembly 2153, after placing catches 2159 in releasing positions, when the leg assembly is changed from the deployed configuration to the retracted, storage configuration, or vice versa.

Upper region 2161 and lower region 2163 are transverse to one another, such as orthogonal in the depicted embodiment. Accordingly, the deployed and storage configurations of the leg assembly differ by the angle formed between upper region 2161 and lower region 2163 of bracket 2220. For example, in the depicted embodiment, legs 2158a, 2158b are parallel to a vertical plane (and/or parallel to a plane orthogonal to the long axis of deck member 2172) in the deployed configuration. In the storage configuration, legs 2158a, 2158b are parallel to a plane and/or a long axis defined by deck member 2172. In other embodiments, legs 2158a, 2158b may extend along a plane that is sloped with respect to deck member 2172 in the deployed configuration, similar to that shown for the legs in Example 1. However, the deployed configuration shown in FIG. 49 can be advantageous because leg assemblies 2156 can be located closer to one another along a table formed by table sections 2136 and can provide greater stability.

For deployment, leg assembly 2156 is inserted and locked in place by catches 2159, such as threaded spring pins. For retraction and storage, a pin of detent 2228 is depressed, allowing pivotable leg 2158b to swing into parallel with fixed leg 2158a. Leg assembly 2156 is then removed and locked in place under, and parallel to, deck member 2172 using mounting assembly 2153 on the bottom of deck member 2172.

Example 4. Shuttle with Glide Element

Figures 52, 52A:
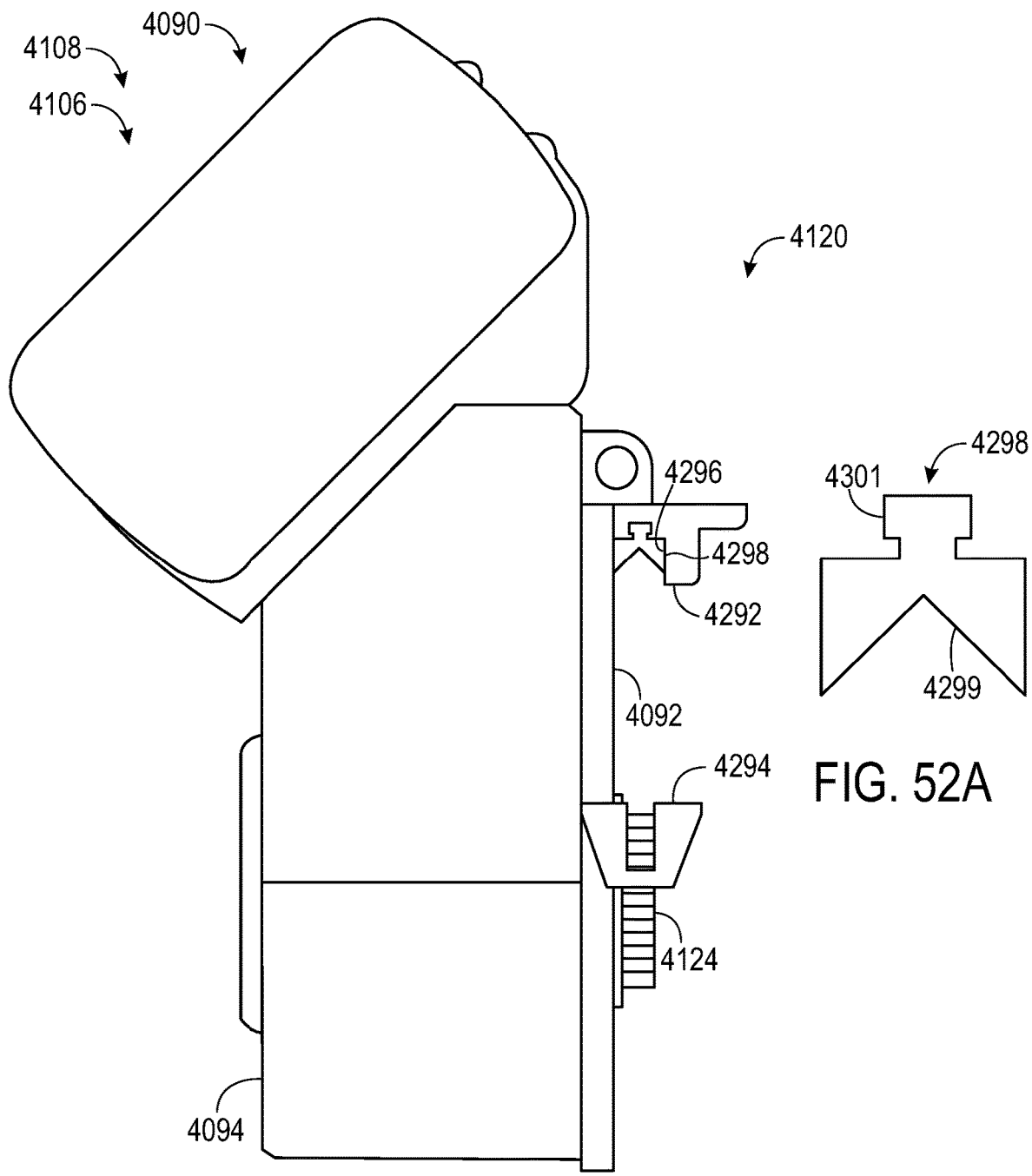
FIG. 52 is a side view of selected aspects of an exemplary shuttle of a linear positioner, where the shuttle includes a carriage having a glide element defining a tapered (V-shaped) recess to facilitate sliding travel of the carriage along a complementary rail of a track formed by a table of the linear positioner.
FIG. 52A is a magnified view of the glide element of FIG. 52 taken in isolation.

This example describes an exemplary shuttle 4108, actuator 4090, carriage assembly 4106, and/or carriage 4092 including at least one glide element 4298; see FIGS. 52 and 52A (compare with FIGS. 36-39 of Example 1). A motor 4094 is labeled for reference.

Glide element 4298 defines a tapered (V-shaped) recess 4299. The recess enables glide element 4298 to contact and slide along a complementary rail of a linear positioner 4120. The complementary rail is not shown here but may have the cross-sectional shape and orientation/position of tapered flange 2129 of deck member 2172 (see FIG. 45 of Example 2). The complementary rail may be continuous or formed by two or more coupled, coaxial rail segments, such as two or more upper rail segments 2266, of two or more deck members, such as two or more deck members 2172 (or deck members 3172) (also see FIG. 47).

A pair of glide elements 4298 may replace the two sets of three low-friction inserts 1298 shown in FIGS. 36 and 38. This configuration reduces the number of glide components by two-thirds, relative to linear positioner 1120. Each glide element 4298 may be located in a channel 4296 defined by carriage 4092, to form an upper guide 4292. A protrusion 4301 of glide element 4298 may be used to couple the glide element to channel 4296. A set screw may provide vertical adjustment of the position of glide element 4298. Horizontal alignment is provided with minimal adjustment points.

Figure 37:
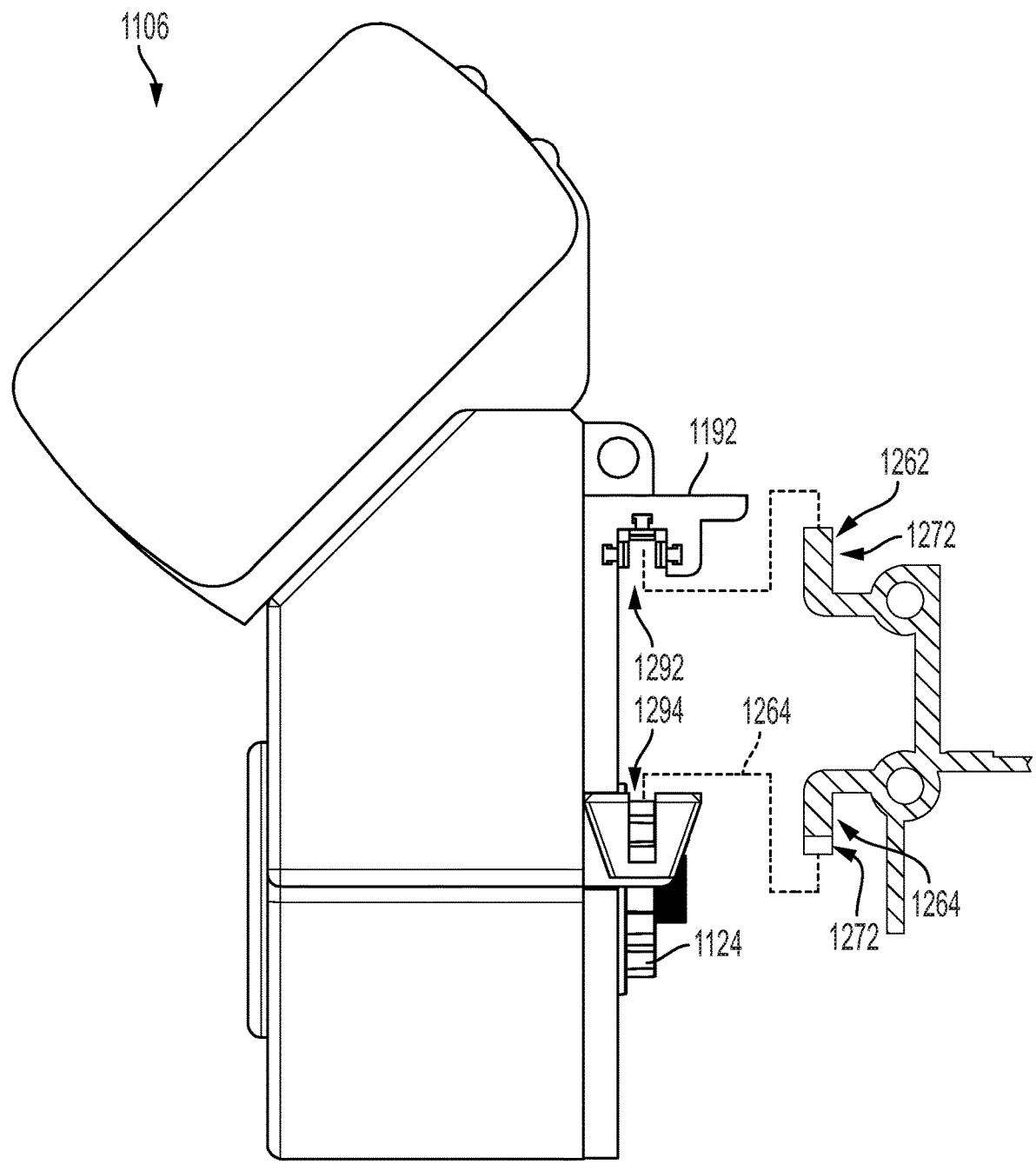
FIG. 37 is an end view of the carriage assembly of FIG. 34 exploded from a deck member of a table section, with the deck member shown as fragmentary and sectional.

A lower guide 4294 may be formed adjacent edges of a gear 4124 of actuator 4090, shuttle 4018, and/or carriage assembly 4106, generally as described in Example 1 for lower guide 1294 (see FIGS. 36-38).

III. SELECTED ASPECTS

This section describes selected aspects of the present disclosure, as a series of indexed paragraphs. The limitations of this section may be combined with one another in any suitable combination.

Paragraph A1. A linear positioner, comprising: a table including a track, the table being configured to support and orient a workpiece parallel to the track; and a shuttle including a stop to contact an end of the workpiece and a carriage connected to the stop and configured to travel along the track, in response to a signal(s) received from a computer, to move the stop to a desired position; wherein, optionally, the shuttle is connected to the table at the track, wherein, optionally, the shuttle includes a motor to drive the shuttle including the motor as a unit along the track, and wherein, optionally, the track guides travel of the carriage along the track.

Paragraph A2. The linear positioner of paragraph A1, wherein the track is elongated along an axis, and wherein the desired position is located at a desired distance along the axis from a site of action of a workpiece-processing tool.

Paragraph A3. The linear positioner of paragraph A1 or A2, wherein the table includes a deck configured to be contacted with an underside of the workpiece to orient the workpiece substantially parallel to a horizontal plane, and wherein the table includes a fence configured to be contacted with a side of the workpiece to orient the workpiece in the horizontal plane parallel to the track.

Paragraph A4. The linear positioner of any of paragraphs A1 to A3, wherein the shuttle includes a controller that controls operation of the motor in response to the signal(s) received from the computer.

Paragraph A5. The linear positioner of paragraph A4, wherein the shuttle includes an antenna connected to the controller and configured to receive radiofrequency signals from the computer.

Paragraph A6. The linear positioner of any of paragraphs A1 to A5, wherein the shuttle includes an encoder.

Paragraph A7. The linear positioner of paragraph A6, wherein the encoder is a rotary encoder.

Paragraph A8. The linear positioner of any paragraphs A1 to A7, wherein the shuttle includes one or more batteries configured to supply power for operation of the motor.

Paragraph A9. The linear positioner of any of paragraphs A1 to A8, wherein the shuttle is supported by the track.

Paragraph A10. The linear positioner of any of paragraphs A1 to A9, wherein the track is formed by two or more discrete track segments aligned coaxially with one another.

Paragraph A11. The linear positioner of any of paragraphs A1 to A10, wherein the track includes a rack having a linear array of teeth, wherein the shuttle includes a gear that is configured to mesh with the rack and to be rotated by operation of the motor to drive the shuttle along the rack.

Paragraph A12. The linear positioner of paragraph A11, wherein the rack is formed by two or more discrete rack segments, and wherein each rack segment of the two or more rack segments provides a plurality of the teeth.

Paragraph A13. The linear positioner of any of paragraphs A1 to A12, wherein the track includes a first rail and a second rail that are not coaxial with one another, and wherein the shuttle is guided along the track by each of the first rail and the second rail.

Paragraph A14. A workpiece-processing system, comprising: the linear positioner of any of paragraphs A1 to A13; and a workpiece-processing tool connected to the linear positioner and configured to modify the workpiece at a site of action; wherein the desired position is located at a desired distance from the site of action.

Paragraph A15. The workpiece-processing system of paragraph A14, wherein the workpiece-processing tool includes a saw.

Paragraph A16. The linear positioner of paragraph 1, wherein the table includes two or more table sections coupled to one another end to end and each elongated parallel to the axis, and wherein the table has a deck to support a workpiece and a fence to orient the workpiece on the deck.

Paragraph A17. The linear positioner of paragraph A16, wherein at least two of the two or more table sections are substantially identical to another.

Paragraph A18. The linear positioner of paragraph A16 or A17, wherein the track guides travel of the carriage, and wherein each table section provides a segment of the track.

Paragraph A19. The linear positioner of paragraph A18, wherein the table section includes a segment of the deck and/or a segment of the fence formed integrally with the segment of the track.

Paragraph A20. The linear positioner of paragraph A18 or A19, wherein the track defines a linear array of teeth, and wherein the segment of the track defines a plurality of the teeth.

Paragraph A21. The linear positioner of any of paragraphs A16 to A20, wherein each table section of the two or more table sections provides a segment of the deck and a segment of the fence.

Paragraph A22. The linear positioner of paragraph A21, wherein the table section includes a one-piece deck member, and wherein the one-piece deck member includes the segment of the deck and the segment of the fence.

Paragraph A23. The linear positioner of paragraph A22, wherein the one-piece deck member is a machined extrusion.

Paragraph A24. The linear positioner of any of paragraphs A16 to A23, wherein each table section includes a top portion and a leg assembly that is connected to the top portion, wherein the leg assembly includes at least one leg, and wherein the leg assembly is movable with respect to the top portion between a deployed configuration and a retracted, storage configuration.

Paragraph A25. The linear positioner of paragraph A24, wherein the leg assembly has a first region and a second region, wherein the leg assembly is configured to be mounted to the top portion of the table section at the first region of the leg assembly for the deployed configuration and at the second region of the leg assembly for the retracted, storage configuration.

Paragraph A26. The linear positioner of paragraph A25, wherein the leg assembly is configured to be removed from the top portion of the table section and re-mounted when changing the leg assembly from the deployed configuration to the retracted, storage configuration, and vice versa.

Paragraph A27. The linear positioner of any of paragraphs A16 to A26, wherein each table section includes a pair of legs each having an independently adjustable length.

Paragraph A28. The linear positioner of any of paragraphs A16 to A27, further comprising a plurality of pins that couple the two or more table sections to one another end to end.

Paragraph A29. The linear positioner of any of paragraphs A1 to A28, wherein the computer is a general-purpose, handheld device, and wherein the general-purpose, handheld device is a phone or a tablet that communicates with the shuttle wirelessly using radiofrequency signals.

Paragraph A30. The linear positioner of any of paragraphs A1 to A29, further comprising any limitation or combination of limitations of any paragraph(s) of Section III.

Paragraph B1. A linear positioner, comprising: a table to support and orient a workpiece parallel to an axis, the table including a track elongated parallel to the axis; and a shuttle including a stop to contact an end of the workpiece, a gear to mesh with the track, and a motor to rotate the gear in response to a signal(s) from a computer, to drive the shuttle including the motor along the track, such that the stop is moved to a desired position.

Paragraph B2. The linear positioner of paragraph B1, wherein the desired position is located at a desired distance along the axis from a site of action of a workpiece-processing tool.

Paragraph B3. The linear positioner of paragraph B1 or B2, wherein the table includes two or more table sections removably coupled to one another end to end, and wherein each table section provides a segment of the track.

Paragraph B4. The linear positioner of any of paragraphs B1 to B3, wherein the shuttle includes one or more batteries to supply power to the motor, and wherein the one or more batteries travel with the motor along the track.

Paragraph B5. The linear positioner of any of paragraphs B1 to B4, wherein the signal(s) is a radiofrequency signal(s) received from the computer.

Paragraph B6. A workpiece-processing system, comprising: the linear positioner of any of paragraphs B1 to B5; and a workpiece-processing tool connected to the linear positioner and configured to modify the workpiece at a site of action located at a desired distance along the axis from the stop.

Paragraph B7. The linear positioner of any of paragraphs B1 to B6, further comprising any limitation or combination of limitations of any paragraph(s)- of Section III.

Paragraph C1. A linear positioner, comprising: a frame including two or more frame sections coupled to one another end to end, the frame forming a track defining a linear array of teeth, each frame section of the two or more frame sections providing a plurality of the teeth; and a shuttle connected to the frame at the track and including a motor to drive the shuttle as a unit along the track, optionally in response to a signal(s) received from a computer, such that the shuttle is moved to a desired position along the track (and optionally held at the desired position, optionally using the motor).

Paragraph C2. The linear positioner of paragraph C1, wherein the two or more frame sections are aligned with one another using two or more pins oriented parallel to the track.

Paragraph C3. The linear positioner of paragraph C2, wherein each pin of the two or more pins extends into a pair of adjacent frame sections of the two or more frame sections.

Paragraph C4. The linear positioner of paragraph C2 or C3, where at least one of the frame sections includes two or more clips at an end of the frame section to grip at least two of the pins projecting from an end of an adjacent frame section of the two or more frame sections.

Paragraph C5. The linear positioner of any of paragraphs C1 to C4, wherein each frame section of the two or more frame sections is a table section including a top portion and one or more legs, and wherein, optionally, the one or more legs are configured to be moved between a deployed configuration and a retracted, storage configuration.

Paragraph C6. The linear positioner of any of paragraphs C1 to C5, wherein the shuttle includes a gear that is rotated by the motor, and wherein the gear meshes with the track such that rotation of the gear causes travel of the shuttle along the track.

Paragraph C7. The linear positioner of any of paragraphs C1 to C6, wherein the signal(s) is a radiofrequency signal(s), and wherein the shuttle includes an antenna to receive the radiofrequency signal(s).

Paragraph C8. The linear positioner of any of paragraphs C1 to C7, wherein the shuttle includes at least one battery to supply power to the motor.

Paragraph C9. The linear positioner of any of paragraphs C1 to C8, wherein the shuttle includes a stop configured to contact an end of a workpiece.

Paragraph C10. The linear positioner of any of paragraphs C1 to C9, wherein the frame includes a fence elongated parallel to the track and configured to be contacted by a lateral side of a workpiece.

Paragraph C11. The linear positioner of paragraph C10, wherein each frame section of the two or more frame sections provides a segment of the fence.

Paragraph C12. The linear positioner of any of paragraphs C1 to C11, wherein the shuttle includes a controller that controls operation of the motor in response to the signal(s) from the computer.

Paragraph C13. The linear positioner of paragraph C12, wherein the shuttle includes an antenna connected to the controller and configured to receive radiofrequency signals from the computer.

Paragraph C14. The linear positioner of any of paragraphs C1 to C13, wherein the shuttle includes an encoder.

Paragraph C15. The linear positioner of paragraph C14, wherein the encoder is a rotary encoder.

Paragraph C16. The linear positioner of any of paragraphs C1 to C15, wherein the track is elongated along an axis, and wherein the desired position is located at a desired distance along the axis from a site of action of a workpiece-processing tool.

Paragraph C17. The linear positioner of any of paragraphs C1 to C16, further comprising any limitation or combination of limitations of any paragraph(s) of Section III.

Paragraph D1. A linear positioner, comprising: a table elongated along an axis and including two or more table sections coupled to one another end to end, the table having a deck to support a workpiece and a fence to orient the workpiece on the deck; a stop to contact an end of the workpiece; and an actuator configured to drive the stop along the axis in response to a signal(s) from a computer, to position the stop at a desired position.

Paragraph D2. The linear positioner of paragraph D1, wherein the desired position is located at a desired distance along the axis from a site of action of a workpiece-processing tool.

Paragraph D3. The linear positioner of paragraph D1 or D2, wherein each table section of the two or more table sections provides a segment of the deck and a segment of the fence.

Paragraph D4. The linear positioner of any of paragraphs D1 to D3, wherein at least two of the two or more table sections are substantially identical to another.

Paragraph D5. The linear positioner of any of paragraphs D1 to D4, wherein each table section of the two or more table sections is elongated along the axis.

Paragraph D6. The linear positioner of any of paragraphs D1 to D5, wherein each table section of the two or more table sections includes a top portion that provides a segment of the deck and also includes at least one leg connected to the top portion.

Paragraph D7. The linear positioner of paragraph D6, wherein each table section includes a leg assembly that is connected to the top portion of the table section and that provides the at least one leg, wherein the leg assembly is movable with respect to the top portion between a deployed configuration and a retracted, storage configuration.

Paragraph D8. The linear positioner of paragraph D7, wherein the leg assembly includes a pair of legs.

Paragraph D9. The linear positioner of paragraph D8, wherein at least one leg of the pair of legs is pivotable with respect to the other leg of the pair of legs to change an angle defined between the legs.

Paragraph D10. The linear positioner of any of paragraphs D7 to D9, wherein the leg assembly has a first region and a second region, wherein the leg assembly is configured to be mounted to the top portion of the table section at the first region of the leg assembly for the deployed configuration and at the second region of the leg assembly for the retracted, storage configuration.

Paragraph D11. The linear positioner of any of paragraphs D7 to D10, wherein the leg assembly is configured to be removed from the top portion of the table section and re-mounted when changing the leg assembly from the deployed configuration to the retracted, storage configuration, and vice versa.

Paragraph D12. The linear positioner of any of paragraphs D7 to D9, wherein the leg assembly is configured to be movable (optionally pivotable as a unit) between the deployed and retracted, storage configurations while remaining connected to the top portion of the table section.

Paragraph D13. The linear positioner of any of paragraphs D6 to D12, wherein each table section has a first configuration in which the at least one leg is transverse to the top portion of the table section and a second configuration in which the at least one leg is parallel to the top portion of the table section.

Paragraph D14. The linear positioner of any of paragraphs D1 to D13, wherein each table section includes a pair of legs each having an independently adjustable length.

Paragraph D15. The linear positioner of any of paragraphs D1 to D14, wherein at least one of the two or more table sections includes a latch configured to releasably lock the table section to another table section of the two or more table sections.

Paragraph D16. The linear positioner of any of paragraphs D1 to D15, further comprising a plurality of pins that couple the two or more table sections to one another end to end.

Paragraph D17. The linear positioner of paragraph D16, wherein each pin of the plurality of pins is arranged parallel to the axis.

Paragraph D18. The linear positioner of paragraph D16 or D17, wherein each table section includes two or more clips, and wherein each clip is configured to grip one of the pins.

Paragraph D19. The linear positioner of paragraph D18, wherein the clip is configured to be deformed by movement of the clip and the pin relative to one another transverse to the pin, to receive and seat the pin in the clip.

Paragraph D20. The linear positioner of any of paragraphs D1 to D19, wherein the actuator is a shuttle including a motor that drives movement of the stop, the shuttle including the motor being configured to travel as a unit along the axis.

Paragraph D21. The linear positioner of any of paragraphs D1 to D20, wherein the actuator includes a carriage for the stop, wherein the table includes a track to guide travel of the carriage, and wherein each table section provides a segment of the track.

Paragraph D22. The linear positioner of paragraph D21, wherein the table section includes a segment of the deck and/or a segment of the fence formed integrally with the segment of the track.

Paragraph D23. The linear positioner of paragraph D21 or D22, wherein the track defines a linear array of teeth, and wherein the segment of the track defines a plurality of the teeth.

Paragraph D24. The linear positioner of any of paragraphs D1 to D23, wherein each table section of the two or more table sections provides a segment of the deck and a segment of the fence.

Paragraph D25. The linear positioner of paragraph D24, wherein the table section includes a one-piece deck member, and wherein the one-piece deck member includes the segment of the deck and the segment of the fence and optionally a segment of a track.

Paragraph D26. The linear positioner of paragraph D25, wherein the one-piece deck member is a machined extrusion.

Paragraph D27. The linear positioner of any of paragraphs D1 to D26, further comprising any limitation or combination of limitations of any paragraph(s) of Section III.

Paragraph E1. A linear positioner, comprising: a table elongated along an axis and including a deck to support a workpiece and also including a fence to orient the workpiece on the deck parallel to the axis; a stop to contact an end of the workpiece; and an actuator configured to drive the stop along the axis in response to a signal(s) from a computer, to position the stop at a desired distance along the axis from a workpiece-processing tool; wherein the table includes two or more discrete table sections, each table section providing a segment of the deck and a segment of the fence.

Paragraph E2. The linear positioner of paragraph E1, wherein each table section includes a top portion that provides the segment of the deck and the segment of the fence and also includes at least one leg for supporting the top portion.

Paragraph E3. The linear positioner of paragraph E2, wherein the at least one leg is movable with respect to the top portion of the table section between a deployed configuration (transverse to the top portion) and a retracted, stored configuration (parallel to the top portion).

Paragraph E4. The linear positioner of any of paragraphs E1 to E3, further comprising any limitation or combination of limitations of any paragraph(s) of Section III.

Paragraph F1. A linear positioner, comprising: a table elongated along an axis and including a deck to support a workpiece and also including a fence to orient the workpiece on the deck parallel to the axis; a stop to contact an end of the workpiece; and an actuator configured to drive the stop along the axis in response to a signal(s) from a computer, to position the stop at a desired distance along the axis from a workpiece-processing tool; wherein the table includes two or more table sections coupled to one another end to end using pins.

Paragraph F2. The linear positioner of paragraph F1, further comprising any limitation or combination of limitations of any paragraph(s) of Section III.

Paragraph G1. A linear positioner, comprising: a deck to contact an underside of a workpiece; a fence to contact a lateral side of the workpiece; a stop to contact an end of the workpiece; and an actuator to drive the stop along an axis to a desired distance from a site of action of a workpiece-processing tool, or other target site, in response to a radiofrequency signal(s) communicated wirelessly to the actuator by a computer.

Paragraph G2. The linear positioner of paragraph G1, wherein the actuator includes a motor, a controller for the motor, and an antenna, and wherein the controller is configured to receive the radiofrequency signal(s) from the computer using the antenna.

Paragraph G3. The linear positioner of paragraph G1 or G2, wherein the computer has no physical connection to any of the deck, fence, stop, or actuator of the linear positioner.

Paragraph G4. The linear positioner of any of paragraphs G1 to G3, wherein the computer is a general-purpose, handheld device.

Paragraph G5. The linear positioner of paragraph G4, wherein the general-purpose, handheld device is a phone or a tablet.

Paragraph G6. The linear positioner of any of paragraphs G2 to G5, wherein the controller is configured to communicate with the computer via a personal area network having a range of less than about 30, 20, or 10 meters.

Paragraph G7. The linear positioner of any of paragraphs G2 to G6, wherein the controller is configured to communicate with the computer via short-distance wireless technology, such as Bluetooth, IrDA, Wireless USB, or ZigBee.

Paragraph G8. The linear positioner of any of paragraphs G2 to G7, wherein the controller is configured to execute commands from the computer only if the computer has a predefined proximity to the controller, and wherein the predefined proximity is within a deemed "safe" distance from the controller and/or on a line of sight from the controller.

Paragraph G9. The linear positioner of paragraph G8, wherein the controller is configured to determine whether the computer has the predefined proximity using closely-coupled low energy wireless signals (BLE), near field communication (NFC), passive radio frequency identification (RFID), and/or a physical safety/proximity monitor.

Paragraph G10. The linear positioner of any of paragraphs G2 to G9, wherein the controller is configured to halt motion of the stop before the stop reaches a position at the desired distance from the workpiece-processing tool if the controller loses its wireless connection to the computer.

Paragraph G11. The linear positioner of any of paragraphs G2 to G10, wherein the controller is configured to execute commands only from an authorized computer.

Paragraph G12. The linear positioner of any of paragraphs G2 to G11, wherein the controller is configured to execute the commands when received from any of two or more computers, if each of the two or more computers is an authorized computer.

Paragraph G13. The linear positioner of paragraph G12, wherein the controller is configured to refuse commands from any other authorized computer, once a communication link is established with a given authorized computer and until the communication link is broken.

Paragraph G14. The linear positioner of any of paragraphs G1 to G13, wherein the fence and/or the support is elongated parallel to the axis.

Paragraph G15. The linear positioner of any of paragraphs G1 to G14, wherein the stop has a travel range of at least 30, 50, 80, 100, or 200 centimeters.

Paragraph G16. The linear positioner of any of paragraphs G1 to G15, further comprising a shuttle including the actuator and the stop, wherein the shuttle is configured to travel as a unit along the axis.

Paragraph G17. A workpiece-processing system comprising: the linear positioner of any of paragraphs G1 to G16; and a workpiece-processing tool connected to the linear positioner and defining the site of action.

Paragraph G18. The workpiece-processing system of paragraph G17, wherein the workpiece-processing tool includes a saw.

Paragraph G19. The linear positioner of any of paragraphs G1 to G18, further comprising any limitation or combination of limitations of any paragraph(s) of Section III.

Paragraph H1. A linear positioner, comprising: a deck to contact an underside of a workpiece; a fence to contact a lateral side of the workpiece; a stop to contact an end of the workpiece; a track elongated parallel to the fence; and an actuator to drive the stop along the track in response to a signal(s) from a computer, to position the stop at a desired distance from a workpiece-processing tool; wherein the track is formed by a plurality of track segments that are removably connected to one another, and wherein each track segment forms a longitudinal segment of the track.

Paragraph H2. The linear positioner of paragraph H1, wherein the track includes a rack having a linear array of teeth, and wherein each track segment provides a plurality of the teeth.

Paragraph H3. The linear positioner of paragraph H2, wherein the teeth of the linear array are uniformly spaced from one another.

Paragraph H4. The linear positioner of paragraph H2 or H3, wherein the actuator includes a motor and a gear, and wherein the gear is rotated by operation of the motor and meshes with the rack.

Paragraph H5. The linear positioner of any of paragraphs H1 to H4, wherein the fence is formed by a plurality of fence segments, and wherein each track segment is nonremovably attached to a fence segment of the plurality of fence segments.

Paragraph H6. The linear positioner of paragraph H5, wherein the track segment and the fence segment are formed integrally with one another.

Paragraph H7. The linear positioner of any of paragraphs H1 to H6, wherein the track includes an upper rail and a lower rail.

Paragraph H8. The linear positioner of paragraph H7, wherein each track segment includes a section of the upper rail and a section of the lower rail.

Paragraph H9. The linear positioner of any of paragraphs H1 to H8, further comprising any limitation or combination of limitations of any paragraph(s) of Section III.

Paragraph I1. A linear positioner, comprising: a deck to contact an underside of a workpiece; a fence to contact a lateral side of the workpiece; a stop to contact an end of the workpiece; a track elongated parallel to the fence; and an actuator to drive the stop along the track in response to a command from a computer, to position the stop at a desired distance from a workpiece-processing tool; wherein at least a section of the deck, at least a section of the fence, and at least a section of the track are formed integrally with one another as a single piece.

Paragraph I2. The linear positioner of paragraph I1, wherein the single piece is a machined extrusion.

Paragraph I3. The linear positioner of paragraph I2, wherein the track includes a rack having a linear array of teeth, and wherein the machined extrusion has been machined to create teeth of the linear array of teeth.

Paragraph I4. The linear positioner of any of paragraphs I1 to I3, further comprising a plurality of deck members that collectively form the fence and the track, wherein each deck member is formed as a single piece of material and provides a longitudinal section of the fence and a longitudinal section of the track.

Paragraph I5. The linear positioner of any of paragraphs I1 to I4, further comprising any limitation or combination of limitations of any paragraph(s) of Section III.

Paragraph J. A linear positioner having any combination of the following features and capabilities.

The linear positioner may optimize the cutting of material and/or the removal of defects from the material and may arrange parts to be cut in such a manner as to maximize the usable material remaining.

An open application interface (API) may permit third-party vendors to write applications for the positioner using the API. Said applications may be downloadable from the web using one of the known app stores, such as Apple or Google Play.

The linear positioner may be controlled by a smartphone or similar type of external PDA. The smartphone or other PDA may have a wired or wireless connection to the linear positioner.

The linear positioner may allow a user to enter one or more dimensions into a computer (e.g., a smartphone or other electronic control device). The computer then may command the linear positioner to move to a respective position corresponding to each dimension, either a single position or series of positions. The linear positioner may be configured to execute commands from the computer only if the computer has a predefined proximity to the controller. This predefined proximity is within a deemed "safe" distance from the linear positioner and/or on a line of sight from the linear positioner. The linear positioner may be configured to determine whether the computer has the predefined proximity using any suitable mechanism/device, such as closely-coupled low energy wireless signals (BLE), near field communication (NFC), passive radio frequency identification (RFID), and/or a physical safety/proximity monitor, among others.

The linear positioner may include a worktable having an integral track, which may include a rack. The rack may mesh with a gear, such as a nylon gear. The worktable may be assembled from table sections (e.g., approximately 44" sections), which may be snapped together, optionally using a hook operatively connected to a camming handle.

The linear positioner may be powered by a rechargeable battery, instead of the power grid (wall power), to increase portability for job-site use. However, the linear positioner may be capable of using wall power, too, such as with a transformer/converter through the battery attachment point.

The linear positioner may include a worktable and also may include a track for linear travel of a carriage for the stop. The track may be integral to the worktable. The worktable may include a plurality of table sections that can be snapped together, allowing the worktable to be rapidly deployed with an adjustable length determined by the number of table sections that are snapped together. The positioner may include an off-center cam to draw the table sections together. The positioner may use pins for axial alignment of table sections with one another. One or more of the pins may be adjustable to ensure that discrepancies in length, if any, of the table sections can be corrected for between the table sections. The positioner may have legs that fold up for storage.

The linear positioner may use a phone or other PDA-like device as the user interface.

The positioner and/or a computer serving as the user interface may communicate wirelessly or via a wired connection with a wireless or wired printer, to provide productivity reports or labels for individual parts.

The positioner may use an electronic measuring device either independently or in conjunction with a computer (e.g., a handheld computer) to create a list of dimensions and then execute that list.

The positioner may use an electronic measuring device either independently or in conjunction with computer (e.g., a phone) to create a list of dimensions and then execute a program to adjust each dimension to meet application-specific requirements for target applications such as window manufacturing, and then position a material (one or more workpieces) accordingly.

The positioner may use an electronic measuring device either independently or in conjunction with a computer (e.g., a phone) to create a list of dimensions and then execute that list while doing certain functions or algorithms including optimization and defecting of material.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first (or alpha), second (or beta), or third (or gamma), for identified elements are used to distinguish between the elements, and do not indicate a particular position or order of such elements, unless otherwise specifically stated. The present disclosure incorporates other material by reference. If any conflict or ambiguity in the meaning of a term results from incorporation by reference, the meaning provided by text that is present literally herein should govern interpretation of the term.

We claim:

1. A linear positioner, comprising:
   a table including a track, the table being configured to support and orient a workpiece parallel to the track; and
   a shuttle including a stop to contact an end of the workpiece and a motor to drive the shuttle as a unit along the track, in response to a signal(s) received from a computer, to move the stop to a desired position.

2. The linear positioner of claim 1, further comprising:
   a deck to contact an underside of a workpiece;
   a fence to contact a lateral side of the workpiece; and
   wherein the motor is part of an actuator and the signal(s) are radiofrequency signal(s) communicated wirelessly to the actuator from a computer.

3. The linear positioner of claim 2, wherein the actuator includes a controller for the motor and an antenna, and wherein the controller is configured to receive the radiofrequency signal(s) from the computer using the antenna.

4. The linear positioner of claim 3, wherein the computer is a phone or a tablet.

5. The linear positioner of claim 4, further comprising one or more batteries configured to supply power for operation of the motor.

6. The linear positioner of claim 1, wherein the shuttle includes a controller that controls operation of the motor in response to the signal(s) received from the computer.

7. The linear positioner of claim 6, wherein the shuttle includes an antenna connected to the controller and configured to receive radiofrequency signals from the computer.

8. The linear positioner of claim 1, wherein the track includes a rack having a linear array of teeth, and wherein the shuttle includes a gear meshes with the rack and is rotated by operation of the motor to drive the shuttle along the rack.

9. The linear positioner of claim 8, wherein the rack is formed by two or more rack segments, and wherein each rack segment of the two or more rack segments provides a plurality of the teeth.

10. The linear positioner of claim 1, wherein the shuttle includes one or more batteries configured to supply power for operation of the motor.

11. The linear positioner of claim 1, wherein the track is formed by two or more discrete track segments aligned coaxially with one another.

12. A linear positioner, comprising:
   a table elongated along an axis and including two or more discrete table sections coupled to one another end to end, the table having a deck to support a workpiece and a fence to orient the workpiece on the deck;
   a stop to contact an end of the workpiece; and
   an actuator configured to drive the stop along the axis in response to a signal(s) from a computer, to position the stop at a desired position, wherein the actuator includes a carriage for the stop, wherein the table includes a track to guide travel of the carriage, and wherein each table section provides a segment of the track.

13. The linear positioner of claim 12, wherein each table section of the two or more discrete table sections provides a segment of the deck and a segment of the fence.

14. The linear positioner of claim 13, wherein each table section includes a one-piece deck member that includes the segment of the deck and the segment of the fence.

15. The linear positioner of claim 14, wherein the one-piece deck member is a machined extrusion.

16. The linear positioner of claim 12, wherein each table section includes a top portion and a leg assembly, wherein the leg assembly includes at least one leg, and wherein the leg assembly is movable with respect to the top portion between a deployed configuration and a retracted, storage configuration.

17. The linear positioner of claim 16, wherein each table section includes a pair of legs each having an independently adjustable length.

18. The linear positioner of claim 12, further comprising a plurality of pins that couple the two or more discrete table sections to one another end to end.

19. The linear position of claim 18, wherein at least one of the table sections includes two or more clips to grip at least two of plurality of pins.

20. The linear positioner of claim 12, wherein each table section includes a segment of the deck and/or a segment of the fence formed integrally with the segment of the track.

21. The linear positioner of claim 12, wherein the track defines a linear array of teeth, and wherein each segment of the track defines a plurality of the teeth.

22. A linear positioner, comprising:
a table elongated along an axis and including two or more discrete table sections coupled to one another end to end, the table having a deck to support a workpiece and a fence to orient the workpiece on the deck;
a stop to contact an end of the workpiece;
an actuator configured to drive the stop along the axis in response to a signal(s) from a computer, to position the stop at a desired position, and
a plurality of pins that couple the two or more discrete table sections to one another end to end.

23. The linear positioner of claim 22, wherein the actuator includes a carriage for the stop, the table includes a track to guide travel of the carriage, and each table section includes a segment of the deck and/or a segment of the fence formed integrally with the segment of the track.

24. The linear positioner of claim 23, wherein each table section of the two or more discrete table sections provides a segment of the deck and a segment of the fence.

25. The linear positioner of claim 24, wherein each table section includes a one-piece deck member that includes the segment of the deck and the segment of the fence.

26. The linear positioner of claim 25, wherein the one-piece deck member is a machined extrusion.

27. The linear positioner of claim 23, wherein the track defines a linear array of teeth, and wherein each segment of the track defines a plurality of the teeth.

28. The linear positioner of claim 22, wherein the actuator includes a motor, a controller for the motor, and an antenna, and wherein the controller is configured to receive the signal(s) from the computer using the antenna.

29. The linear positioner of claim 28, wherein the computer is a phone or a tablet.

30. The linear positioner of claim 29, further comprising one or more batteries configured to supply power for operation of the motor.

31. The linear positioner of claim 22, wherein each table section includes a top portion and a leg assembly, wherein the leg assembly includes at least one leg, and wherein the leg assembly is movable with respect to the top portion between a deployed configuration and a retracted, storage configuration.

32. The linear positioner of claim 31, wherein each table section includes a pair of legs each having an independently adjustable length.

33. A linear positioner, comprising:
a table elongated along an axis and including two or more discrete table sections coupled to one another end to end, the table having a deck to support a workpiece and a fence to orient the workpiece on the deck;
a stop to contact an end of the workpiece; and
an actuator configured to drive the stop along the axis in response to a signal(s) from a computer, to position the stop at a desired position,
wherein each table section includes a one-piece deck member that includes a segment of the deck and a segment of the fence.

34. The linear positioner of claim 33, wherein the actuator includes a motor, a controller for the motor, and an antenna, and wherein the controller is configured to receive the signal(s) from the computer using the antenna.

35. The linear positioner of claim 34, wherein the computer is a phone or a tablet.

36. The linear positioner of claim 35, further comprising one or more batteries configured to supply power for operation of the motor.

37. The linear positioner of claim 33, wherein the one-piece deck member is a machined extrusion.

38. The linear positioner of claim 33, further comprising a plurality of pins that couple the two or more discrete table sections to one another end to end.

39. A linear positioner, comprising:
a table including a track, the table being configured to support and orient a workpiece parallel to the track; and
a shuttle including a stop to contact an end of the workpiece and a motor to drive the shuttle as a unit along the track, in response to a signal(s) received from a computer, to move the stop to a desired position,
wherein the shuttle includes an antenna connected to a controller and configured to receive radiofrequency signals from the computer, and the shuttle includes one or more onboard batteries configured to supply power for operation of the motor.

40. The linear positioner of claim 39, wherein the track includes a rack having a linear array of teeth, and wherein the shuttle includes a gear meshes with the rack and is rotated by operation of the motor to drive the shuttle along the rack.

41. The linear positioner of claim 40, wherein the rack is formed by two or more rack segments, and wherein each rack segment of the two or more rack segments provides a plurality of the teeth.

42. The linear positioner of claim 39, wherein the table comprises two or more discrete table sections coupled to one another end to end, wherein each table section provides a segment of the track.

43. The linear positioner of claim 42, wherein the track defines a linear array of teeth, and wherein each segment of the track defines a plurality of the teeth.

44. The linear positioner of claim 39, wherein the shuttle includes a controller that controls operation of the motor in response to the signal(s) received from the computer.

45. The linear positioner of claim 39, wherein the track is formed by two or more discrete track segments aligned coaxially with one another.

46. The linear positioner of claim 39, wherein the computer is a phone or a tablet.

* * * * *